United States Patent [19]
Larson

[11] Patent Number: 5,659,781
[45] Date of Patent: Aug. 19, 1997

[54] BIDIRECTIONAL SYSTOLIC RING NETWORK

[76] Inventor: Noble G. Larson, 130 Crest Dr., Eugene, Oreg. 97405

[21] Appl. No.: 269,341

[22] Filed: Jun. 29, 1994

[51] Int. Cl.$^6$ ........................................................ G06F 15/16
[52] U.S. Cl. ............................ 395/800.11; 364/231.9; 364/230; 364/229.3; 364/229.5; 364/DIG. 1; 395/800.19
[58] Field of Search ............................ 395/800, 27

[56] References Cited

U.S. PATENT DOCUMENTS 4,241,330  12/1980  Hery .................................... 340/825.05
4,615,029   9/1986  Hu ........................................... 370/89

OTHER PUBLICATIONS

Optimal Selection of Multicost Groups for Resource Location in a distributed system IEEE, 1989; pp. 312–321.

*Primary Examiner*—Eric Coleman

[57] ABSTRACT

A ring-structured network allowing bidirectional, point-to-point, communications between a plurality of nodes (200A–E), some of them equipped with a computing element (210) and a local memory element (221), and others, possibly, serving as input/output devices. In addition to clocks and miscellaneous signals, the network is divided cross-sectionally into two pipelined busses, or pipes: one (995A–B) to signal node selection, and another (996A–B) to convey data. Values, termed tags, sent over the selection pipe are interpreted, as they arrive, at the nodes, by means of lookup tables. Several varieties of selection can be represented in these tables, some, e.g., signalling read or write transfers between the data pipe and local memory element (221). Other varieties may signal the loading of local memory address pointers (223, 224, or 225) from the data pipe. Tags are generated by a specialized node (100), which thus serves as a traffic controller. A key feature of this network is that individual tags may signal selection of a plurality of nodes, some perhaps for reading, and others possibly for writing. In this way, concurrent transfers between multiple pairs of nodes are induced on the network, in a systolic manner. Such transfers can be organized to effect a variety of statically-routed communications, including those between adjacent partitions in embedded two-dimensional rectilinear and hexagonal grids. Extensions to support dynamically-routed communications are also disclosed.

17 Claims, 42 Drawing Sheets

INC:

| 0 0 | STK | C M D | ///// | CONSTANT |
|---|---|---|---|---|
| 2 | 2 | 4 | 4 | 12 |

LJMP:

| 0 1 | STK | C M D | ABS. ADDRESS |
|---|---|---|---|
| 2 | 2 | 4 | 16 |

SCOND (REL):

| 1 0 | STK | C M D | // | SEL | DISPL (+/-) |
|---|---|---|---|---|---|
| 2 | 2 | 4 | 1 | 3 | 12 |

BCOND (TOS/BASE):

| 1 1 | STK | C M D | // | SEL | ///////////// | S |
|---|---|---|---|---|---|---|
| 2 | 2 | 4 | 1 | 3 | 11 | 1 |

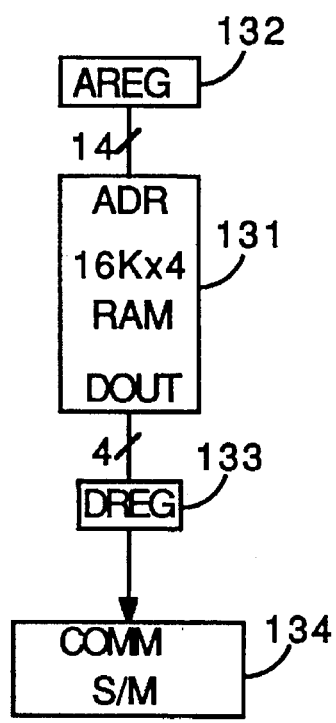
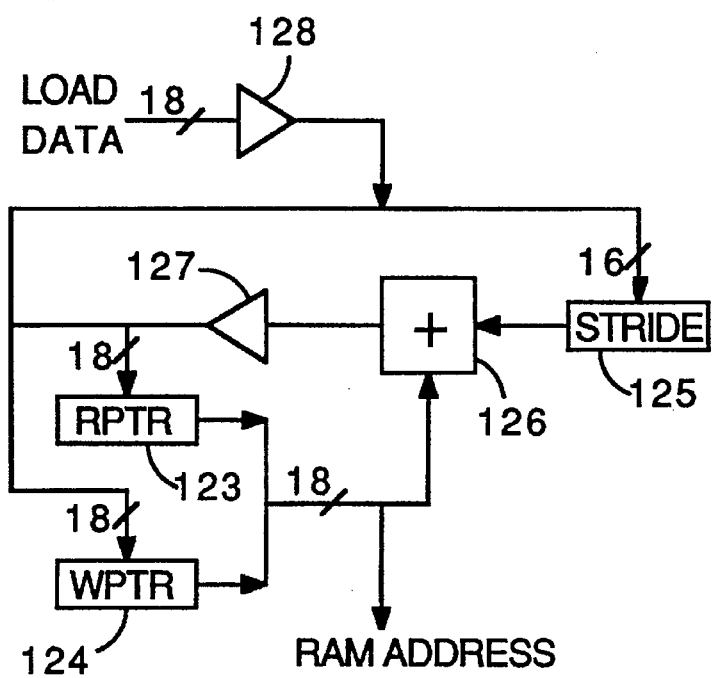
Fig. 31a
Fig. 31b
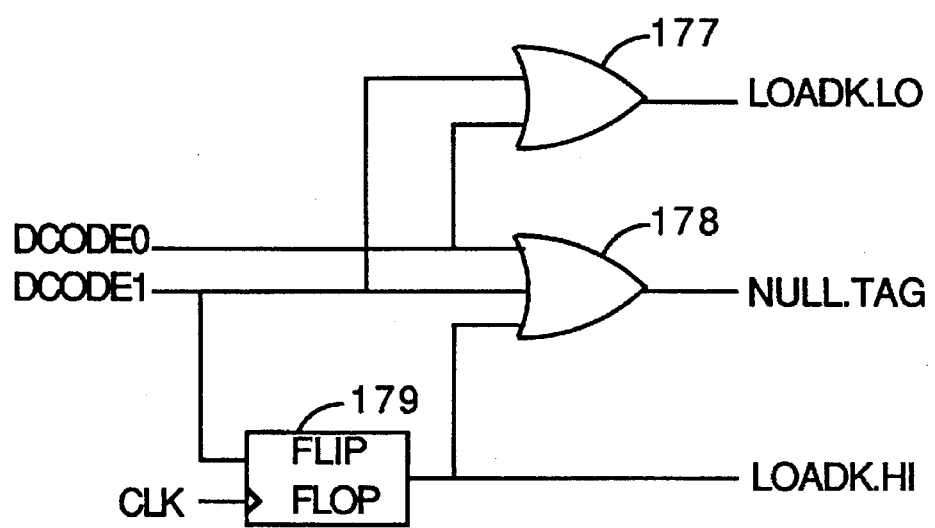
Fig. 32

BIDIRECTIONAL SYSTOLIC RING NETWORK

BACKGROUND OF THE INVENTION

1. Field of Invention

This invention relates to the communication mechanism within parallel computer systems.

2. Description of Prior Art

Many topologies have been proposed and constructed for interconnecting sets of computers as a combined parallel resource available to a single task, or application. Meshes and hypercubes have seen very widespread use as exemplified by the Intel Paragon, the Thinking Machines Connection Machine, the Maspar, and many earlier machines. The simple structure of a ring has been employed in architectures such as the iWarp machine (Intel) and RAP (International Computer Science Institute), for support of at least some of the inter-processor communication. Local area networks (LAN) have also seen applications of ring topologies, e.g. the IBM Token Ring, and the Cambridge Fast Ring (Cambridge University).

More recently, the Scalable Coherent Interface (SCI) employs a ring as a multiprocessor interconnect. U.S. Pat. No. 5,119,481 [Frank, et al, Jun. 2, 1992] describes another ring interconnect, employing point-to-point transfers. Neither of these interconnects, however, support either bidirectional or systolic transfers, two essential components of this disclosure. Nor do these schemes provide a centralized traffic scheduler, pivotal here in achieving systolic data transfers. Finally, neither of these approaches, nor any of those cited above, support the types of systolic data transfers detailed in this disclosure.

While it is clear to parallel computer architects that a ring affords a simple means of interconnecting a potentially large number of processors, the problems of scheduling, contention, and blocking appear to pose serious obstacles to a contemporary ring-based architectures. Without a strategy to deal with these issues, a ring serves principally to translate a common bus into a high-speed pipelined version of the same thing. Though there are benefits to be had even there, they represent only a fraction of the actual potential.

The invention disclosed herein presents an efficient and novel scheme for achieving a higher degree of ring bandwidth utilization than has hitherto been possible. Within a centrally controlled framework, a versatile combination of statically and dynamically routed data communication is provided. A technique, or strategy, for maximizing network bandwidth is elaborated. These objects are achieved by employing some existing techniques, available in the art, as well as introducing some new ones. The utility of this invention will be demonstrated in several important applications, from the areas of Fourier analysis, partial differential equations, and pattern recognition.

SUMMARY OF THE INVENTION

An interconnection structure is provided wherein a bi-directional ring network is able to efficiently support a variety of communication patterns, critical to parallel computer systems. The principal elements of this ring are the processing nodes, i.e. processing elements augmented with local memory, as well as communication elements, detailed below, allowing them to connect to the network. In addition, there may be some specialized nodes, of an application or implementation-specific nature. The number of processing nodes in a particular ring network can range from a few (e.g. eight) to over a hundred, with sixty-four being a convenient number (a 64-node configuration will be treated as the default case). As an extension, multiple rings can be cascaded, to provide still greater amounts of parallelism.

The basic structure is a ring in that the separate nodes are connected in a strictly point-to-point fashion. Excepting a single external control port, there is no standard bus required, though such a facility is not precluded. The ring is bi-directional in that the point-to-point connection paths can be dynamically configured, as a whole, to allow information to flow either clockwise or counter-clockwise. The symmetry afforded by this feature allows for certain quite general types of data movement, as will be shown. The structure is systolic (in the sense of H. T. Kung [IEEE Computer, Jan. 1982, pp. 37–46]) in that tightly pipelined and concurrent data transfers can be achieved in a fundamentally local interconnect, using a sparse control. (The only non-local interconnect used, aside from clock distribution, is not in the critical path of optimized performance.) For example, in the case of a 64-node configuration, as many as thirty-two inter-node transfers can be simultaneously active and present in the ring buffers, progressing in a rythmic (i.e. systolic) fashion. Concurrency equalling or approximating this is achieved in a number of important communication patterns, contributing greatly to the effective bandwidth of the ring network. The point-to-point interconnect style, in itself, allows for a high frequency interconnect, due to fortuitous topological properties of the system architecture. This will be reflected in the packaging scheme, which will be described in some detail. Thus, the achieved concurrency springboards off a result which is already good, in the sense of being a geometrically tight and efficient network. Certain non-systolic transfer modes are also supported, to complement the (higher bandwidth) concurrent modes.

The interconnection structure, together with its component elements, will be termed the "ring network," or "ring," herein. At the top level, it can be viewed as comprised of a collection of distributed nodes, as described above, together with a central control node, or traffic controller, denoted as the "TCTLR." The interconnect, itself, is divided (cross-sectionally) into three component fields: one dedicated to node selection, a second to data, and a third to clocking and miscellaneous control. The first two are inherently pipelined in nature, and naturally implemented by a point-to-point interconnect. The third is more implementation-dependent, and, in a preferred embodiment, is distributed in a bussed manner (practical considerations, however, require that this bussing be partitioned into several sections, or rails). A signal in the third field serves as a direction bit, and, as such, determines whether information moves clockwise or counter-clockwise, in the other two component fields.

The pipelined selection and data fields, referred to as the "selection pipe," and the "data pipe," respectively, operate in tandem. The widths of these pipes can vary with implementation, with a 16-bit selection field, and 32-bit data field, being used in the preferred embodiment. Values transmitted through the selection pipe signal, or induce, data transfers between nodes via the data pipe. Such values are termed "tag values," or just "tags." Nodes monitor tag values flowing through the selection pipe, to determine when to sample data from, or inject data into, the data pipe.

The system source of tag values is the TCTLR. The latter unit can be viewed as a modified node, though it is unique, in being the only node which can inject information into the selection pipe. As such, the TCTLR is able to define the flow of information through the data pipe, by the particular sequence of tags which it injects.

A central feature of this invention is that a single tag can signal a read in one node, and a write in another. The data transfers thereby induced involve both pipes. For example, following the reception of a tag signalling a local memory read, a node must access that memory and insert the datum obtained into the data pipe. As this operation can not be done instantly, there is an inherent lag, or phase offset, between a tag and the associated read data. In order for the same tag to signal a local memory write in a different node, it is necessary that the same delay, by convention, occur between tag and write data. (In the preferred embodiment, there is a four clock cycle offset between tag and data.) The combination of a tag value in the selection pipe and the associated (delayed) data value in the data pipe will be termed a "slot." These logical entities can be viewed as passing around the ring, advancing by one pipeline stage (in the direction specified by the direction signal) on each clock event.

Nodes (excluding the TCTLR) are "slaves", in that they only react to certain tag values presented to them via the selection pipe. A mechanism is provided for assigning particular tag values to individual nodes. This having been done, a node will react to an assigned value, upon receiving it, in its selection pipe port. The nature of this reaction is node-specific, and typically determined by programmable logic on the node. Processor nodes, in the preferred embodiment, have around a dozen different actions, any of which can be triggered by the arrival of an assigned tag value. Many of these actions are of a "housekeeping" nature, involving, for example, the loading of address pointers. Normally, however, at least one action involves the reading or writing node local memory. A single tag value can, in fact, signal either, since, in the preferred embodiment, a local node control bit determines whether a node is in local memory "read mode" or "write mode." Importantly, a particular tag value can be assigned to multiple nodes, for the purpose of local memory access (or other purposes). Thus, by placing some nodes in read mode, and others in write mode, a single tag value, passing around the ring, can trigger a read from one node, followed by a write (of the read data) to a downstream node. In this way a data transfer between a pair of nodes can be induced. Such transfers need not be limited to a single node pair. In fact, a tag value can induce a series of transfers between different pairs of nodes, as it passes around the ring. Additional copies of such tags can be issued as frequently as the communicating nodes can handle them, thus inducing burst transfers. Finally, interleaved streams of distinct tag values can be circulating around the ring, concurrently, thus inducing transfers in disjoint sets of node pairs. This mechanism gives rise to efficiency, since slots which a given node pair can not use, may support communication between other node pairs.

Nodes require a mechanism for defining tag assignments (of all varieties), and for decoding the continuous stream of tag values, in a timely manner. This decoding can be viewed as a mapping of tag values into node action types. A lookup table is used for this purpose, in the preferred embodiment. There, the 16-bit selection pipe includes a 14-bit tag field, thus allowing the decoding to be performed by a 16K table. The latter table necessarily contains an entry for every tag value defined on the ring. In any given node, the great majority of entries will signal "no action," or NOP. The remaining entries will be mapped into action codes, within the node. More than one tag value may well be assigned to a node, for the purpose of local memory data access. This allows a given node to be included in more than one node grouping, for the purpose of data transfers, and, thus, communicate with several different nodes during a computation.

In relation to the data pipe, the ring network forms a continuous pipeline loop. The selection pipe, however, is interrupted at its juncture (i.e., port) with the TCTLR, in order that the latter can inject tag values. In the preferred embodiment, the TCTLR continuously sources tags to the selection pipe. Thus, lengthy, repetitive sequences are effected by loop iteration, within the TCTLR, rather than by recirculating tag values already in the ring. As the source of tag values, the TCTLR effectively dictates the flow of data within the ring, with particular flow patterns corresponding to tag sequences generated by the TCTLR. By implementing the latter as a programmable unit, such sequences, in turn, correspond to program routines. In the preferred embodiment, the TCTLR is implemented as a fairly conventional microcontroller, thus allowing network communication to be sequenced, in lock step with node computations. As such details are often best explained through illustration, a number of coding examples are provided, both of low-level TCTLR communication routines, and of their use in several important applications.

The continuity of the data pipe allows slots to circulate back through the TCTLR port, after (for example) having acquired read data from a node in the ring. Such slots may signal writes to nodes downstream of the TCTLR. Transfers of this sort are necessary in some "toroidal" communications, convenient in a number of computations. An important consideration here is that the incoming tag sequence must be precisely that which would occur if tag values actually did recirculate, in the sense of the previous paragraph. (Failing this, recirculating data values would not be properly phase-aligned with the incoming tags. For many transfers, however, this constraint can be relaxed.)

A simplistic model, which may help in illustrating the tag mechanism, is that of a shuttle train going around a loop. In this analogy one views the slots (tag and data) leaving the TCTLR as cars in a sort of shuttle. Cars proceed around the ring, all travelling in the same direction, at any given time. Each car, let us say, can hold only one passenger at a time, as does each stop or station. Cars have numbers (1001, 1002, 1003 and 1004), which correspond to station codes. That is, each station is also assigned a number (one of the same four). Stations are also assigned a type (one of two: ON or OFF, corresponding to the states of the R/~W-bit). Multiple stations may be assigned to the same letter and type. Furthermore, each "ON" station has a line of commuters waiting to enter the station. When a #1001-car goes by a #1001-ON station a passenger gets on the car and stays on until the car passes the next #1001-OFF station, at which point the passenger gets off. If #1002, #1003 or #1004 stations of either type are passed they are ignored. Clearly, the same #1001-car can be used repeatedly in a single transversal of the loop, with passengers getting on and off the car, at different #1001-stations, never crossing paths. A constraint here is that between #1001-OFF stations there is exactly one #1001-ON station. The analogy easily extends to the #1002, #1003 and #1004 cars, and the respective stations, with a similar overlap constraint existing within each group. Between groups, however, there are no constraints, since the cars used are independent resources.

The structure and operation, sketched out above, lends itself to supporting a variety of important communication modes, in a parallel processing environment. The ring network is especially well suited for problems involving two-dimensional arrays. In these situations it will be understood that the given array is partitioned in some manner (e.g., rectangular patches), with each partition logically assigned, or "mapped," to one of the processing nodes of the ring (see FIGS. 2–3). Sequences of tag values, generated by the TCTLR and injected into the selection pipe, can induce concurrent transfers between pairs of nodes, oriented along horizontal, vertical, and diagonal axes. These particular communications are achieved with between 65% and 100% of network efficiency, in burst transfers. For example, in a 64-node ring, with a point-to-point bandwidth of 240 MB/sec (i.e., 60 MHz pipeline clocking), close to 1920 MB/sec of effective network usage is attained in the best cases. Efficiency, here, is much dependent on the systolic character of these communications, as exhibited by the rythmic, interwoven patterns which they form. Other transfers supported include horizontal exchanges between nodes viewed as forming a processor grid, transposes, relative to the same grid, and "bit-reversal" transfers (used in FFTs). All of these communications are "static," in that the traffic patterns and amount of data transferred, are, essentially, determined at "compile time." (There is, however, a run-time factor here, in that the number of times which a flow pattern is invoked may be data-dependent.)

The particular bandwidths achievable with this architecture are highly implementation-dependent. Those cited above, and elsewhere in this disclosure, may require the use of high bandwidth signalling technologies, such as ECL or GTL (Gunning Transceiver Logic). For purposes of comparison, however, the above bandwidths will be used consistently, herein, and may be viewed as a reference point.

The multiple selection feature also supports certain dynamic communications. To facilitate this, (selected) nodes are provided with a mechanism for counting network clock cycles, relative to periodic reference pulses, or syncs (signalled by special tag values). This allows nodes, so equipped, to define their own read windows, or "regions-of-interest" (ROI), relative to the index. The shape of these windows is implementation-dependent. In the preferred embodiment, two versions of the ROI feature are disclosed. The "basic" ROI treats the network data-flow as a two-dimensional raster scan, and implements the window as a rectangular region, positionally indexed from the reference pulses. This version of the ROI supports transformations such as rotations of distributed, two-dimensional arrays, by run-time defined angles. To do this, the TCTLR causes nodes, successively, to broadcast their array portions, onto the ring, thus allowing the nodes, as a whole, to sample data, as required, to effect a rotation. Other array transformations can be effected, using similar techniques.

An "extended" ROI feature generalizes the basic feature, in that the ROI can consist of a set of disjoint linear segments (a rectangle is a special case of this configuration). In addition to the previous example, this feature can support run-time defined inter-node transfers. Here, the TCTLR causes nodes, successively, to broadcast all of their outgoing messages, in a series of blocks, prefacing the collective transfer by a reference pulse. Concurrently, each node can sample the portion of each block, addressed to it, by defining a segment of its ROI, appropriately, within the block. A TCTLR capability, used to support this feature, is the run-time parameterization of certain iteration counts, thereby allowing the lengths of the individual blocks to be specified dynamically.

Though lower in bandwidth than the systolic modes, these dynamically-routed transfers provide a flexible resource in the overall communication scheme.

In actual applications the transfer modes sketched out above, both static and dynamic, can be invoked and combined, to meet communication requirements, through the particular programs, or routines, executed by the TCTLR. An interlock mechanism is also provided, to allow node-based application computations and communications to proceed in synchrony. Several applications-related code examples will be provided to illustrate this aspect of the invention.

OBJECTS AND ADVANTAGES

It is an object of the invention to provide a cost-effective mechanism for achieving efficient two-dimensional systolic data transfers, in an embedded (logical) grid of processors, using a one-dimensional bidirectional pipelined point-to-point interconnect.

It is also an object of the invention to provide a centrally controlled communication mechanism, utilizing a high percentage of the available pipeline slots, in local interprocessor communication, within the embedded two-dimensional grid structure.

Another object of the invention is to provide a means of utilizing up to 100% of the available pipeline slots, in burst exchanges along the (favored) horizontal axis, within the embedded two-dimensional grid structure.

Yet another object of the invention is to provide a cost-effective mechanism for performing rotations, and other transformations, of embedded distributed two-dimensional arrays, using run-time specified parameters.

Still another object of the invention is to provide a cost-effective mechanism for achieving dynamically routed communication, in a network of processors, using a one-dimensional interconnect.

Another object of the invention is to provide a means of combining instances of the aforementioned communication modes, in a centrally controlled manner.

Yet another object of the invention is is to integrate specialized devices, such as television cameras and monitors, into the ring network and hence into the applications running thereon.

Still another object of the invention is to provide a packaging scheme, for the interconnected nodes of the ring network, which is geometrically compact, and conducive to short wire, or trace, lengths, in the interconnect.

The attainment of these objects is an advantage over prior art.

BRIEF DESCRIPTION OF THE DRAWINGS

FIG. 31a shows details of TCTLR slave logic.

FIG. 31b shows details of TCTLR address logic.

FIG. 32 shows control logic related to TCTLR constant generation.

INDEX OF REFERENCE NUMERALS

Figure 1:
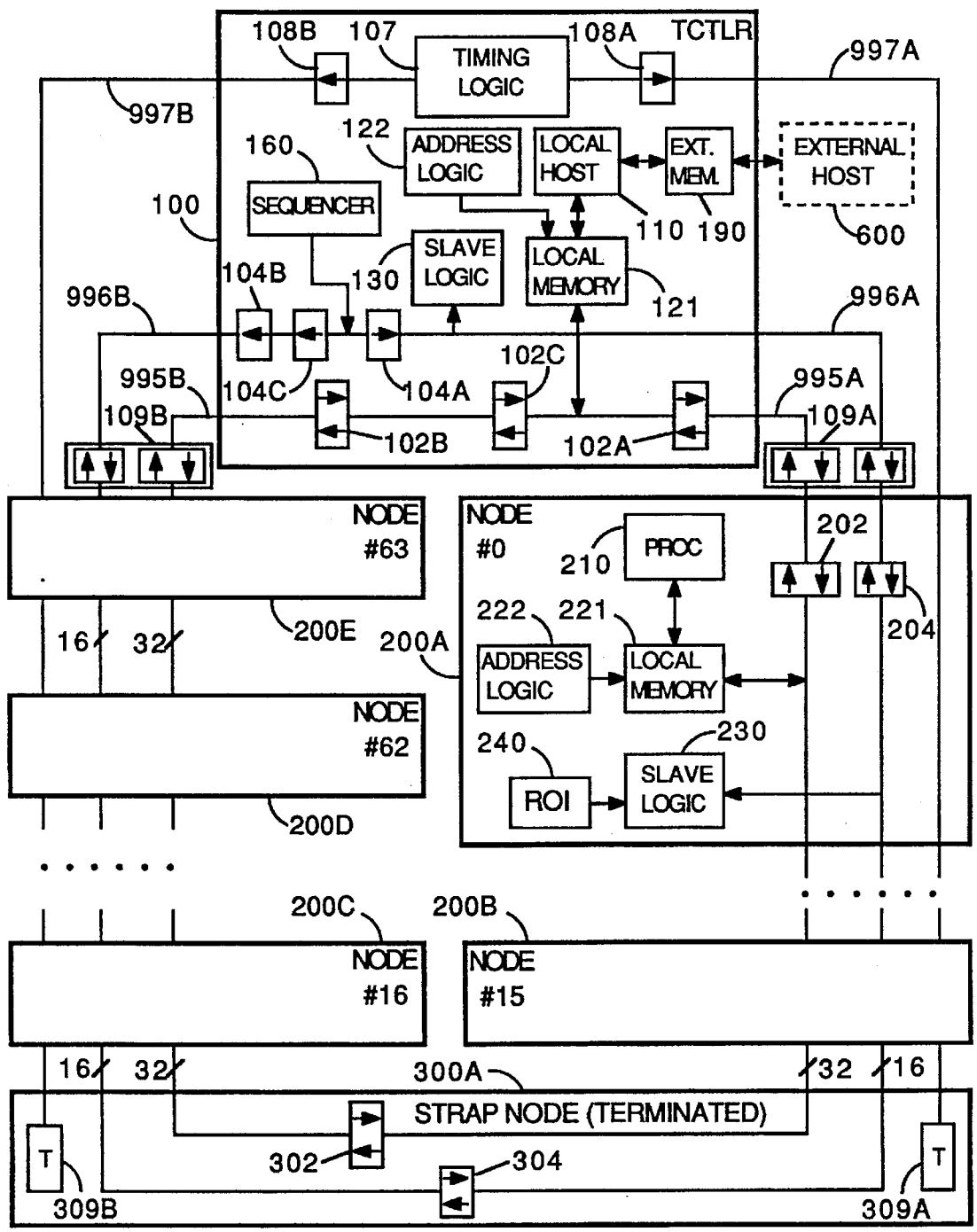
FIG. 1 shows an overview of the ring network.

| Numeral | Description | Figures |
|---|---|---|
| 100 | TCTLR | 1, (27), 35b |
| 101 | System oscillator | 30a |
| 102(T,R)(A-C) | TCTLR data pipe buffers | 1, 27 |
| 103 | Clock source multiplexor | 30a |
| 104(A-C) | TCTLR selection pipe buffers | 1, 27 |
| 105 | Timing generator | 30a |
| 106(T,R) | TCTLR local data buffers | 27 |
| 107 | Timing logica | 1, 27, (30a) |
| 108(A-D) | CLK repeaters | 1, 30a, 33 |
| 109(A-C) | TCTLR (backplane) repeaters | 1, 33, 35b |
| 110 | TCTLR local host | 1, 27 |
| 111(P,S) | TCTLR connectors | 33, 34 |
| 112(P,S) | TCTLR (backplane) connectors | 33, 34 |
| 113(P,S)(A,B) | TCTLR (backplane) connectors | 33, 34 |
| 114(P,S)(A,B) | Backplane right-ang. sockets | 33, 34 |
| 116P(A,B) | Cable headers (external host) | 33, 34 |
| 116S(A,B) | Cable connectors (external host) | 33, 34 |
| 117(A-D) | Backplanes | 33, 34, 35a, 35b |
| 118 | TCTLR main PC board | 33, 34, 35b |
| 119 | TCTLR backplane | 33, 34, 35b |
| 121 | TCTLR local memory | 1, 27 |
| 122 | TCTLR address logic | 1, 27, (31b) |
| 123 | TCTLR read pointer | 31b |
| 124 | TCTLR write pointer | 31b |
| 125 | TCTLR stride register | 31b |
| 126 | TCTLR pointer adder | 31b |
| 127 | TCTLR ptr. adder output buffer | 31b |
| 128 | TCTLR ptr. data (isolation) buffer | 31b |
| 130 | TCTLR slave logic | 1, 27, (31a) |
| 131 | TCTLR tag RAM | 31a |
| 132 | TCTLR tag RAM address register | 31a |
| 133 | TCTLR tag RAM data register | 31a |
| 134 | TCTLR comm. state machine | 31a |
| 160 | Phase sequencer | 1, 27, (28) |
| 161 | Phase memory | 28 |
| 162 | Tag output register | 27 |
| 163 | Phase memory address buffer | 28 |
| 164 | Phase memory data register | 28 |
| 165 | Tag generator register | 28 |
| 166 | Tag selection logic | 27 |
| 167 | Constant (split) register | 27 |
| 168 | Misc. command decoder | 28, (29b) |
| 169 | DIR (direction bit) storage | 27 |
| 170 | Constant selection logic | 27, (32) |
| 171 | Repeat counter #0 (RPT0) | 28 |
| 172 | Repeat counter #1 (RPT1) | 28 |
| 173 | Parameter table address reg. | 28 |
| 175 | TCTLR Parameter table (RAM) | 28 |
| 176 | Repeat counter #2 (RPT2) | 28 |
| 177 | NULL.TAG selection gate | 32 |
| 178 | LOADK.LO enable gate | 32 |
| 179 | LOADK.HI enable flip-flop | 32 |
| 181 | Phase sequencer PC | 28 |
| 183 | Sequencer base register | 28 |
| 184 | Sequencer PC input mux | 28 |
| 185 | Sequencer branch adder | 28 |
| 186 | Sequencer instruction decoder | 28 |
| 187 | Sequencer stack | 28 |
| 188 | Sequencer stack pointer | 28 |
| 190 | TCTLR external memory | 1, 27 |
| 200(A-F) | Processor nodes ("nodes") | 1, (23) |
| 201SA | Right-angle socket connector | 33, 34 |
| 201P(A-D) | Pin connector | 33, 34 |
| 202(T,R) | Node data pipe buffers | 1, 23 |
| 203 | Node data transmit control gate | 23 |
| 204(T,R) | Node selection pipe buffers | 1, 23 |
| 206(T,R) | Node local data buffers | 23 |
| 208 | Off-board receiver control gate | 23 |

5,659,781

-continued

INDEX OF REFERENCE NUMERALS

| Numeral | Description | Figures |
|---|---|---|
| 209 | Node -ILOCK2 O.C. driver | 23 |
| 210 | Node processor | 1, 23 |
| 211 | ABUS.23 pullup resistor | 23 |
| 212 | Node HOLD OR-gate | 23 |
| 213 | Node inverter for ABUS.23 | 23 |
| 221 | Node local memory | 1, 23 |
| 222 | Address logic (two pointer) | 1, (4b), 23 |
|  | Address logic (single pointer) | 1, (4c) |
| 223 | Read pointer | 4b, 23 |
| 223X | Combined (read/write) pointer | 4c |
| 224 | Write pointer | 4b, 23 |
| 225 | Stride register | 4b, 4c, 23 |
| 226 | Pointer adder | 4b, 4c, 23 |
| 227 | Pointer adder output buffer | 4b, 4c, 23 |
| 228 | Pointer data (isolation) buffer | 4b, 4c, 23 |
| 229 | Local memory selection gate | 23 |
| 230 | Node slave logic | 1, (4a), (23) |
| 231 | Tag RAM | 4a, 23 |
| 232 | Tag RAM address register | 4a, 23 |
| 233 | Tag RAM data register | 4a, 23 |
| 234 | Node comm. state machine | 4a, 23 |
| 240 | Basic ROI (region-of-interest) | 1, 23, (25a) |
| 240X | Extended ROI: | (20b), (26) |
| 241 | Basic ROI sync generator | 25a |
| 242 | Basic ROI cursor generator | 25a |
| 243 | Basic ROI clock gate | 25a |
| 244 | Basic ROI selection gate | 25a |
| 245 | Basic ROI HOLD.REQ delay | 25a |
| 246 | Basic ROI WINDOW gate | 25a |
| 251A-C | Extended ROI decoder gates | 26 |
| 252 | Ext. ROI decoder gate | 26 |
| 253 | Ext. ROI write decode gate | 26 |
| 254 | Ext. ROI table index | 20b |
| 255 | Ext. ROI segment table | 20b |
| 256 | Ext. ROI seg. table data buffer | 26 |
| 257 | Ext. ROI offset register | 20b |
| 258 | Ext. ROI scan comparator | 20b |
| 259 | Ext. ROI scan counter | 20b |
| 261 | Ext. ROI length counter | 20b |
| 262 | Ext. ROI leng. cntr. 0-comparator | 26 |
| 263 | Ext. ROI local clock gate | 26 |
| 264 | Ext. ROI WINDOW j-K flop | 26 |
| 265 | Ext. ROI HOLD.REQ delay | 26 |
| 266 | Ext. ROI WINDOW gate | 26 |
| 300(A,B) | Strap nodes (terminated) | 1, 33, 34, 35a |
| 302 | Strap node data pipe buffer | 1 |
| 304 | Strap node selection pipe buffer | 1 |
| 309(A-D) | Strap node terminators | 1, 33, 34 |
| 314(P,S)(A,B) | Strap node connectors | 33 |
| 400 | Video input node | (5) |
| 421(U,L) | Video input node frame buffers | 5 |
| 422 | Address logic | 5 |
| 430 | Slave logic | 5 |
| 491 | A/D (digitizer) | 5 |
| 500 | Video output node | (6) |
| 521 | Video output node frame buffers | 6 |
| 522 | Video output node address logic | 6 |
| 530 | Video output node slave logic | 6 |
| 591 | Video output node D/A | 6 |
| 600 | External host | 1 |
| 801 | Waveform BLCK (Local Clock) | 24d, 25b |
| 802 | Bus waveform SR<00-15> | 24d |
| 803 | Bus waveform for buffer 232 | 24d |
| 804 | Bus waveform for buffer 233 | 24d |
| 805 | Bus waveform for DR<00-31> | 24d |
| 806 | Waveform for signal -GRAB.DBUS | 24d |
| 807 | Waveform for signal -DRIVE.DAT | 24d |
| 808 | Waveform for signal -GRAB.DAT | 24d |
| 809 | Waveform for signal -LWE | 24d |
| 810 | Waveform HS (H. Sync In) | 25b |
| 811 | Waveform -HSYNC (H. Sync Out) | 25b |
| 812 | Waveform SCLK (Special Clock) | 25b |
| 813 | Waveform CLK | 30b |
| 814 | Waveform CLK/4 | 30b |
| 815 | Waveform -OENB0 | 30b |

-continued

INDEX OF REFERENCE NUMERALS

| Numeral | Description | Figures |
|---|---|---|
| 816 | Waveform -OENB1 | 30b |
| 817 | Waveform -OENB2 | 30b |
| 818 | Waveform -OENB3 | 30b |
| 992 | TCTLR local data bus | 27 |
| 993 | TCTLR tag bus | 27 |
| 994 | TCTLR test conditions bus | 27 |
| 995(A,B) | (sections of) data pipe | 1 |
| 996(A,B) | (sections of) selection pipe | 1 |
| 997(A,B) | (rails of) clock and control signals | 1 |

NOTES:
1) Letters in parentheses (following reference numerals) refer to optional suffixes, as explained below. Not all instances in the indicated ranges may be explicitly labeled in the figures, though they are implicit.
2) Figure references, at right, in parentheses refer to detailed representations of element in question. For example, TCTLR 100 is called out in FIGS. 1 and 35b, and detailed in FIG. 27.
3) Some figures have unlabeled elements, in cases where the structure is clear.

CONVENTIONS:
1) All reference numerals consist of a three digit number, suffixed, in so e cases, by one or two letters.
2) Letters at the beginning of the alphabet, in particular A-F, are used to denote multiple occurances of (essentially) identical elements. For example "200" refers to the processor node, as an abstraction. "200A," on the other hand, refers to the Ath occurance of that entity, typically in a figure where more than one is indicated or implied. "200A-F", e.g., refers to the six elements: 200A, 200B, 200C, 200D, 200E, and 200F, as a group.
3) The letters L and U are used to denote the upper and lower halves of certain memories, and are thus, simply extensions of the neral. Simiilarly, P and S signify "pin" and "socket," in reference numerals related to connectors. For example, connectors 111P and 111S are physically distinct and of different type. Connector reference numerals are always suffixed with a P or S suffix. Thus "111" is never used, alone.
4) The letters T and R are used to denote the transmitter and receiver sections of buffers. For example, reference numeral "202" refers to a bidirectional buffer used in the processor node. Thus, "202T" refers to the transmitter section of that buffer, and "202R" to the receiver section of the same element. (In all three cases, however, the reference is to the abstract buffer, in the abstract node.)
5) For multiply instantiated elements, an instance suffix is necessary to specify a physical part. Thus "202TB" refers to the Bth occurance of the transmitter half of buffer 202. Similarly, "202B" refers to the Bth instance of the entirety (both transmitter and receiver section) of buffer 202. As another example, "113SB" refers to the Bth occurance of socket connector 113S.
6) The suffix "X" is used (in several cases) to signify a variant element.

PREFERRED EMBODIMENT

A preferred embodiment will be elaborated below, in three steps. First the overall architecture will be sketched out, with particular emphasis on the inter-processor communication (the principal focus of this invention). Next, the structural details of the individual elements will be developed at some length. Finally, the operation of the invention will be illustrated, by way of coding examples. The latter will include both low-level microcode for several important phases, and higher-level sequences of the same, or similar, phases, as used in several important applications.

I—Architectural Overview (FIGS. 1–22)

The organization of the bidirectional systolic ring network (termed "ring network" or "ring," herein) is illustrated in FIG. 1. There, five processing nodes 200A–200E are shown (the first in some detail) as incorporated into a circular pipeline by means of bidirectional buffers. (Additional processing nodes, not drawn, are implied.) The paths in the two directions have completely separate register storage elements. Thus, information in the elements associated with one direction remains static when movement (data transfer) occurs in the opposite direction. A special subunit 100, termed the "traffic controller", or TCTLR, dictates the flow of data through the network, by means of a protocol described below. Possessing buffers similar to those in the processing nodes, it is part of the ring, having the capability of allowing data to pass back around through it.

Information flows clockwise or counter-clockwise, as determined by a single global control signal (DIR) sourced by the TCTLR. The ring network has two major busses: one (995A-B) dedicated to data, and another (996A-B) to the selection of nodes. The collective pipelined slice which one of these busses cuts thru the entire ring will be loosely referred to as a "pipe", hence the terms "data pipe" and "selection pipe." The sizes of these busses can vary under implementation, with a data pipe width of 32 and a selection pipe width of 16, being used in this embodiment. It is natural and convenient to view each selection value as defining a selection slot which moves around the ring as in an end-around shift register. Moving in tandem with each selection slot (but offset by a fixed delay) is a data slot, which may be written or read by any given node, as dictated by a protocol detailed below. This combination of a data slot and a selection slot will be termed simply a "slot". The latter is an ephemeral or logical entity, such as a token in a token-ring network, or a packet in a LAN: Combined data-selection pipe buffers 109A-B, residing on a backplane unit, associated with the TCTLR, provide buffering and extra pipeline stages.

The selection pipe is 16 bits wide. The values communicated over this path are termed "tag values," or simply "tags." In this embodiment, 14 bits are actually used for this purpose, leaving two bits as spares. Tag values do NOT have a simple one-to-one correspondence with the physical nodes. Rather they are generalized node addresses, in that a particular tag value can select more than one physical node, as will be explained below. This "multiple-selection" mechanism is fundamental for the most important classes of inter-node communications disclosed in this invention. In this embodiment, (data) reads and writes are resolved by a local mode-bit (R/~W) within the node. (That is, a node is either in "data read" mode or "data write" mode.) Hence, the same tag value can signal a read in one node and a write in another, which is, in fact, the basic mechanism of data transfer in the ring network. Importantly, there is no dedicated read/write line, as with most busses. Thus each tag value must be mapped by each node into some operation (though in most cases this will be the null operation or NOP, meaning that the associated slot is to be ignored). Since a particular node can (and usually will) have several tags assigned to it, the mapping between nodes and tags is many-to-many.

Several special signals (represented in FIG. 1 as busses 997A-B), control system initialization (signal INIT), global direction (signal DIR), clocking of the point-to-point interconnect (signal CLK), and the loading of the tag look-up tables (signal TR.WE). These signals are distributed via buffers 108A-B (in addition to buffers 108C-D, which are not shown in FIG. 1, but illustrated elsewhere—see FIG. 33). The global direction and clocking signals are distributed differentially, in this embodiment. The ring network is completed by five interlock signals, ILOCK<1–5>, elaborated below.

Nodes are classified into two groups: processing nodes, and specialized nodes. The former are the principal computational facility of the ring network. The latter serve a variety of purposes, which include performing video I/O. Several types of "dumb" nodes, possessing bidirectional buffers and little else, include straps and jumpers. The term "node" will mean "processing node" unless otherwise stated, or clear from context. External host 600, though not a component of the network, is shown in FIG. 1, to illustrate its relationship to the whole.

Figures 2, 3:
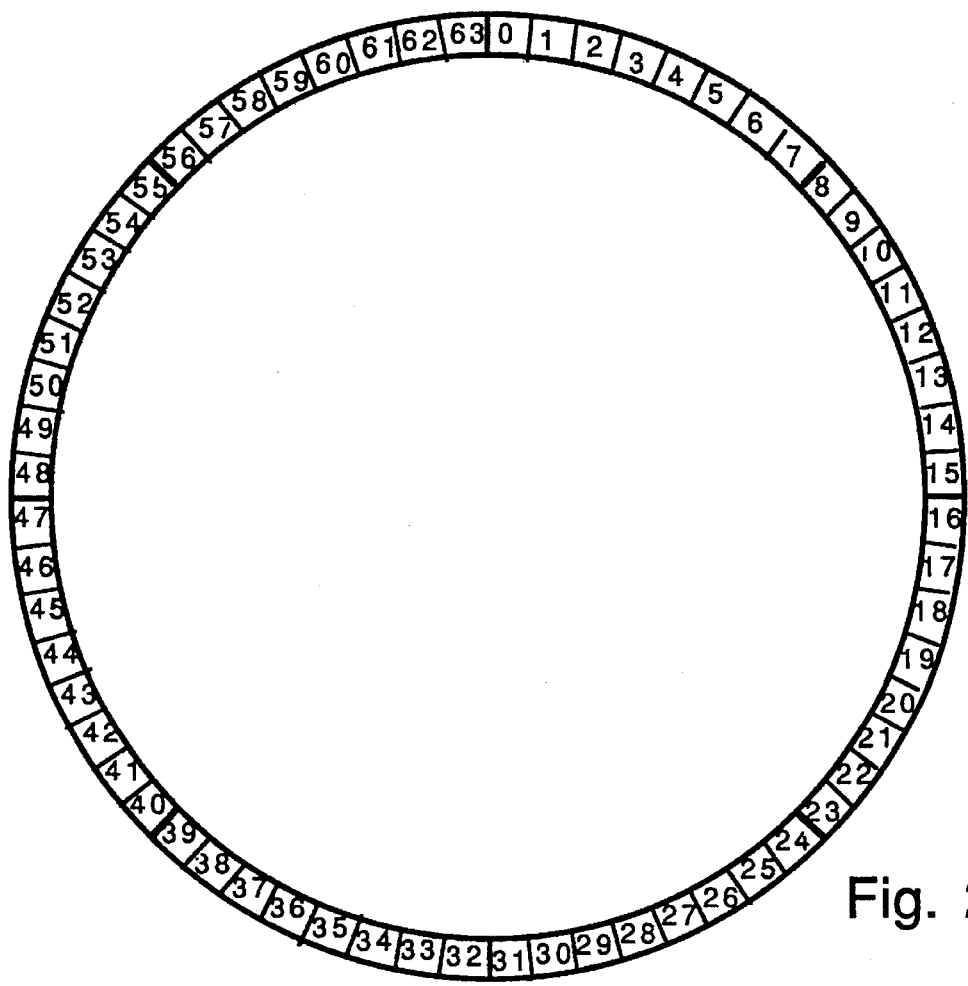
FIG. 2 illustrates the ring abstraction.
FIG. 3 illustrates rectilinear partitioning with natural mapping.

In FIG. 2 the default configuration of 64-nodes is represented symbolically. (Larger or smaller rings are assuredly possible, but the case of 64 is particularly convenient, given current technology). It will be noted that the TCTLR is not represented in this figure, though its presence (between nodes #0 and #63) is assumed. As the the controlling unit, it is more natural to be considered as logically separate. Moreover, any pipeline stages which it contributes do not adversely affect the communication mechanism, aside from latency. Specialized nodes, including straps and jumpers, as well as those used for I/O, are also omitted from FIG. 2. (These omissions facilitate the representation of inter-processor communication, used in this disclosure). Some of these units, including the TCTLR itself, do, however, at times, interact with the ring network very much like processing nodes, as is elaborated below. Node numbering, by convention, proceeds clockwise, in arithmetic order, as shown in the figure. A natural embedding of a 2-dimensional data array into the ring network is shown in FIG. 3. Patches of the array are mapped, as indicated in the figure, into the default configuration of nodes.

Nodes (FIGS. 1,4)

Each (processing) node is provided with a processor 210, and local memory 221. Bidirectional registered buffers 202 and 204 intersect the ring as part of an overall point-to-point interconnect. Communication slave logic 230 monitors the flow of information through (a portion of) its network port to determine if and when data should be sourced or sampled through the port. This logic is termed "slave" in that it only reacts to events on the network and never initiates them. In certain situations, however, the node is allowed to define its own "region-of-interest," that is to say, network cycles to be acquired, relative to a timing index. ROI logic 240 is used in this functionality. Local memory 221 is dual ported, with the slave logic and the processing unit sharing access to the it, in an implementation-dependent fashion. Processor references to local memory use addresses provided directly by the processor, in the conventional fashion. Memory references by the slave logic, being precisely those generated by the network port, use addresses defined by local address logic 222.

The flow of data in and out of the individual nodes is controlled via the selection pipe. The values which flow over this pipe select nodes rather than actual datum addresses in the nodes. Each node's communication slave logic 230 decodes the value presented to its selection pipe port on every clock cycle (having a period of 20 ns or less, 16.67 ns being nominal). In response to each cycle the slave logic performs one of the following actions:

1. Read local memory (or some other local element) and drive result to the data output port
2. Sample the data input port and write result to local memory (or some other local element)
3. Perform a side effect
4. Nothing (the "null" action or NOP—the most common case)

Cycle actions can (and often do) involve side effects. It will be noted that by convention "read" refers to transfers FROM a node, whereas "write" indicates a transfer INTO a node. The datum addresses used in the local memory accesses of cases 1 and 2 are obtained from special registers in address logic 222. (These registers are themselves loaded by the same mechanism.)

The decoding of tags is done by the communication slave logic 230 (see FIG. 4a) of each node, using a lookup-table, in the form of a high-speed random-access memory 231, termed "tag RAM". It is convenient, and relatively economical, to use writeable memory for the tag RAM, thus greatly enhancing system flexibility. The tag field associated with every slot (i.e. every clock cycle) is decoded as an address into this table. Thus, the tag RAM must be FAST, as every network cycle gets piped through it. Consequently, it is provided with an input register 232 and output register 233. If necessary, simple memory interleaving schemes, well known in the art, can be employed to facilitate this (within limits, of course). Interpretation of the resultant codes is performed by state machine 234. It is desirable that the number of available tag values significantly exceed the number of nodes, and even the square of the number of nodes, if unique communication channels between node pairs are desired.

Figure 4A:
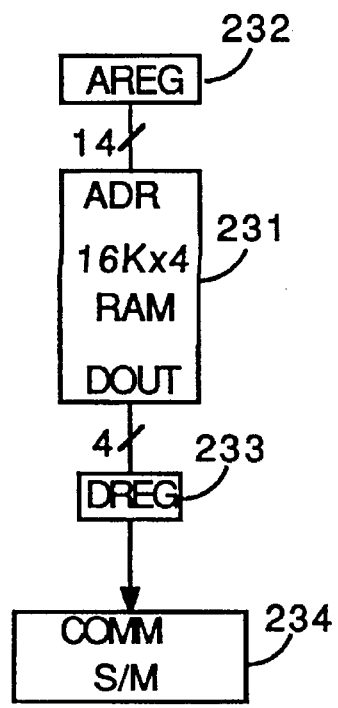
FIGS. 4a,b,c show details of processor node tag RAM and address logic.
Figure 4B:
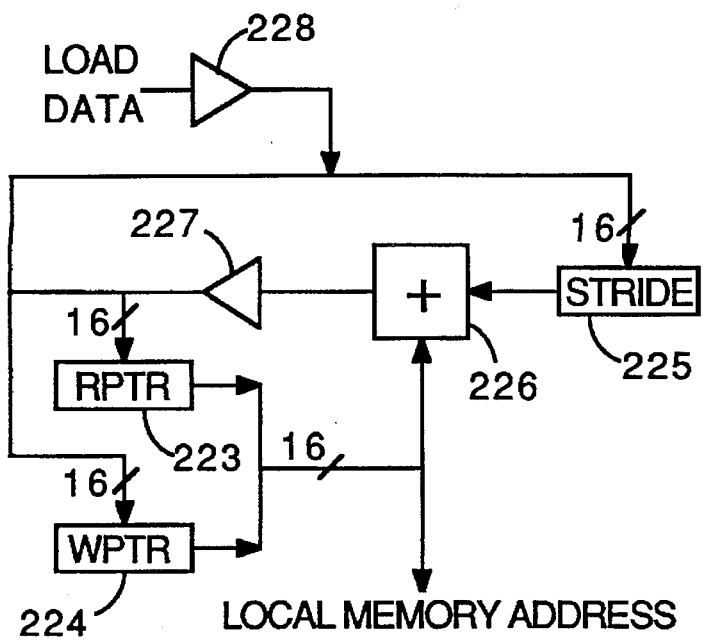
Figure 4C:
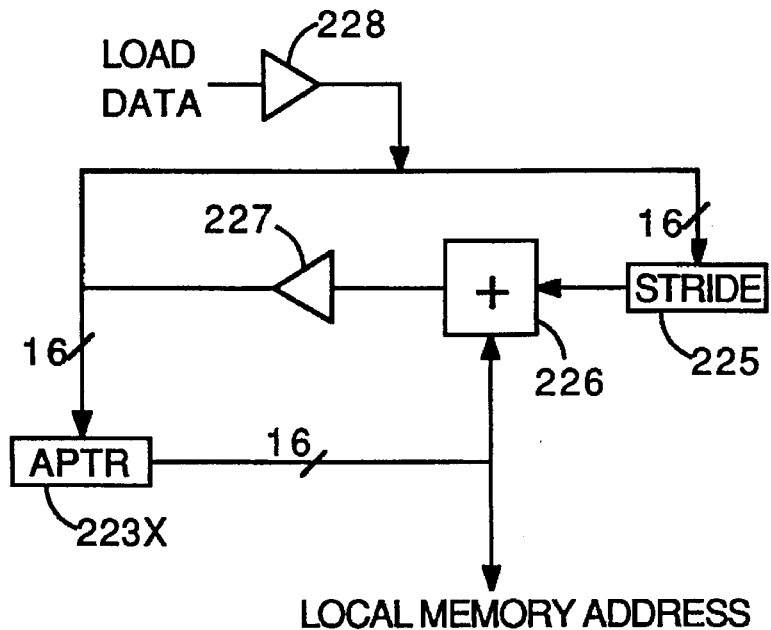
Figure 5:
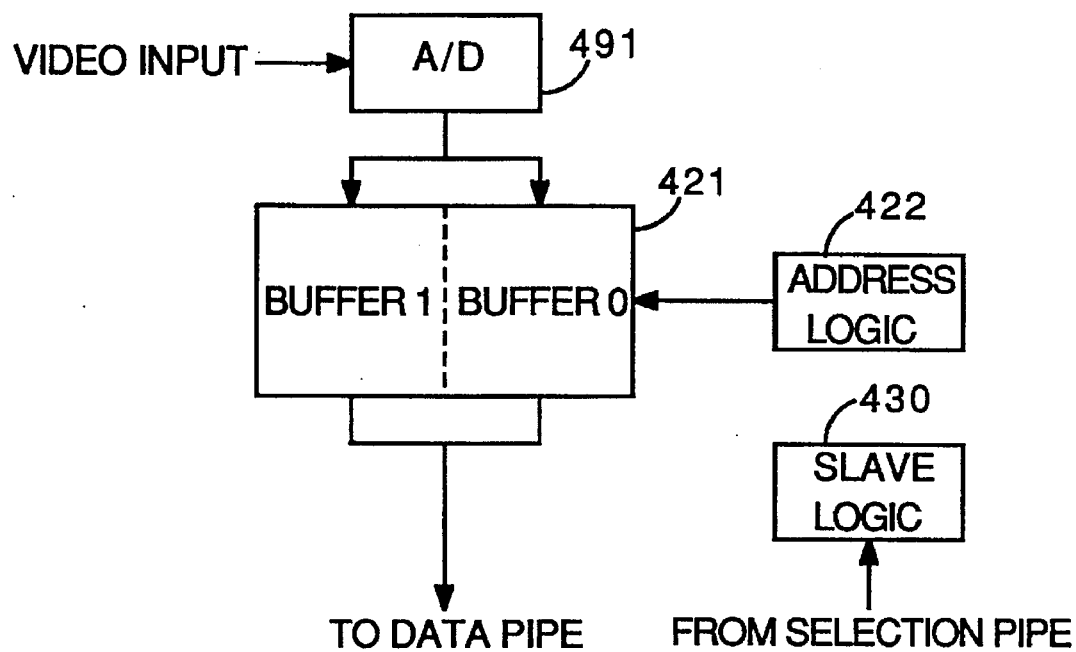
FIG. 5 shows a block diagram of a video input node.

Upon decoding a cycle corresponding to cases 1 or 2, slave logic 230 must perform an access to local memory 221. The memory address used, in this situation, is provided by address logic 222 (FIG. 4b). Registers in this logic are writeable from the network port, and include read pointer 223 and write pointer 224. A somewhat simpler implementation, illustrated in FIG. 4c, uses a single (common) address pointer 223X for reads and writes. For many modes of operation, this is adequate. But for some modes, the management of a single pointer becomes rather awkward, making the two pointer scheme, of FIG. 4b, desirable. (The hardware cost of the additional address register is relatively small).

Figure 19A:
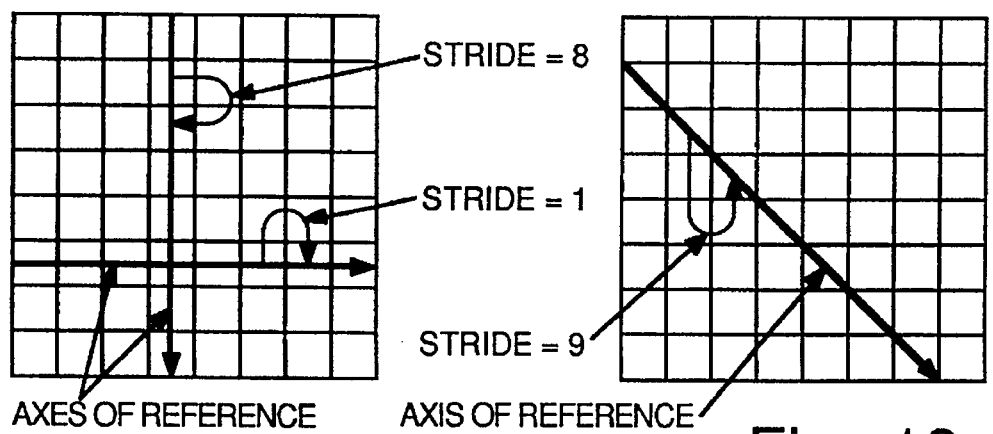
FIG. 19a,b,c illustrate stride functionality.

Following the reading or writing of a datum from or to local memory 221, a programmable stride, stored in a different special register 225, is added to the corresponding pointer 223 or 224 (This is an example of a side-effect), by means of adder 226. State machine logic causes the appropriate pointer to be presented to the adder input, and output buffer 227 to be enabled. In the case of the implementation varient, shown in FIG. 4c, common address pointer 223X is augmented following either a read or a write. Consequently, this ring network is optimized for sequential transfers of data in or out of the nodes. The stride register provides important addressing flexibility, e.g., allowing successive references to index stored 2D arrays along horizontal, vertical, and diagonal axes (FIG. 19a illustrates how these three directions of reference can be achieved in an 8×8 2D array, using strides of one, eight, and nine). In either implementation, any of the special registers can be loaded, with network-sourced data, following the disabling of buffer 227, in conjunction with the enabling of buffer 228 (which conveys the load data).

In this embodiment, the sharing of node local memory 221 has a rather coarse granularity, with processor 210 being blocked from that memory for, perhaps, several dozen cycles at a time, while the slave logic 230 transfers blocks of data to or from local memory. In a different (more costly) embodiment, this sharing could have a finer granularity, or even be totally transparent ("cycle stealing," for example).

Occasionally it is useful to have nodes with the sole, or principal, capability of providing one or more pipeline stages, essentially for timing and buffering purposes. Strap node 300A (FIG. 1) possesses registered data and tag buffers 302 and 304, respectively, in addition to terminators 309A and 309B. The former two are bidirectional, and responsive to global direction signal DIR. The latter two serve to terminate clock rails, and are further explained below. Jumper nodes, possessing only the buffers, are used to fill otherwise empty system slots, so as to maintain point-to-point continuity of the ring. Strap nodes and jumper nodes normally contribute a single pipeline delay stage to the overall ring network. The TCTLR, in this embodiment, will be seen to generate tags in groups (i.e. multiples) of four. It turns out to important that the total pipelined delay of the ring also be a multiple of four (to permit phase alignment of recirculating read data, and incoming tags). A total of 76 delay stages is convenient for a default configuration, and will be assumed.

Tags

Each tag value corresponds to (i.e., addresses) a particular location in the tag RAMs of all slave nodes (processor or otherwise) on the ring network. A tag value which is thereby mapped, by a given node's tag RAM, into a non-zero (i.e. non-null) tag type is considered "assigned" to that node (for whatever purpose the addressed tag type defines). In a sense, the most interesting tag value assignments are those associated with local memory data access. By convention, "assigning a tag value to a node" (or equivalent usage) means for the purpose of data access, unless otherwise stated. Since the tag RAMs of the separate nodes have independent contents, it is possible for a given tag value to be assigned to multiple nodes, hence selecting them all for reading or writing. (This same tag value must be defined as a NOP in all unselected nodes.) Multiple tag assignments are crucial in much of what follows, and are the basis of multiple-selection, alluded to above.

The width of the tag RAM is dictated by the number of action types required by a given node variety. These types, which correspond to data and control reference, will, in general, be small in number. (The issues here include not only the monetary cost of RAM width, but also the time delay cost involved in decoding a wider field.) In this embodiment of the processor node, a four bit field suffices. The sixteen resulting tag data codes, termed "tag types", include codes for setting and clearing the local R/~W-bit (as side effects), as well as for signalling a data access to the node local memory. (On account of the R/~W-bit functionality, a single DATA-ACCESS tag type, per node, suffices.) Other types are defined for managing the special registers on the node, in addition to a null or NOP code (by convention 0), which tells the node to ignore the slot.

The totality of tag values (typically 16384 or more in number) constitute a limited resource, within a given ring. Each one (of those actually in use) is assigned to some operation on a node or group of nodes. This is accomplished by loading the tag RAM address numerically equal to the tag value of EACH node with the tag type code corresponding to the desired operation. That is, each node (all varieties) must have an entry for all tag values defined within the ring. Since tag values generally operate on a selected node or group of nodes, for most cases this value will be the tag type corresponding to NOP. For the selected node, or group, the tag type code of the desired operation is used. For example, system tag value 5000 might be assigned to node #10 for the purpose of setting its R/~W-bit (i.e. putting it in "read" mode), by loading the 4-bit tag type corresponding to the latter operation into location 5000 of node #10's tag RAM, and loading NOP into the corresponding location of the tag RAMs of all other nodes. Similarly, 5001 might cause the same node to clear R/~W. If in a particular application, even-numbered nodes are often in the same R/~W state, it might be convenient to assign tag values 5000 and 5001 (respectively) to ALL even-numbered nodes, for the purpose of setting and clearing (respectively) the R/~W-bits in those nodes. Tag values 5002 and 5003 might be assigned to all odd-numbered nodes, for the same purposes. Finally, a tag value (or more generally, a set of values) must be assigned to each node for the purpose of data access, i.e., causing it to source or accept data (depending on the setting of R/~W).

It should be noted that the tag TYPE used for assigning any tag VALUE to a given node for a particular purpose will always be the same. Thus, all locations in a node's tag RAM, corresponding to NOP tag values will contain zeroes. Codes for tag types are typically "hardwired" in to a node, via a PLD (e.g. state machine 234). Tag types are a NODE resource, whereas tag values are a SYSTEM resource. A certain number of system tag values (around 10 per node) are normally expended in supporting various "housekeeping" functions, such as setting/clearing the R/~W bit and loading the local address registers. A 16K×4 RAM (providing 16K distinct tag values) turns out to be a reasonable lookup table choice for a 64-node network, given current memory costs. (The potential benefits of a larger tag RAM are not, however, to be dismissed.) Here, around 640 values might support housekeeping, with another 4032 (64×63) providing a unique (directed) communication channel between each ordered pair of distinct nodes, leaving over 11,000 tag values for defining other communication patterns.

As an important simplification, the offset, or latency (in clock cycles), between the decoding of a tag and (either) the driving or sampling of the network port is a system constant, determined by the slowest path involved (typically the local memory read). Consequently, write data must typically be held for a few clock cycles to conform to this rule. It should be noted that this offset between tag and (read or write) data is unaffected by intervening pipeline stages which are not selected by the tag. For example, the presence of dummy pipe stages (these will turn out to be quite useful) affects system latency, but not the throughput or the selection mechanism.

Traffic Controller (FIGS. 1,4)

The generation of tags is performed centrally by TCTLR 100. The most notable feature of this subunit is sequencer 160, a programmed unit which drives a continuous stream of tags, at a nominal rate of 60 MHz, into the selection pipe of the ring network. The sequencer is provided with program memory, as well as a mechanism for driving (occasional) constants into the data pipe. (These constants are most commonly used for loading special address registers in the nodes.)

As the source of all tag values TCTLR 100 achieves direct control over data transfers within the ring. Sequences of tag values (and constants), residing in sequencer 160 program memory, as routines, or program segments, constitute precompiled traffic flow patterns. Consistent with the literature, these programmed flow patterns will usually be referred to herein as "phases" [e.g., D. A. Reed, et al. IEEE Trans. Comp., July 1987, p. 845–58].

Bidirectional registered data buffers 102A-C intersect the data pipe in three places, for trace length considerations. Thus the TCTLR presents two additional pipeline delays (this is actually implementation-dependent), for data recirculating back around the network. A different situation occurs in the selection pipe, due to the presence of sequencer 160. As the latter is the source of all network tags, selection information does not recirculate through it. Rather the sequencer must continue to generate tags at all times. Depending upon the direction of operation, one of registered buffers 104A or 104B drives tags into the selection pipe. Buffer 104C provides an additional pipeline delay, for equalization, relative to the data pipe.

Though not counted as a "node", the TCTLR shares a number of features with the latter, being part of the same network pipeline. For example, it is provided with a processor 110, similar to those in the nodes, termed the "local host," as well as block of local data memory 121. Like local memory 221 of the processor node, this memory is dual-ported, being accessible via the ring network port, as well as by local host 110. The TCTLR also has a block of logic 130 which is essentially identical to processor node slave logic 230 (FIG. 4a). With this logic it monitors the tag field of the selection pipe, just like one of the nodes. Thus, some of the tag values which the TCTLR inserts into the selection pipe signal reads from or writes to its own local data memory. A hardware restriction dictates that read transfers from memory 121 to the (other) nodes of the ring must occur in the clockwise direction. Conversely, write transfers from the nodes to memory 121 must occur in the counter-clockwise direction. Address logic 122, essentially identical to processor node address logic 222 (FIG. 4b), has analogous address functions to the latter. As a varient implementation, a single (common) address pointer can be employed, analogous to pointer 223X, shown in FIG. 4c, and discussed above.

TCTLR local host 110 has a second port, giving it access to external memory 190. The latter is shared, in a manner detailed below, with external host 600. External memory 190 is used for the downloading of programs and data, as well as for subsequent communications between the external host and the ring network. (This is not to preclude the existence of other specialized nodes, for the handling of higher communication rates, than can be supported via external memory 190.)

It will be noted that the TCTLR contains two programmed units (excluding PLD-based state machines): sequencer 160 and local host 110. The latter is, however, to be regarded as an autonomous processor and extension of the external host. When TCTLR actions, or "code" are discussed herein, it will always be in relation to sequencer 160, unless otherwise stated. For example, interlock signalling between "TCTLR and processor nodes" refers to protocols between sequencer 160 and the nodes.

Network Phases

It is convenient to distinguish several different phase classes, with the broadest consisting of input phases, communication phases, and output phases (the order in which they typically occur, cyclically). "Input" phases are those in which data is distributed from some source, such as a host or an inputting device like a camera, to the various nodes. In the course of processing this data it will typically be necessary to perform a series of inter-node data transfers of an application-specific nature. These phases will be termed "communication" phases. Finally, upon completion of the required computation the processed data, or results, will normally be sent somewhere, perhaps back to the source host, to a display, or on to another (separate) ring network structure. Phases accomplishing this last task will be called "output" phases. Phases from different classes may also be interwoven, for example with the inputting of one data set proceeding concurrently with the outputting of results from another (earlier) data set as well as with the communication phases associated with the processing of a third (intermediate) data set. Such interwoven phases can also be viewed as composite phases.

Phases, notably those associated with communication, will often consist of sequential components. For example, a linear shift will typically have to proceed in two pieces, due to the fact that nodes (in the preferred embodiments) cannot both read and write data simultaneously. Thus, an "even" phase might treat the even numbered nodes as sources, followed by an "odd" phase, treating the odd numbered nodes as sources. In these cases the total, composite, phase will be termed "major" and its component phases "minor". Thus, the global shift is itself a major phase, composed of two minor phases: even and odd. In the case of an exchange there will be four minor phases, with an even and odd phase in each direction being required. (The terms "major" and "minor" are somewhat relative. For example, a major phase in one context might be a constituent phase in another. Similarly, a minor phase in one context might be useful as a stand-alone entity in another. The notion of structure is the important idea, here.) A phase may be considered "atomic," if it has no constituent phases, at least in the reference context.

I/O (FIGS. 1, 4, 5, 6)

As sketched out thus far, the only I/O facility is via the external host, by way of external memory 190. Data so obtained can be collected by the local host in its local memory 121, prior to distribution among the individual nodes. Similarly, processed results, collected in local memory 121, can be relayed back to the external host, via external memory 190. While, strictly speaking, this constitutes a form of I/O, other more direct forms are important, especially in video-related applications.

It will be recalled that references to TCTLR data memory 121 appear as tags in the input or output phases. In a variation of this scheme, input data references are directed to specialized video-input node 400. The latter, illustrated in FIG. 5, possesses a video digitizer 491, together with double-buffered video memory 421 to store the incoming video data. This node, can be easily constructed from off-the-shelf parts, using techniques well-known in the art. Such a node has a much in common with the processor node, including: slave logic 430 (similar to that shown in FIG. 4a) which monitors the selection pipe, and address logic 422 (similar to that shown in FIG. 4b), which provides addresses for network references. Here, housekeeping tag types will include specialized ones for toggling between buffers, and configuring an on-board video controller. Double buffer 421, shared by digitizer and slave logic, is analogous to the processor local memory. In a further variation of this arrangement, a video input node may possess no (sizeable) buffer, requiring the digitized data to be driven directly onto the ring network (and thence to its destination) in real-time. (The latter mode of operation is supported by the preferred embodiment, in that the processor nodes are capable of accepting or transmitting network data at video rates.) Still other specialized nodes can serve, in similar ways, as interfaces to a wide range of input devices, including audio equipment and medical scanners.

Figure 6:
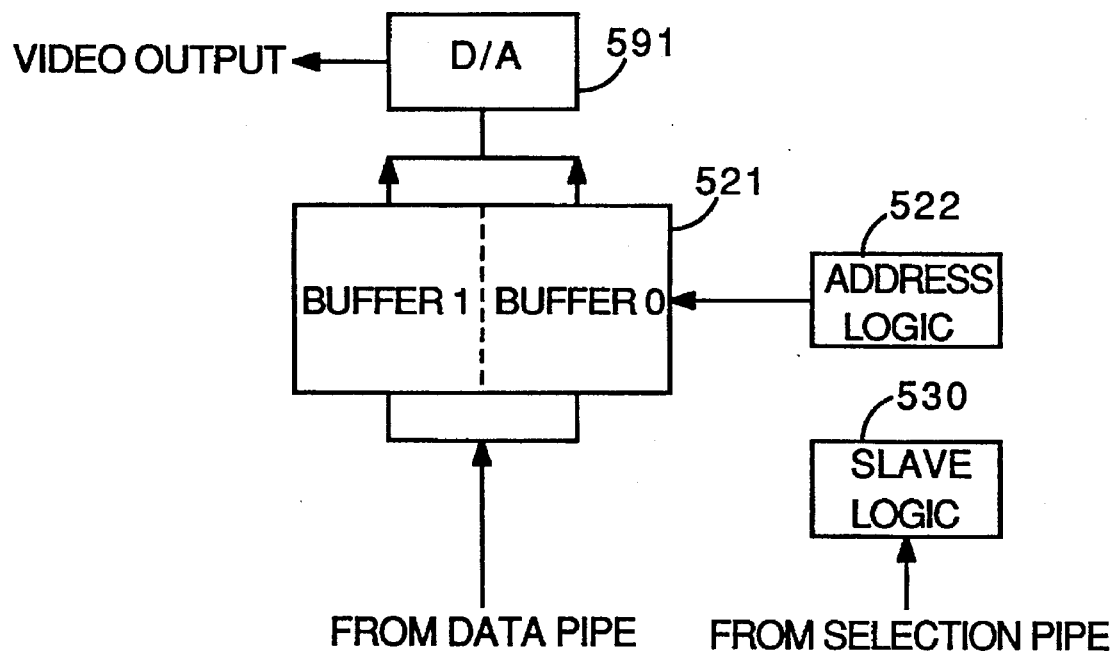
FIG. 6 shows a block diagram of a video output node.

The (input) mechanism just sketched out is reversible, in that data output from the nodes can be directed to a specialized video-output node. FIG. 6 illustrates video output node 500, equipped with double-buffered video memory 521, the contents of which drives a video display, by means of video D/A 591. Again, slave logic 530, monitors the selection pipe, while address logic 522 provides addresses for network references. The same analogies with the logic of FIGS. 4a and 4b apply. As before, special tag types are used to toggle between buffers and configure on-board hardware. In another analogy with the input mechanism, a video output node may possess no video buffers, but rather require data to be transferred directly to video DACs (again, a facility supported by the preferred embodiment). Still other specialized nodes can serve, in similar ways, as interfaces to a wide range of output devices, including audio and medical equipment.

Interlock signal ILOCK3 is provided to allow specialized nodes, such as those just outlined, to easily signal the TCTLR.

Interleaving

An important implementation dependent consideration is the rate at which a node can accept or receive data, relative to the clock rate of the ring net. As the latter can be quite small (less than 20 ns is practical, and even economical, with current technology), the issue of node memory access time, particularly for writes, become a limiting factor. This issue has been alluded to above, regarding tag RAM access times. In that instance there is no alternative to single cycle (read) access, as the node MUST be able to react to (i.e. interpret) every network cycle. This does not, however, mean that it must be able to sink or source information from the data pipe on every cycle. In order to keep node cost within reasonable limits, it will, in general, be desirable to restrict individual node access bandwidth to be some fraction of ring net bandwidth. For example, mandating that accesses to any particular node memory occur no more frequently than every fourth clock cycle, turns out to allow the use of relatively inexpensive static RAM for node memory. (Read accesses can actually occur on every other cycle, but we will ignore this extension for the sake of simplicity). IN THE ENSUING EXAMPLES, THIS PARTICULAR RESTRICTION WILL BE ASSUMED, UNLESS OTHERWISE STATED.

An important consequence of these bandwidth restrictions is that network access cycles can be interleaved. This is, indeed, necessary, if full network usage is to be sustained, or even approached. For example, if a given node is only being selected on every fourth cycle, the intervening three are fully uncommitted relative to that node, and available for performing transfers between other nodes. The implicit interleaving factor is an important network parameter and can assume different values. In some of the examples below factors of four and five will be used, values which turn out to be very convenient, given the (default) 4::1 ratio between network bandwidth and node bandwidth, mentioned above. In fact, a basic technology goal is to push the bandwidth of the inter-node links as far as possible beyond that of the local memories, thus actually allowing a large interleave factor. For it is precisely this factor (as will be seen below) that determines the range of "local" communication.

Figure 7:
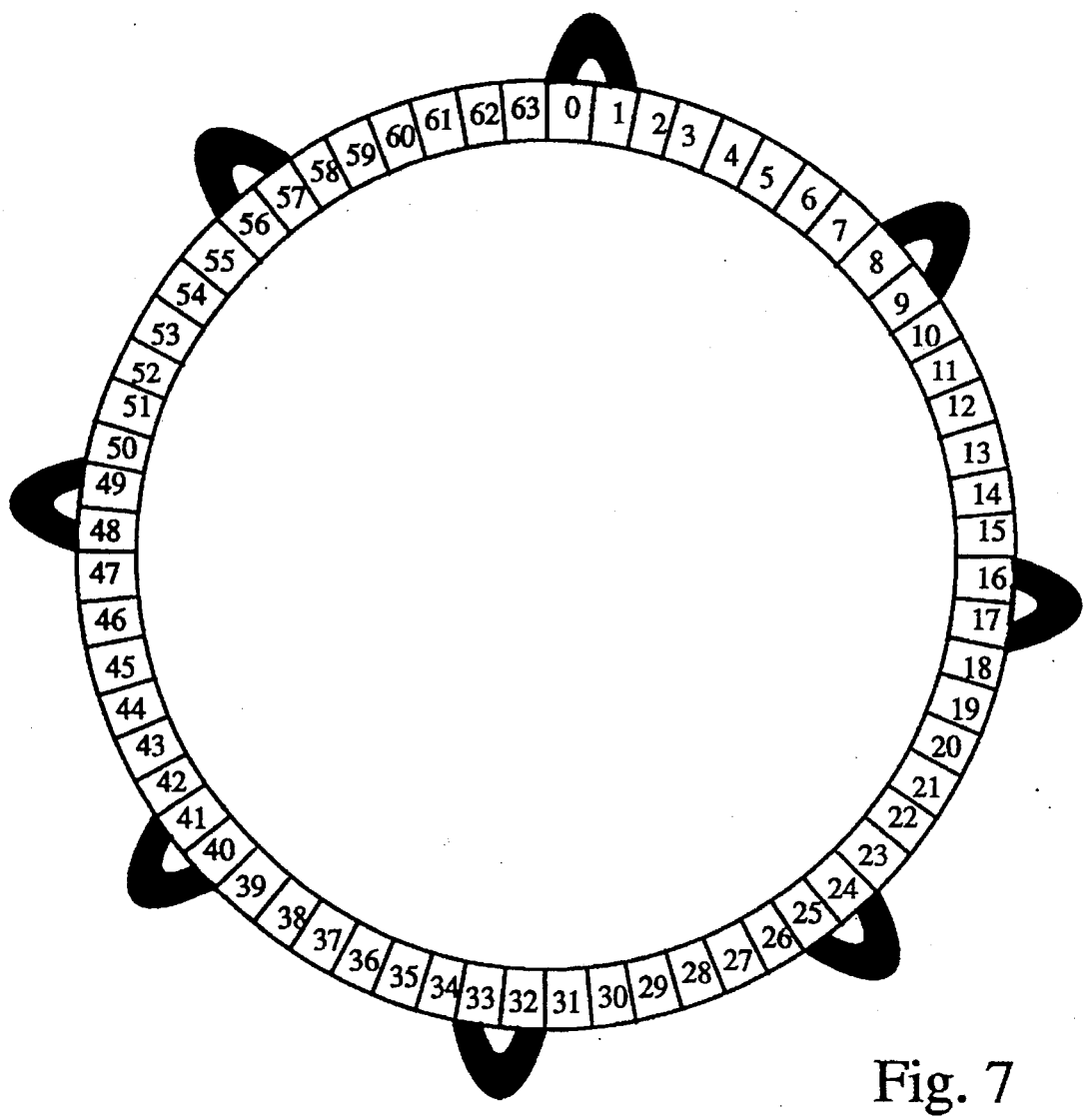
FIG. 7 represents a linear exchange (one channel).
Figure 8:
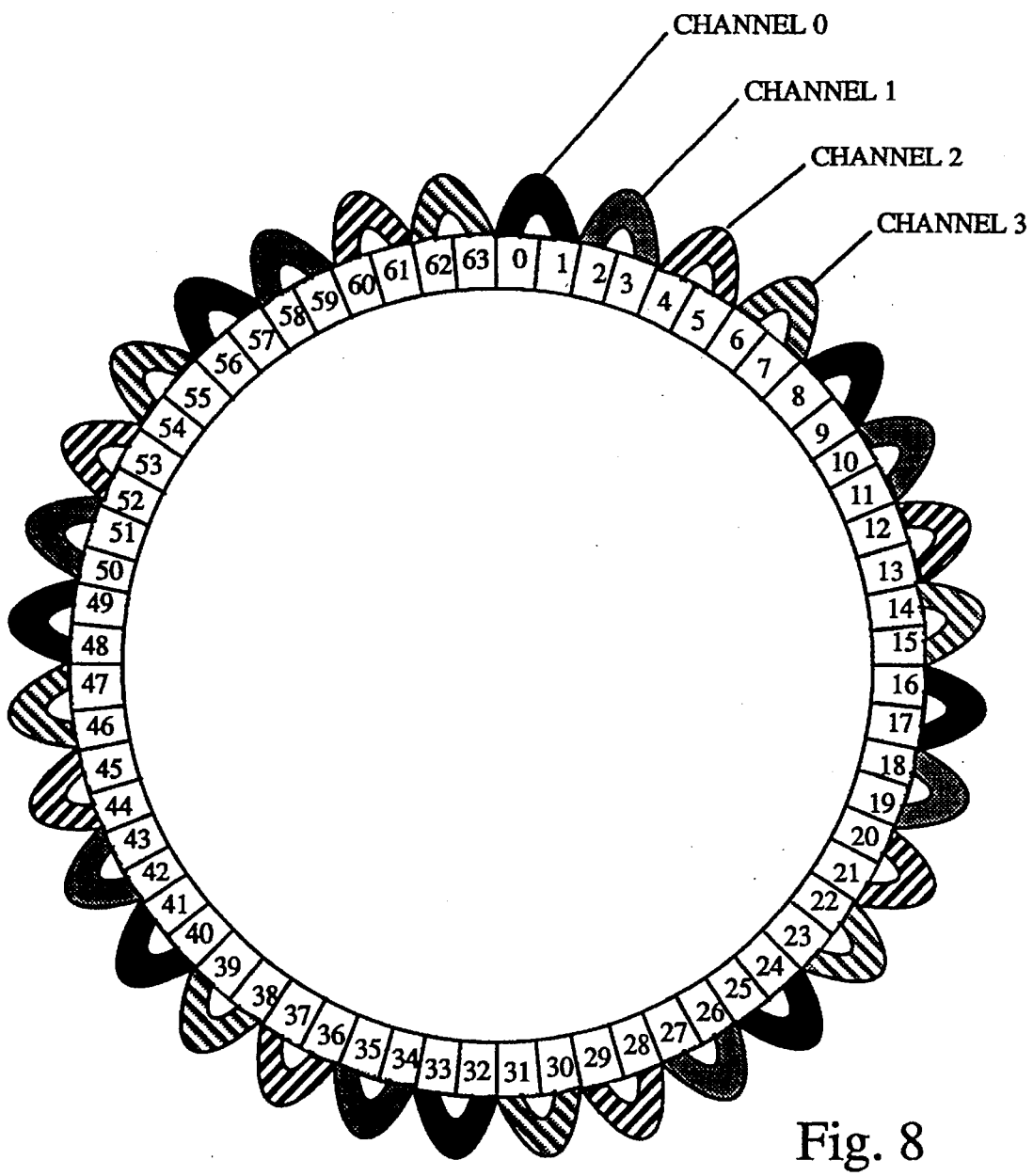
FIG. 8 represents a linear exchange (four channels)

Multiple-Selection and Static Communication (FIGS. 7,8)

One of the most important applications of the multiple selection feature, illustrated in FIG. 7, allows a single tag value to signal a chain of transfers between pairs of nodes around the ring. Here, a single tag value (1001, say) causes every fourth even-numbered node (#0, #8, #16, etc.) to transmit a datum to the odd-numbered node immediately above it, numerically. (The nodes involved in such transfers are connected in the figure, and in several succeeding figures, by arcs.) This is arranged by assigning tag 1001 to all nodes involved (#0, #1, #8, #9, #16, #17, etc.), and then enabling the even-numbered nodes for reading and the odd-numbered nodes for writing, via their individual R/~W-bit's. By sending a stream of slots containing tag value 1001 in a clockwise direction around the ring, the indicated data transfers occur. The limited local memory access of the nodes (assumed by default) requires that these slots be spaced at intervals of (at least) four. Data transfer in the opposite direction proceeds similarly, by virtue of the bi-directionality of the network. But first, the previous phase must be completed, if necessary, by appending a "zero trailer," i.e., block of 76 null tags (one for each node, or extra pipeline stage, assuming the default configuration). Then, odd-numbered nodes must be enabled for reading, and even-numbered nodes for writing. Sending the same tag value in the opposite direction around the ring now causes each odd-numbered node to transmit a datum to the even-numbered node immediately below it. In both of these (minor) phases the data slot associated with a given tag value is involved in a sequence of read-write events between successive distinct pairs of nodes as it makes a full circuit of the ring.

As the example stands so far, only every fourth slot (viewed, say, from the output port of the TCTLR) is involved in data transfer, resulting in sub-optimal usage of network bandwidth. This can be remedied by using several tag values. The basic idea is to assign four different tag values cyclically to successive pairs of nodes around the ring, for example:

Nodes #0, #1: 1001
Nodes #2, #3: 1002
Nodes #4, #5: 1003
Nodes #6, #7: 1004
Nodes #8, #9: 1001 etc.

(Note that the previous assignments have been preserved.) Now, after enabling even-numbered nodes for reading, and odd-numbered nodes for writing, sequence of tags cycling repeatedly through the four values:

1001, 1002, 1003, and 1004 accomplishes the same data transfer as in the previous example, but at full network bandwidth (i.e. in ¼th the time). The overall transfer effected is a useful one, comprising (half of) a nearest-neighbor (linear) EXCHANGE. FIG. 8 illustrates four independent transfer chains, each similar to that of FIG. 7, running concurrently, in an interleaved manner. A visualization format has been introduced here, consisting of a diagram of the ring, with textured arcs indicating communication links. (Links with the same texture belong to the same communication channel.) Each of the four can be viewed as constituting a separate (logical) routing "channel", spaced out in disjoint segments, around the flag. Each segment of a channel constitutes a communication "link" between a pair of nodes. A FUNDAMENTAL CONSTRAINT REQUIRES THAT LINKS OF A GIVEN CHANNEL DO NOT CROSS.

It should be noted that the same transfer could be achieved by assigning the same tag value (1001, say) to all nodes. Only ¼th of the available bandwidth would, however, be achieved, as (non-zero) tags would have to be space at intervals of at least four.

The sorts of communications sketched out in the previous example are termed "static", in keeping with the literature, for the reason that the resulting data flow patterns are fixed, or "pre-recorded". A very large and important class of data communications in parallel computing fall into this category, and, as will be seen, many of them can be implemented very efficiently, by the ring network elaborated in this disclosure.

Static Communication in 2-Dimensional Arrays
(FIGS. 9–19)

An important application class for this invention involves data in the form of 2-dimensional arrays (such as images). Many partitionings of such arrays are possible, with the rectilinear one being perhaps the simplest. A natural mapping of the resultant patch grid, into the ring network, has been given in FIG. 3, and will be used in several examples to follow. Within each patch we will assume that rows of elements in the 2D array are mapped into consecutive memory locations. If the width of the data representation of elements (and application-specific choice) is less than the data width of the physical node memories, it may be possible to pack multiple elements in a single memory word. Thus, 8-bit pixels, in image processing, can be packed four to a word in standard 32-bit memory systems. In this ease, a single word will contain four pixels from the same row in the image. Most processors, however, have no optimization for accessing such packed data, and may actually suffer in performance as a result. Thus, in the ensuing examples, it will be assumed that each 32-bit data word contains a single floating point datum, unless otherwise stated.

Figure 9A:
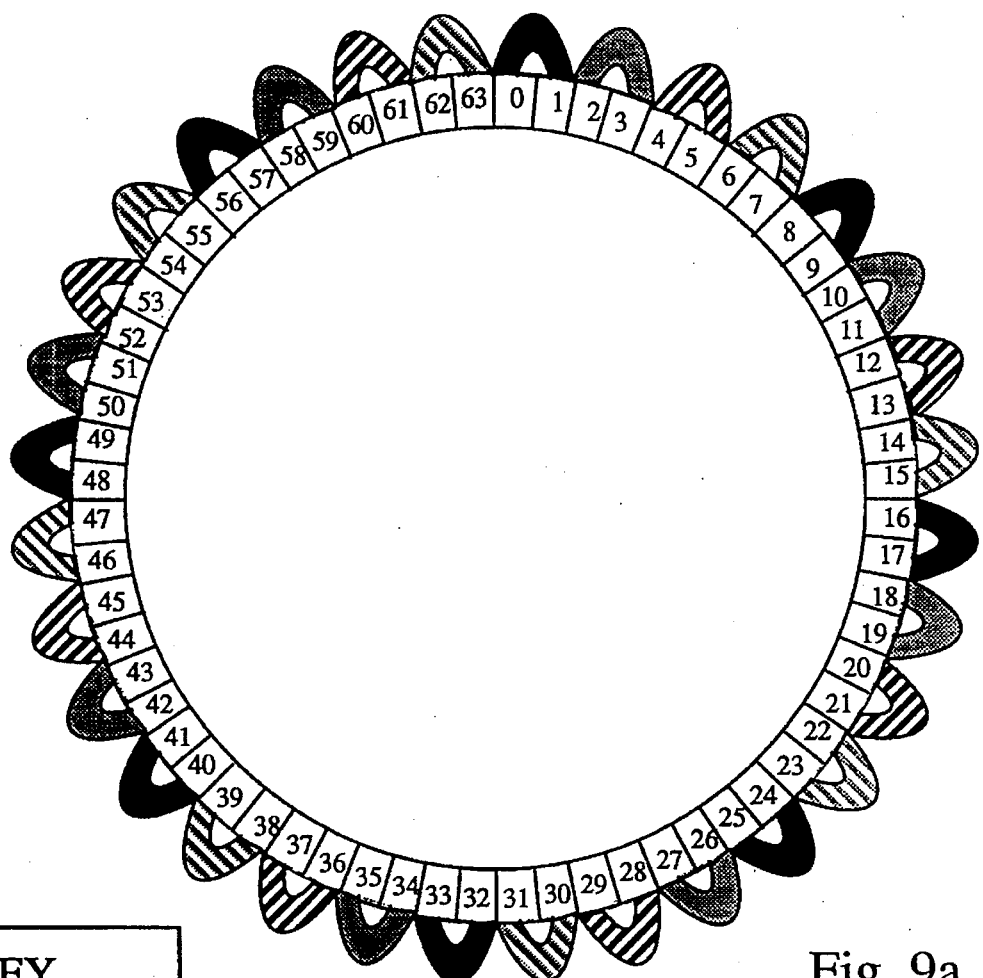
FIG. 9a,b represent HXE1 (horizontal exchange one, even).
Figure 9B:
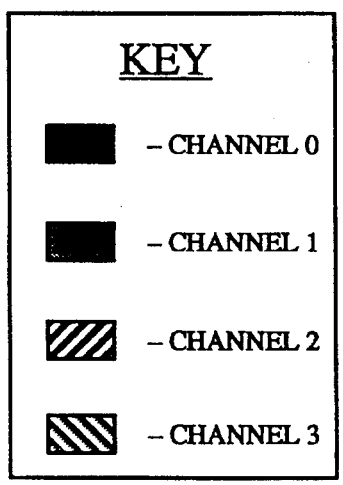

The class of exchange transfers, introduced above, have considerable relevance for communication in 2D arrays. Let us assume that image data (for example) has been distributed to the processor nodes, e.g., using a video input node, of the sort illustrated in FIG. 5. To achieve this, the TCTLR can schedule data transfers from the video input node, to the processor nodes, perhaps in a raster-style fashion. Thus, the camera image array might be scanned left-to-right, top-to-bottom, and distributed, as read, to the nodes, according to the organization of FIG. 3. Subsequent processing of the data will, in general, require communication of intermediate results between the various processors. The principle of locality of reference tells us that, statistically, the most important links are those between the owners of adjacent patches (horizontally, vertically, or diagonally). Again, assuming the mapping of FIG. 3, the previous example, in fact, constitutes part of a horizontal exchange among the nodes. FIG. 9 shows the same data transfer, together with the associated channel mapping in the embedded 2D array. The visualization format, introduced earlier, has been augmented with a representation of the 64 nodes, viewed as a 2D (embedded) array, showing exactly the same information, but in a different visualization format. The representation in FIG. 9a can be derived from that in FIG. 9b by scanning the 8×8 array from left to right, top to bottom, and noting the sequence of channel numbers (i.e. textures) encountered. The first time a channel number is intersected corresponds to the beginning of an are in the upper representation, and the second time to the end of the same arc. Similarly the third and fourth, fifth and sixth, and, in general, $n^{th}$ and $n+1^{th}$ time, will correspond to arcs. The notion, here, of an inferred pairing is crucial. Either, or both, representations may be used in the ensuing discussion, as required. (Subsequent examples will further illustrate this equivalence.)

Having recast the linear exchange transfer in a 2D framework, we will now consider it in more detail. As just stated, the communications represented in FIG. 9 constitute part of a horizontal exchange. Assume that even nodes are enabled for reading, and odd nodes for writing. Sending a steady stream of tags assuming the values 1001 thru 1004 clockwise thru the ring causes each even node to transmit a proportional stream of data to the odd node immediately to its right. This transfer constitutes a minor phase, which will be termed the "even-A" phase. Now, assume that the read/write enabling of all nodes is reversed, along with the (global) directionality of the ring. Sending the same stream of tags in the counterclockwise direction now causes each odd node to transmit a proportional stream of data to the even node immediately below it. This transfer constitutes a second minor phase, which will be termed the "even-B" phase. Since these two phases involve the same set of node pairings, or links, a single diagram serves to represent both of them, e.g., that in FIG. 9a. No explicit direction is indicated, as TWO phases, one in each direction are implicit, by virtue of the bidirectionality of the ring network. (This will typically be the case in such figures.) This phase will be denoted "HXEI" (horizontal-exchange-even-by-1), herein.

In the phases just defined, as well as those defined below, it is assumed that zero trailers are used internally, before global direction reversals. In other words, zero trailers must be appended to the ends of phases, so as to complete the required transfers.

Figure 10A:
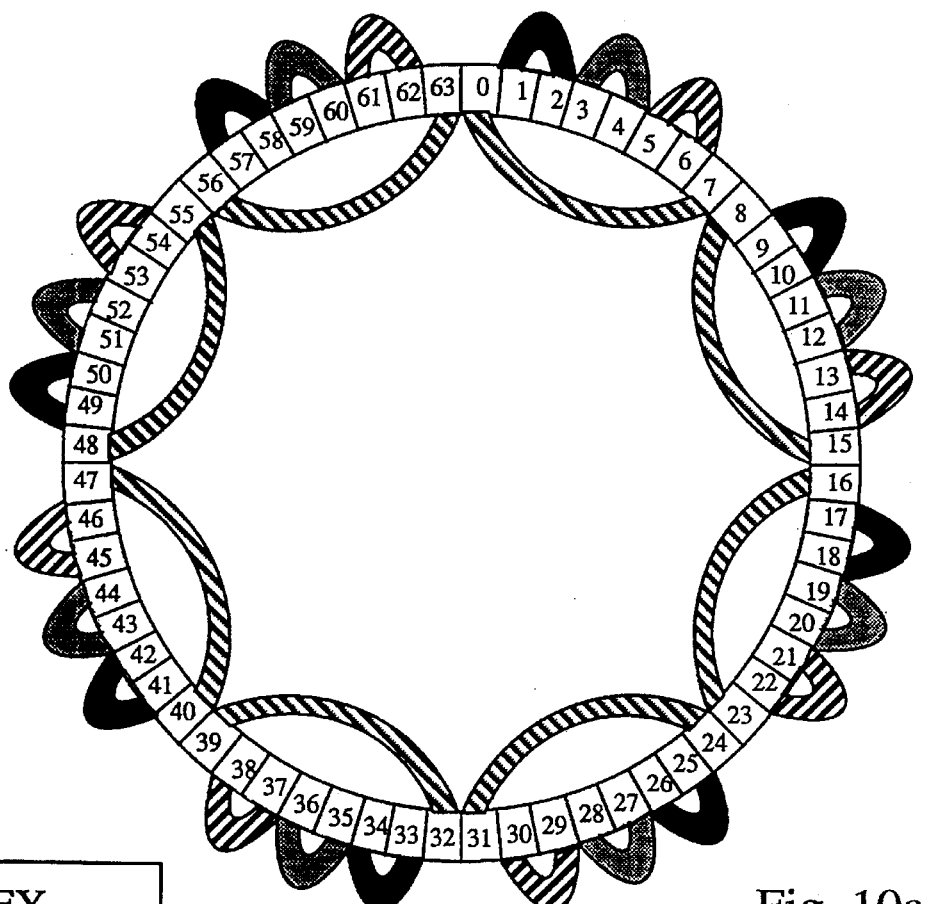
FIG. 10a,b represent HXO1 (horizontal exchange one, odd).
Figure 10B:
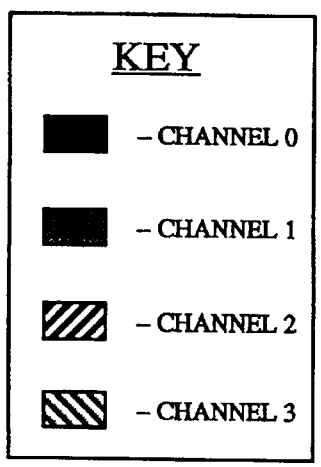

In order to effect a complete horizontal exchange between adjacent nodes, an additional two phases are required. The first of these effects transfers from each odd node (excepting those on the far right of the array) to the even node immediately above it. The second is the analogous transfer in the opposite direction. The outer nodes are connected toroidally (i.e. end-around—a connection which can be useful even in applications where the toroidal connection is not obvious, on the face of the problem). Four communication channels suffice, along with four tag values, e.g. 1005, 1006, 1007, and 1008. As before, there is a clockwise phase, "odd-A", and counter-clockwise phase, "odd-B". The R/~W-bits are handled in a similar manner. This phase will be denoted "HXO1" (horizontal-exchange-odd-by-1), herein, and is illustrated in FIG. 10. The full horizontal-exchange-by-1, composed of HXE1 and HXO1, will be denoted "HXI."

It is instructive to consider the actual numbers, e.g. transfer rates and concurrency. The clockwise half of HXE1 (FIG. 9a) serves to illustrate the situation. Here 8 independent communication links are simultaneously active in each of 4 channels, yielding a total of 32 concurrent transfers. Since each transfer is running at ¼th the network frequency, the end result is a 8-fold improvement over the base network bandwidth. For example, a 60 MHz network frequency of operation, together with a 32-bit (4-byte) data pipe, yields a 240 MByte/sec point-to-point, or "base" network bandwidth. This can be viewed as the rate at which a node can communicate with any other node (using, for example, one of the unique communication channels mentioned above), assuming both nodes are capable of communicating at that rate (not normally the case), and ignoring network contention. Thus, the horizontal shift described here achieves an effective network usage of 240×32/4=1920 MBytes/sec. The total time required for such a phase is equal to the amount of data transferred between node pairs TIMES the number of channels DIVIDED BY the base bandwidth (the "number of channels" factor reflects the lower bandwidth available to each, on account of interleaving). Assuming a 640×480 byte array distributed over 64 nodes, each link transfers 4800 bytes between a pair of nodes, resulting in a (minor) phase duration of 4800×4/240 MByte/sec=80 μs. The total duration of the entire horizontal exchange, consisting of four such minor phases, will be 80×4=320 μs.

This example illustrates a general rule regarding network usage. The EFFECTIVE NETWORK USAGE (of a minor phase) is determined by:

$$\text{base\_bw} * \text{concurrency}/\text{num\_of\_chan}$$

Where:

base_bw=base network bandwidth, as defined above concurrency=the number of transfers active during minor phase num_of_chan=number of channels, as defined above As stated earlier, bandwidths achievable by this architecture are highly implementation dependent. Those shown here are used consistently, throughout this disclosure, and may require the use of high bandwidth signalling technologies, such as ECL or GTL.

It is significant that a sparsely used channel accounts for the same fraction of the total time as an efficiently used one. The benefit of effective concurrency shows up indirectly, thru the smaller number of minor phases being required to complete a major phase. In the example used here, an effective network usage of 1920 MBytes/sec is optimal, in the sense that each node is transmitting or receiving data at the full rate for which it is capable, and all slots on the ring network are used. Phases which optimize the network, in this manner, will be termed "100% saturated". Similarly, a phase (or communication) will be termed "N% saturated" if it achieves N% of full (burst) saturation. We note that HXE1, HXO1, and HX1 are all 100% saturated phases.

Figure 11A:
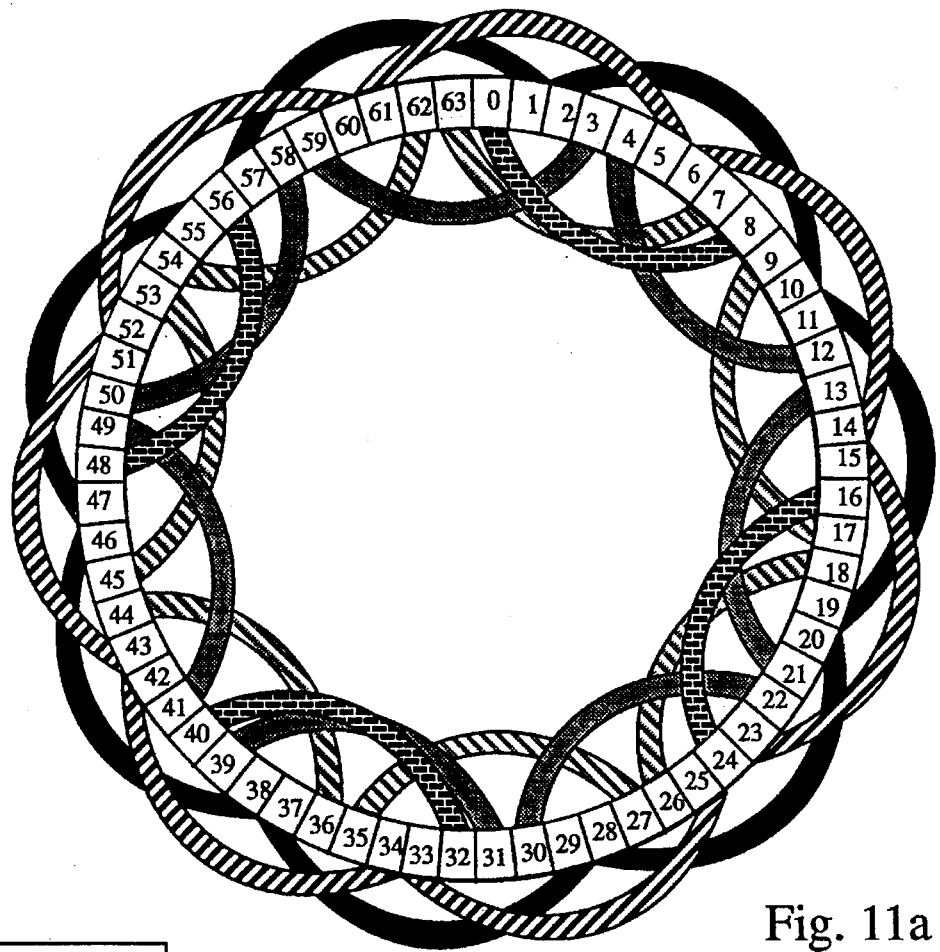
FIG. 11a,b represent VXE1 (vertical exchange one, even).

Whereas it is intuitively clear that, for the mapping in FIG. 3, local horizontal transfers should be efficient, it is perhaps less obvious that important vertical transfers can be effected with only a modest reduction of overall data throughput. The technique for achieving this is illustrated in FIG. 11. A fifth channel is employed here, effectively filling in the "gaps" left by a natural sequencing of the other four channels. 32 communication links are again achieved, but with a slightly lower bandwidth, due to the introduction of the fifth channel (i.e., nodes are now sending/receiving data on every fifth cycle). Again, the figure implicitly represents two minor phases, one in each direction (separated by the transmission of a zero trailer). Consider the clockwise phase. We see that node #2 transmits to node #10, #11 to #19, #20 to #28, and on around the ring to node #57, which transmits back to node #1. (The vertical transfer effected will be toroidal, in that the top and bottom of the array wrap around to each other). It should be noted that the communication links mentioned thus far are grouped together as "channel 0" in the figure. None of the links conflict or interfere with each other, and the very same slots can be used (and re-used) by all links in the channel.

The issue of channel overlap comes to the forefront here. For, concurrent with the transfers progressing in channel 0, an independent set of similar transfers is occurring in the set of links grouped as "channel 1". Here we see that node #4 transmits to node #12, #13 to #21, #22 to #30, and on around the ring to node #59, which transmits back to node #3 (toroidally). Though the links of channels 0 and 1 do indeed overlap in the figure, there is no conflict, since the slots used are totally DIFFERENT. Continuing, we see that transfers are progressing in two other channels, 2 and 3, in an identical fashion, again with no network conflict. Each of the channels 0 thru 3 has 7 active links, adding up to a total of 28. The total transfer (half of a 8×8 vertical shift), however, requires 32 links (64 nodes/2). The remaining 4 links are grouped as "channel 4". It should be noted that each of the 64 nodes are involved in (exactly) one of the four channels.

The following tag value assignments are made to the nodes in each of the channel groups (node numbers are in parentheses, at the right):

| | | |
|---|---|---|
| Channel 0: | 1010 | (1, 2, 10, 11, 19, 20, 28, 29, 37, 38, 46, 47, 55, 57) |
| Channel 1: | 1011 | (3, 4, 12, 13, 21, 22, 30, 31, 39, 41, 49, 50, 58, 59) |
| Channel 2: | 1012 | (5, 6, 14, 15, 23, 25, 33, 34, 42, 43, 51, 52, 60, 61) |
| Channel 3: | 1013 | (7, 9, 17, 18, 26, 27, 35, 36, 44, 45, 53, 54, 62, 63) |
| Channel 4: | 1014 | (0, 8, 16, 24, 32, 40, 48, 56) |

The (clockwise) transfer is readied by enabling all transmitting nodes for reading, and all receiving nodes for writing (via the R/~W-bits). Finally, by sending an unbroken stream of tags with the values 1010, 1011, 1012, 1013, 1014, 1010, etc., the vertical transfer is accomplished. The duration of this stream is (obviously) proportional to the amount of data being transferred between each pair of nodes. The reverse (counter-clockwise) transfer can be effected using the same tag value assignments, by simply toggling the state of the R/~W-bit in each node. The same stream of tag values, sent in the opposite direction, results in the reverse transfer. Note that for the TCTLR, this phase appears to differ only trivially from HXE1, consisting of a repeating sequence of five, vs. four, tag values. It is, of course, the tag assignments in the nodes which define the links.

Figure 11B:
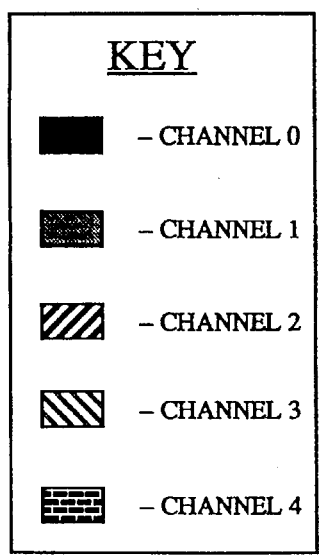
Figure 11B:
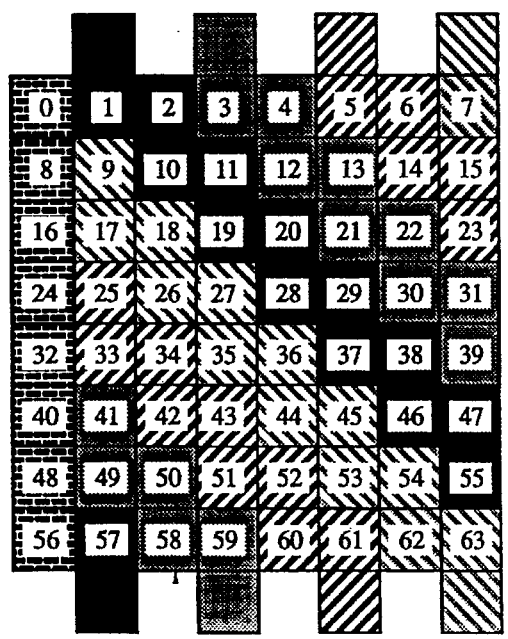
Figure 12A:
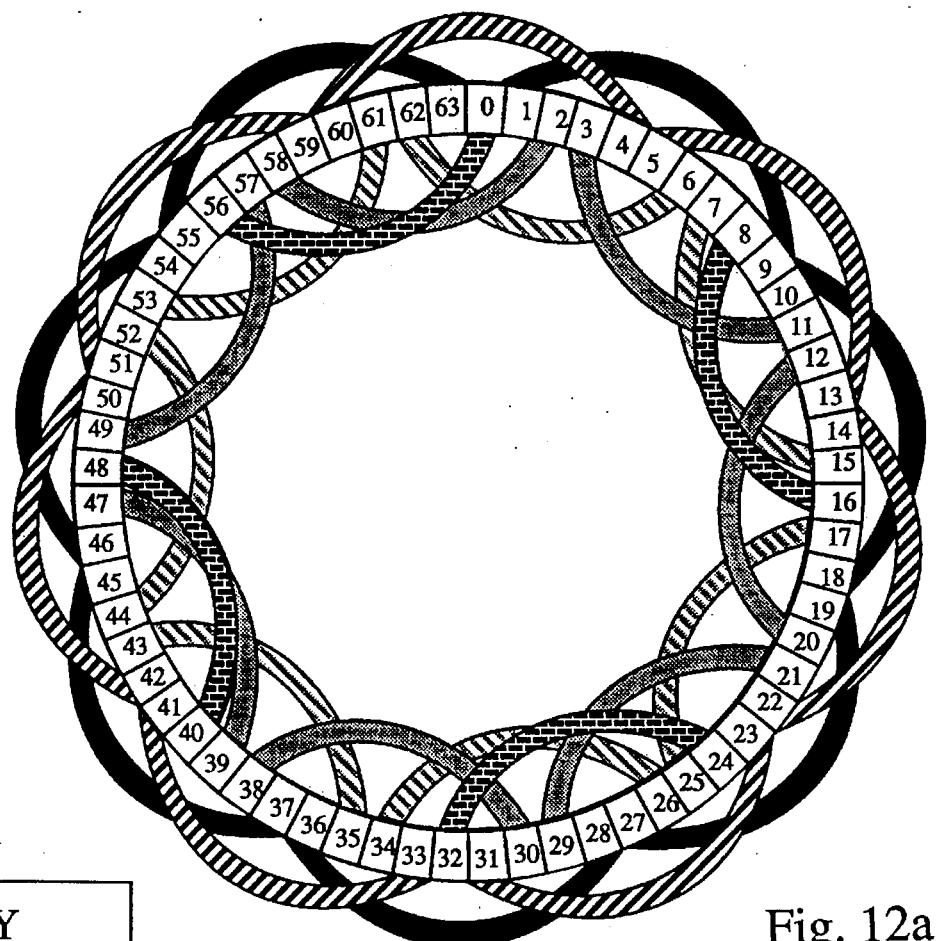
FIG. 12a,b represent VXO1 (vertical exchange one, odd).
Figure 12B:
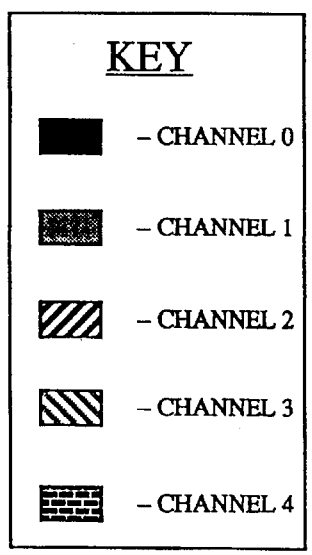
Figure 12B:
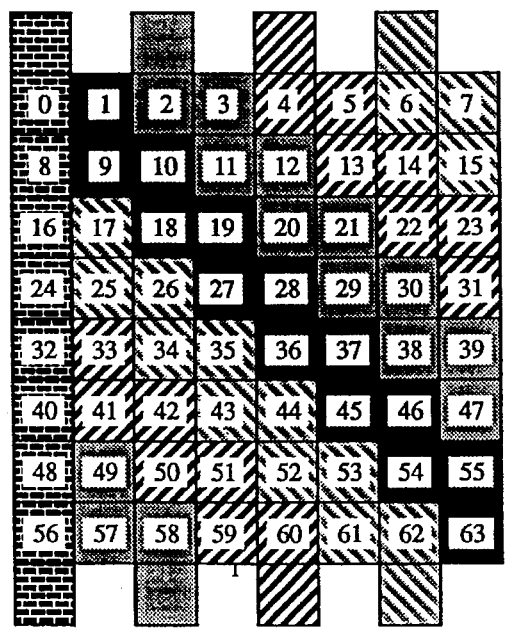

FIG. 11b shows how the channels, and links within them, map back into the embedded data array. The regularity of the patterns is clear. Again four minor phases are required to effect a full shift. Thus, in addition to the two (i.e. one in each direction) described above, denoted "VXE1", we require two more to effect a set of transfers essentially identical, but rotated one slot in the counter-clockwise direction. The latter, illustrated in FIG. 12, are (collectively) denoted "VXO1", and the full vertical exchange, "VX1." Using formulas derived above, the effective network usage in each of the four phases is seen to be 240×32/5=1536 MByte/sec, achieving 80% of saturation (again, assuming a toroidal, end-around, connection).

The five total channels present a densely interwoven pattern, yet in no instance do we have conflict or interference. This is because the different channels communicate via independent, disjoint, slots, traveling around the ring in parallel.

An important detail, related to toroidal transfers which straddle the TCTLR port, has been ignored, thus far, in the exposition of the vertical phases. (Such transfers correspond to toroidal links between the top and bottom of the embedded array, and hence are not an issue in transfers with purely horizontal components.) We will consider the clockwise case of VXE1 (FIG. 11; the counter-clockwise case is essentially identical). Now, a channel 0 tag (for example), injected between nodes #63 and #0, will effect a complete communication cycle (one word) from node #2 to node #10 (say), as soon as it passed the latter node. A similar transfer, from node #57 to node #1 (also assigned to channel 0), however, requires that the signalling tag pass almost completely around the ring, before effecting a read from node #57. Data associated with this (and subsequent such tags) must now pass through the TCTLR port, and then merge (properly phased) with the incoming tag stream, presumably containing (in the appropriate slots) tags signalling writes to node #1 (as well as additional reads from node #57). Consequently, write data for affected nodes is, in this situation, invalid, until the related tags have made a full circuit of the ring. For the sake of simplicity (and at the expense of some efficiency) we will, unless otherwise stated, assume that burst lengths associated with these transfers, are increased, and the data received at the beginning (typically the first 14–18 words) discarded.

Figure 13A:
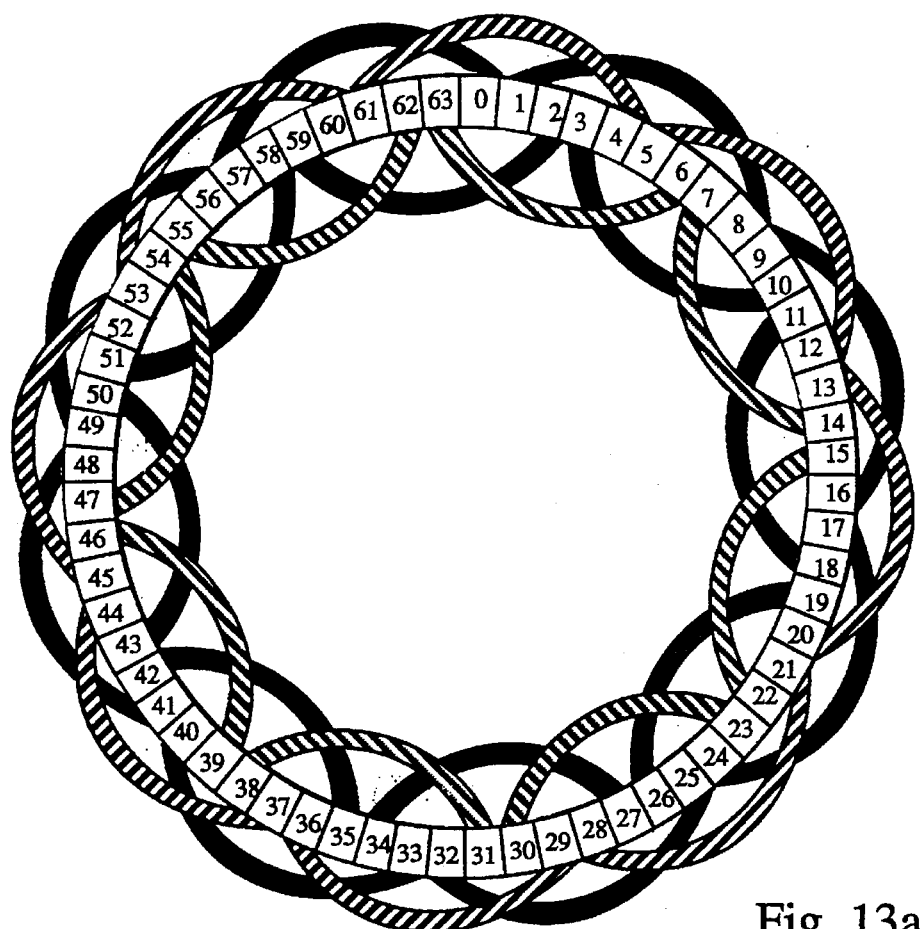
FIG. 13a,b represent DXSWE (diagonal exchange, SW direction, even).
Figure 13B:
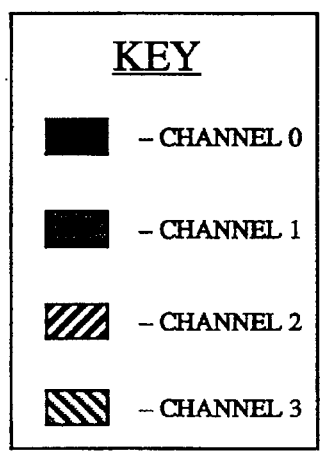
Figure 13B:
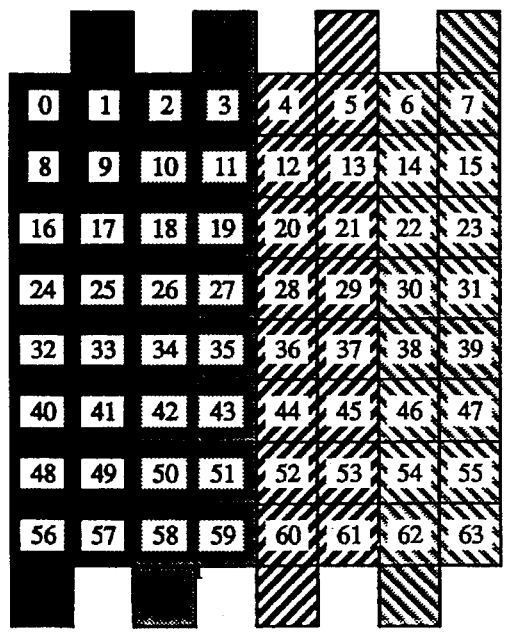

Efficient diagonal communications are also possible. The basic technique, similar to that of vertical communications, is illustrated in FIG. 13 for transfers along the NE-SW axis (viewing "north" as "up", of course). Thus, we see that in channel 0 node #1 transmits to node #8, #9 to #16, #17 to #24, and on around to node #57 which transmits to node #0 (after circling back through TCTLR). The other three channels behave similarly. Once again, four minor phases, each using 4 channels and 28 communication links, are required to perform the full diagonal transfer. A tag value assignment and control, quite similar to that of previous examples, suffices to effect data movement. This transfer will be denoted by "DXSWE". The effective network usage, for this example, is 240×32/4=1920 MBytes/sec. A similar phase (not shown), denoted "DXSWO," effects transfers along the same axis, offset by a node. A combined phase, DXSW, effects a full diagonal exchange along the axis. All three of these phases achieve 100% saturation. As these phases also have a vertical toroidal component, the considerations of the previous paragraph are applicable.

Figure 14A:
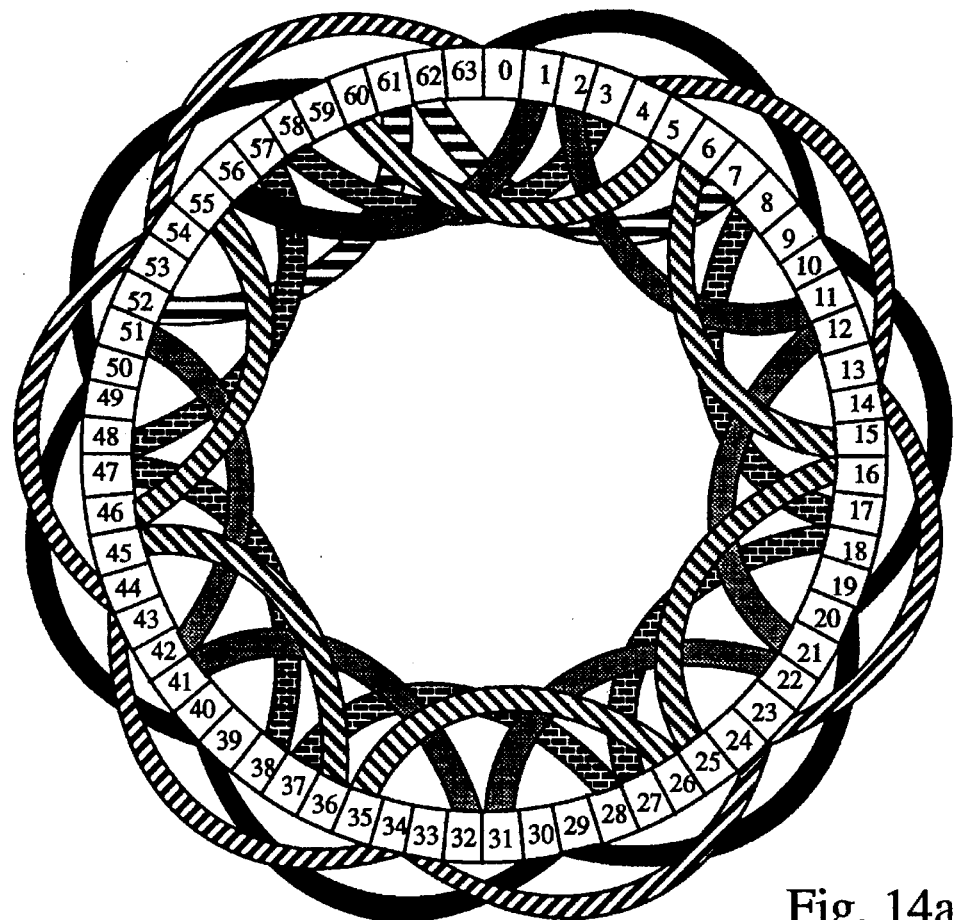
FIG. 14a,b represent DXSEE(diagonal exchange, SE direction, even).
Figure 14B:
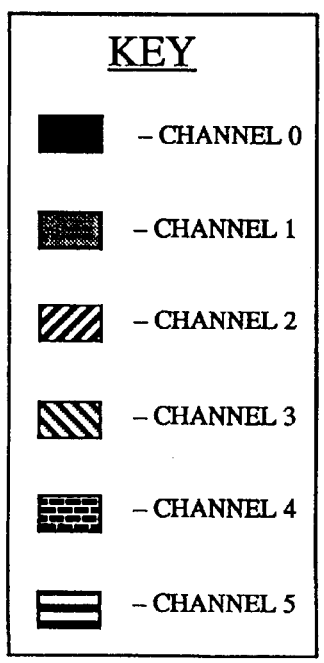
Figure 14B:
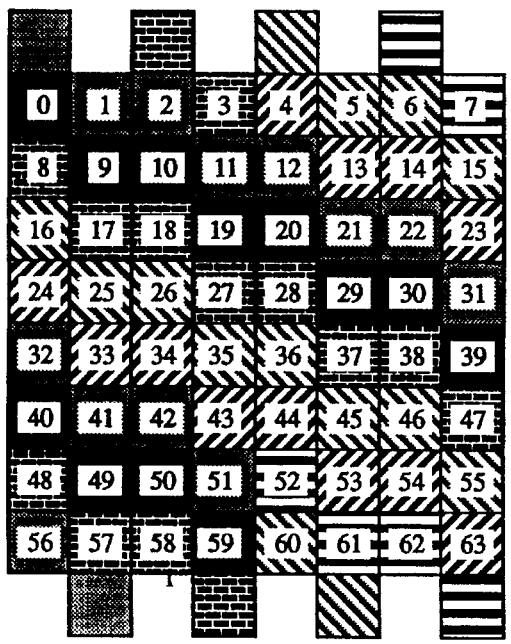

A somewhat different scheme, illustrated in FIGS. 14a–b, effects transfers along the NW-SE axis. As with the phases introduced above, toroidal connections have been included. The slightly longer communication span necessitates six channels. The resulting transfer will be denoted DXSEE. 32 communication links, in six minor phases are required to perform the entire diagonal transfer, resulting in an effective network usage of 240×32/6=1280 MByte/sec. A similar phase (not shown), denoted DXSEO, effects transfers along the same axis, offset by a node. A combined phase, DXSE, effects a full diagonal exchange along the axis. All three of these phases are 67% saturated. Again, as with DXSW, a vertical toroidal component must be taken into account.

Figure 15A:
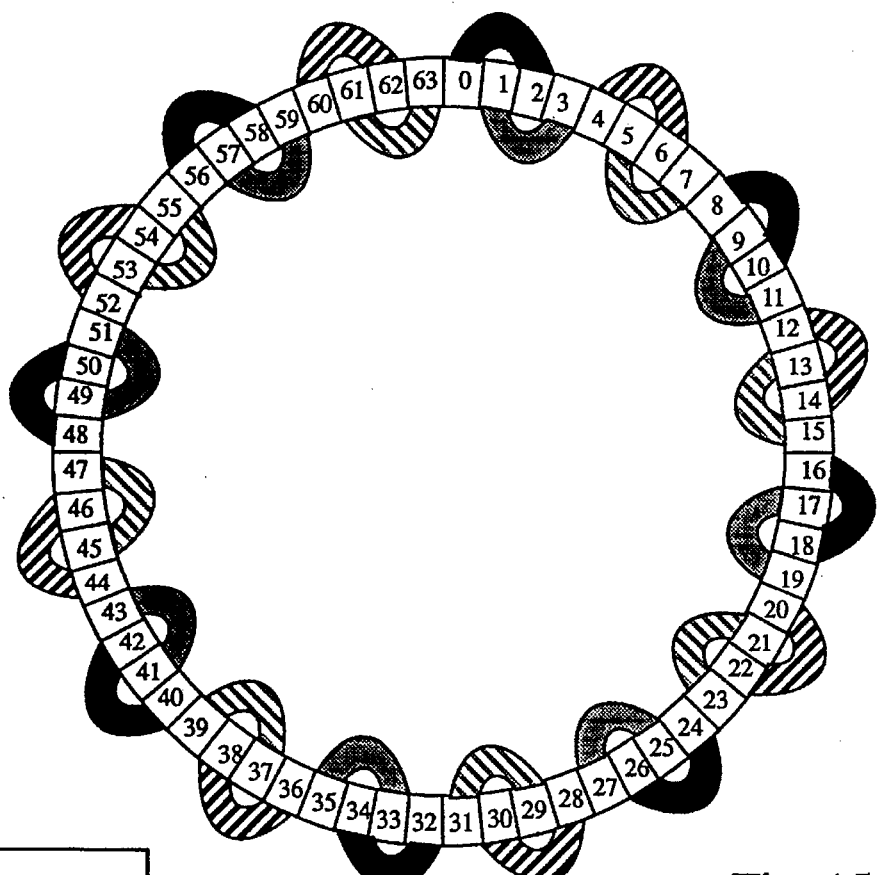
FIG. 15a,b represent HXE2 (horizontal exchange two, even).
Figure 15B:
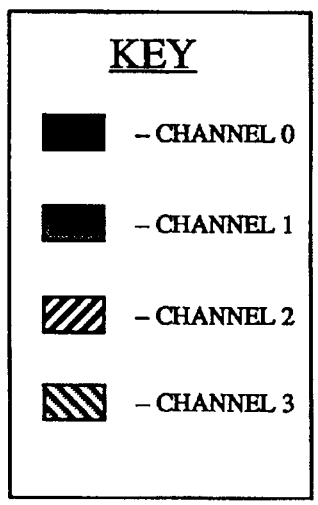
Figures 16A, 16B:
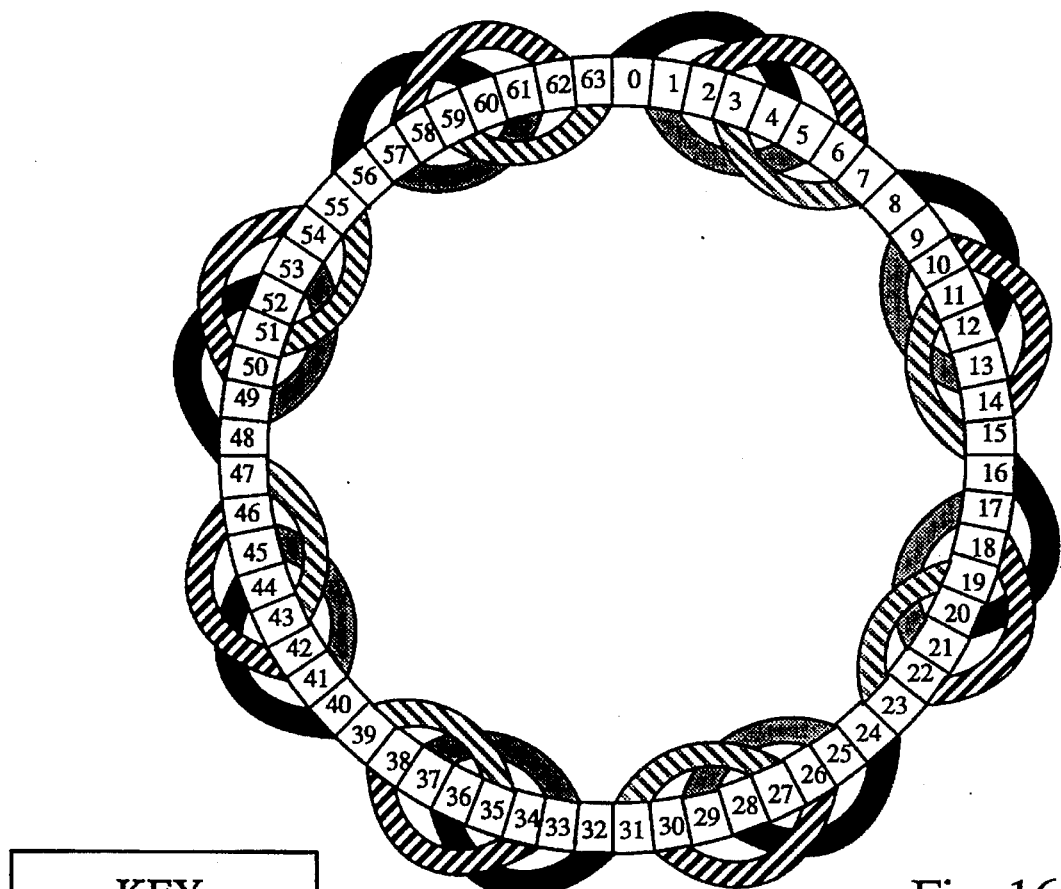
FIG. 16a,b represent HXE4 (horizontal exchange four, even).

All of the transfers described thus far have involved transfer distances (or "spans") of one node (though sometimes in a diagonal direction). It is also possible to effect transfers with larger spans. Horizontal exchanges within a row of processors (relative to FIG. 3) are particularly efficient, with exchanges spanning two and four nodes achieving full saturation, just as HX1. (This is fortuitous, since they are crucial in 2-dimensional FFTs.) These transfers will be denoted by HXE2 and HX4 (The notion of even/odd is not meaningful for spans of four or more, given the 8×8 node array assumed here, since in these cases, a node will communicate with at most one other node in its own row.), herein, and are illustrated in FIGS. 15 and 16, respectively. It will be noted that the "even" phases partition each row of processors into groups of two or four, counting (say) from the left edge, i.e., 0/2, 1/3, 4/6, 5/7. The "odd" horizontal exchange by two, achieved by shifting the groupings, i.e., 2/4, 3/5, 0/6, 1/7 (as with HXO1, a toroidal or end-around transfer is available if needed) will be denoted by HXO2, herein. A similar pairing of even and odd phases occurs in an exchange with span three. The resulting communications will be termed HXE3 and HXO3. Continuing, we can define exchanges with spans five, six and seven, denoted HX5, HX6 and HX7, respectively. The phases having spans of 3, 5, 6 and 7, as well as HXO2, are not shown here. Rather, varients of these phases, used in the 2D-FFT, will be illustrated below.

Figure 19B:
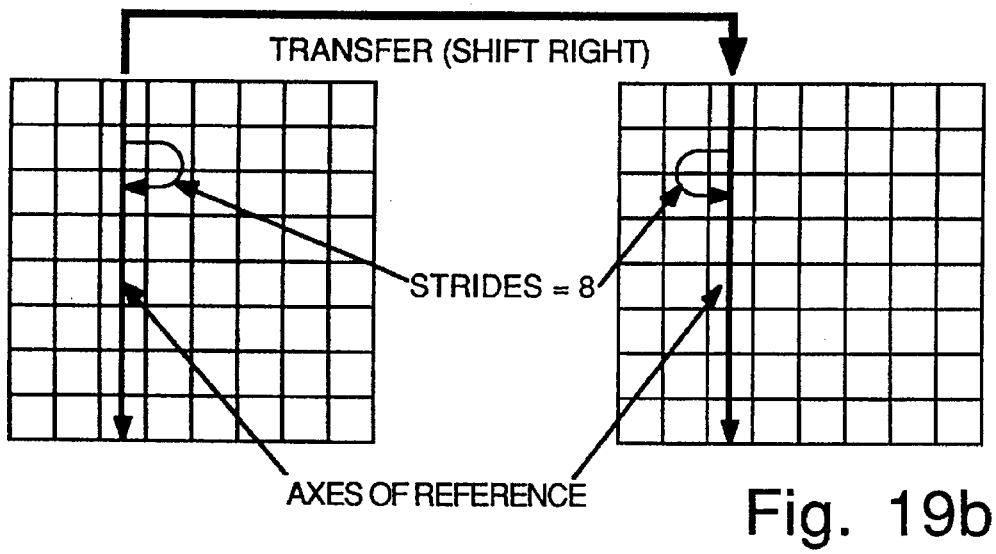

In some horizontal exchanges, notably those required for the 2D-FFT, the natural axis along which data is referenced, in both source and destination arrays, is orthogonal to the axis of the exchange, itself. This is illustrated in FIG. 19b, for the case of 8×8 patches. As shown, stride values of eight, in both source and destination nodes, result in the exchange of COLUMNS of data. The stride register functionality allows the node slave logic to address the patch array directly, along this axis, without the node processor having to intervene and reorganize (e.g. locally transpose) the data, thus avoiding a considerable overhead.

Spans larger than seven result in lower effective network usage, GIVEN AN INTERLEAVE FACTOR OF FOUR. Thus a span of eight, i.e. a vertical exchange by one, has already been illustrated, and shown to yield a network usage of 1536 Mbytes/see (vs. 1920 Mbytes/sec for the smaller spans). Still larger spans will result in further reduction of the effective network usage. Thus, it is the case that vertical exchanges with spans greater than one will be significantly slower than their horizontal counterparts. Consequently, the horizontal axis, in the node mapping of FIG. 3, is favored, relative to the vertical. It may be noted, in passing, that a higher interleave factor would permit longer spans (should these be necessary), while achieving an effective network bandwidth which is optimal, in the sense that all nodes are transmitting or receiving at the maximum rate which their local memories permit. Thus, an interleave factor of eight might be achieved by doubling the point-to-point communication frequency of the node links.

Figure 17A:
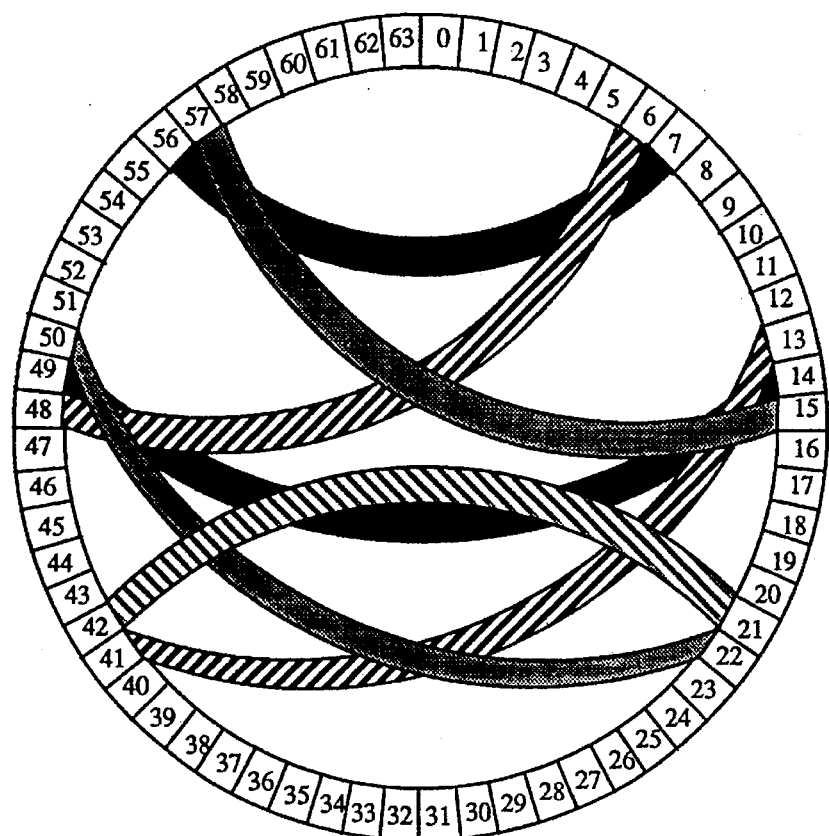
FIG. 17a,b,c,d,e represent XPSE (transpose).
Figure 17B:
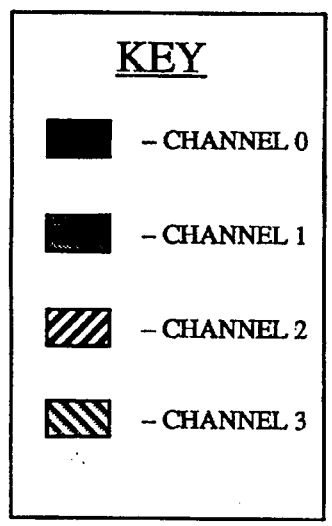

Another important variety of data transfer, the transpose, denoted XPSE, is illustrated in FIGS. 17a–e. The efficiency of this particular communication pattern is somewhat lower, on account of its inherently non-local components. Nonetheless, eight minor phases (compared with two, e.g., for HXE1) suffice to do the job (thus, achieving one fourth of the network usage of HXE1). A technique used here, involving "nested pairs", allows distant pairs of nodes to communicate in groups of two on the same channel. Thus, using four channels, seven links are established, as illustrated in FIGS. 17a–b. Note how a channel 1 slot can, in a complete circuit of the ring, effect transfers between nodes #22 and #50, as well as #57 and #15. As the data, in these cases, must pass back around through the TCTLR, before reaching its destination, the considerations presented above, in relation to the vertical toroidal transfers (e.g. VXE1), are again relevant. Consequently, in the cases of links straddling the TCTLR (between nodes #7 and #56, #15 and #57, and #6 and #48), incoming data must be discarded until it contains proper read data.

Figures 17C, 17D, 17E:
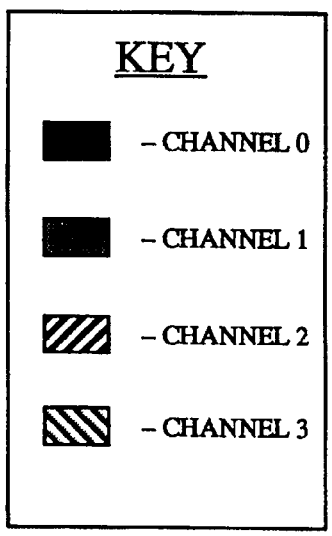

Additional components of XPSE are handled by phases illustrated in FIGS. 17c–e. Here, only one of the visualization formats has been used. In FIGS. 17c–d separate channels are dedicated to each link, effectively eliminating any conflict issues. Both of these phases handle relatively non-local transfer components. For example, in FIG. 17c, transfers occur between nodes #4 and #32, #12 and #33, #5 and #40, and #13 and #41. The phase represented in FIG. 17e, on the other hand, handles a larger set of more local transfer components. Thus, in channel 0, concurrent transfers occur between nodes #1 and #8, #10 and #17, #19 and #26, #28 and #35, #37 and #44, #46 and #53, and #55 and #62. (It will be noted that in each of the latter cases the node pairs are separated by a distance of 7, making for a favorable situation, similar to that in DXSWE). The other channels defined in this phase achieve significantly lower network utilization. Summarizing, the complete transpose requires a total of four pairs, i.e. eight minor phases.

The importance of tranpose is amplified by the fact that, in the ring network, horizontal communications are, as explained above, more efficient than their vertical counterparts. Thus, it may be expedient, in operations naturally requiring significant vertical array communication (such as the vertical phase of a 2D-FFT), to transpose the array and perform the communications with (the more efficient) horizontal counterparts.

Figure 19C:
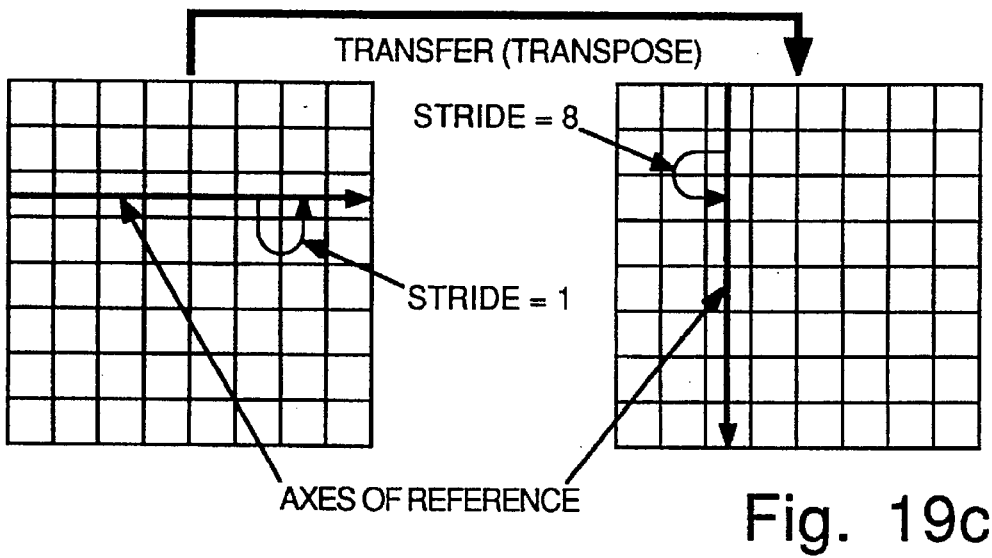

XPSE illustrates the utility of having different stride values in two communicating nodes. Since a transpose inherently maps rows in one node to columns in the other, and vice versa, it is convenient to set the strides to be ONE in the row-accessed nodes, and VERTICAL_PITCH in the column-accessed nodes (VERTICAL_PITCH being equal to the spacing, in the node local memory, between adjacent column elements). This stride combination is illustrated in FIG. 19c, for the case of 8×8 patchs. As shown, strides of one in the source node and eight in the destination node, result a ROW being transferred into a COLUMN. The stride feature permits the data arrays can be maintained in a consistent (fixed) orientation.

An important addressing pattern, used in the computation of 2D-FFTs, is that of bit-reversal, which will be denoted BREV. As the 2D-FFT is elaborated below, it will be only noted here that this transform can be effected by performing 1D-FFTs on rows within the array, followed by performing 1D-FFTs on columns of the resulting array. Assuming (again) the array mapping of FIG. 3, bit-reversal in the first 1D-FFT induces a set of (horizontal) communications among the processors in each row of the figure. The destination of a datum in this transfer pattern will be simply the lower three bits of its position in the line (i.e. horizontal coordinate), reversed. For example, assuming a 512×512 array, bit reversal would map array column #331 (101001011 binary) into array column #421 (110100101 binary). For the ring network, this induces a transfer between node column #5 and node column #6, relative to the organization shown in FIG. 3. Entire columns of data (in the 2D patch, stored in node memory) have the same node as destination. Each processor node in a row of the figure will need to send data to each of the other seven in that row, thus suggesting a sequence of exchanges. We note that each column in the array is mapped by bit-reversal into exactly one column (possibly itself), and hence all communications induced by BREV are clearly horizontal exchanges among the rows of nodes.

Figure 18:
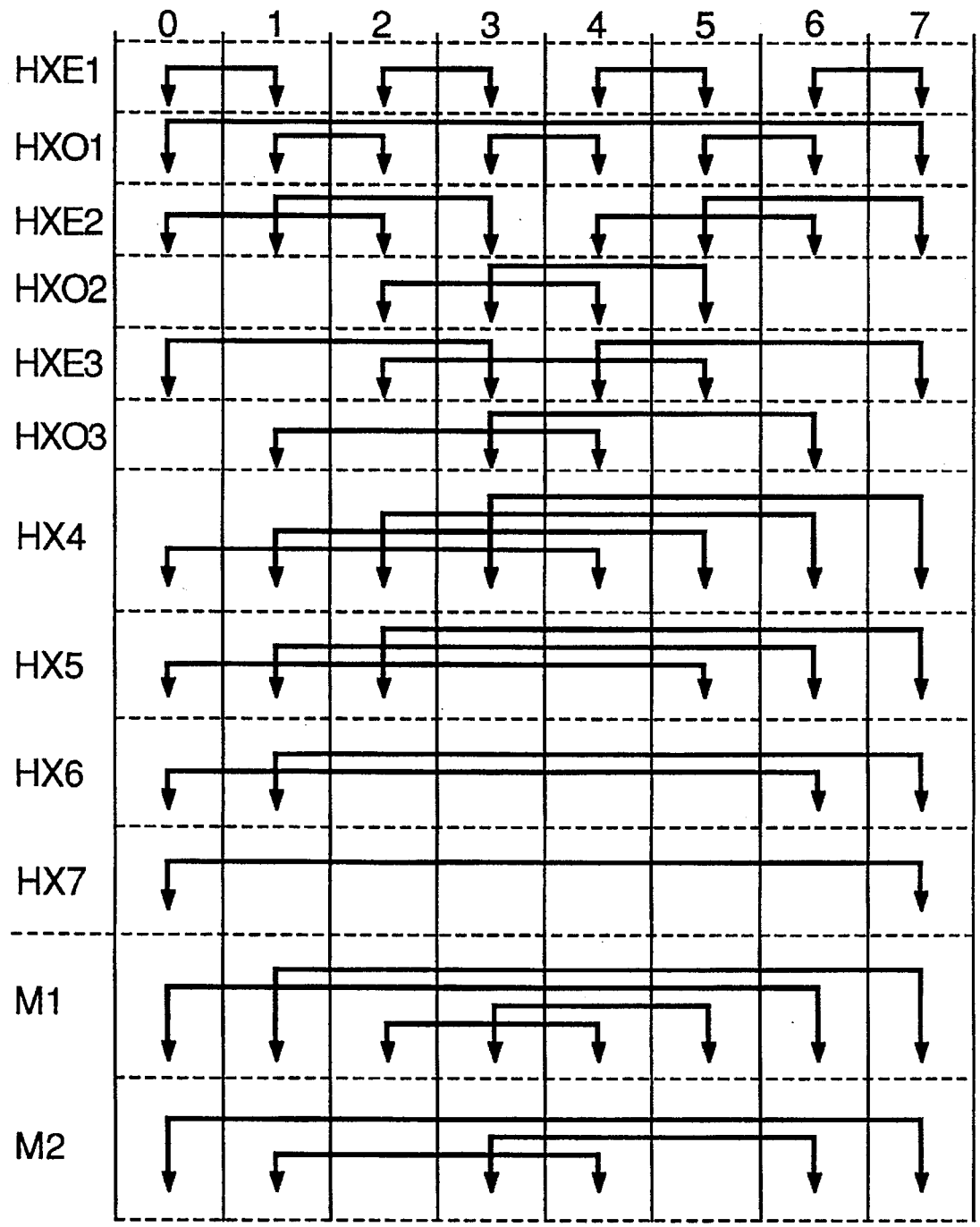
FIG. 18 represents BREV (bit reversal).

The totality of transfers required can be achieved by invoking HXE1, HXO1, HXE2, HXO2, HXE3, HXO3, HX4, HX5, HX6 and HX7 in sequence. The combined effects of the latter ten phases are illustrated in FIG. 18. At the top of the figure are the numbers of the eight columns of nodes in the 8×8 organization of FIG. 3. Going down the figure, pair-wise exchanges, within the phases, as labeled at the left, are indicated below the numbers. Some of these phases effect exchanges that are not used here (and hence not shown), e.g., one between column #2 and column #6 in HXO2, covered here by HX4. Some merging of the indicated phase transfers is possible, resulting in improved efficiency. In particular, the portions used from HXO2 and HX6 can be combined into a single (custom) phase M1, as shown near the bottom of the figure. Similarly, the portions used from HXO3 and HX7 can be combined into M2. As the amount of data being sent is relatively small (nominally ⅛th of a patch, in each case), and since these particular phases are all good to excellent in efficiency (after the indicated mergings), the overall communication cost of the bit-reversal in this network is relatively small.

Other examples, with varying degrees of efficiency could be added to this list. The above communication primitives have been presented in some detail to illustrate the nature of the static communication mechanism as taught in this invention disclosure. They will be further illustrated in application examples, below.

As mentioned above, zero trailers are generally required to complete the transfers implied in a phase. That is, all tags called out in a phase must have passed all nodes which they select, before the phase is complete. The simplest rule here is to zero fill the selection pipe at the conclusion of a phase, or prior to global reversal of the net (permissible within a phase). Somewhat more network efficiency can be attained, in some circumstances, by combining the clockwise and counter-clockwise components (minor phases) of successive phases, so as to reduce the number of zero trailers required. These efficiencies, though useful, will not be detailed in this disclosure. Those skilled in the art will recognize that such economies, are always a consideration in programmable systems.

Dynamic Communication (FIGS. 3, 20, 21, 22)

The data flow patterns sketched out above all represent types of static routing within a multiprocessor network. While basic and important, static routing does not address the totality of communication requirements. In particular, it is sometimes desirable to allow individual processors to determine dynamically their communication needs relative to the others. Accordingly, a dynamic routing mechanism, involving an extension of the above functionality, will now be sketched out. This will provide the tool of "dynamic phases", which can be used to augment the repetoire of static phases, elaborated, in part, above. It will not, however, constitute a departure from the policy of centrally scheduling overall data flow, as the nodes will continue to relate to the network on a cycle-by-cycle basis as slaves (i.e. reactively).

We start by noting that whereas it is not evidently useful for multiple nodes to (over) write the same slot, it is quite reasonable for multiple nodes to read the same slot. In an example above, image data is distributed from a video input buffer (node) to the processor nodes, under the direct control of the TCTLR. A modification of this, allows each node to define its own READ slots, relative to recurring reference pulses. In this scheme, the TCTLR causes data to be broadcast to all processor nodes, in parallel, as it becomes available in the video buffer. An appropriate reference pulse in this situation is the vertical sync pulse of the TV camera. With simply a register and a scan counter, a node could define and locate an index point relative to the reference pulse, and cause data to be read from its network port, when it is reached. More generally, such an index point can define the corner of a rectangular window, or region-of-interest, in the case of a 2D camera image processing application. For this purpose a special hardware facility ROI 240 is provided to the nodes. This unit (detailed below) has internal storage elements for defining a rectangular region, of the sort just described (indexed from periodic syncs) by way of a binary signal, denoted by WINDOW. These elements are memory mapped into the address space of processor 210, which can thus control the position of its region of interest.

To support this functionality a special "conditional write" tag type is assigned to each node involved. Upon receiving a tag of this type (i.e. mapped by tag RAM 231 into this type) the node's communication slave must check WINDOW, to determine if the data word is within its window, or region-of-interest. If so it acquires the data; if not it ignores it. In either case it causes the ROI to advance its (internal) scan counter. Multiple tag assignments are implicit (and crucial) in this functionality. Thus, a tag value, which is interpreted as a read command by the node sourcing the data (e.g., the TV digitizer node, in the accompanying example), is assigned (and interpreted as) the conditional write type in the other nodes.

Figure 21A:
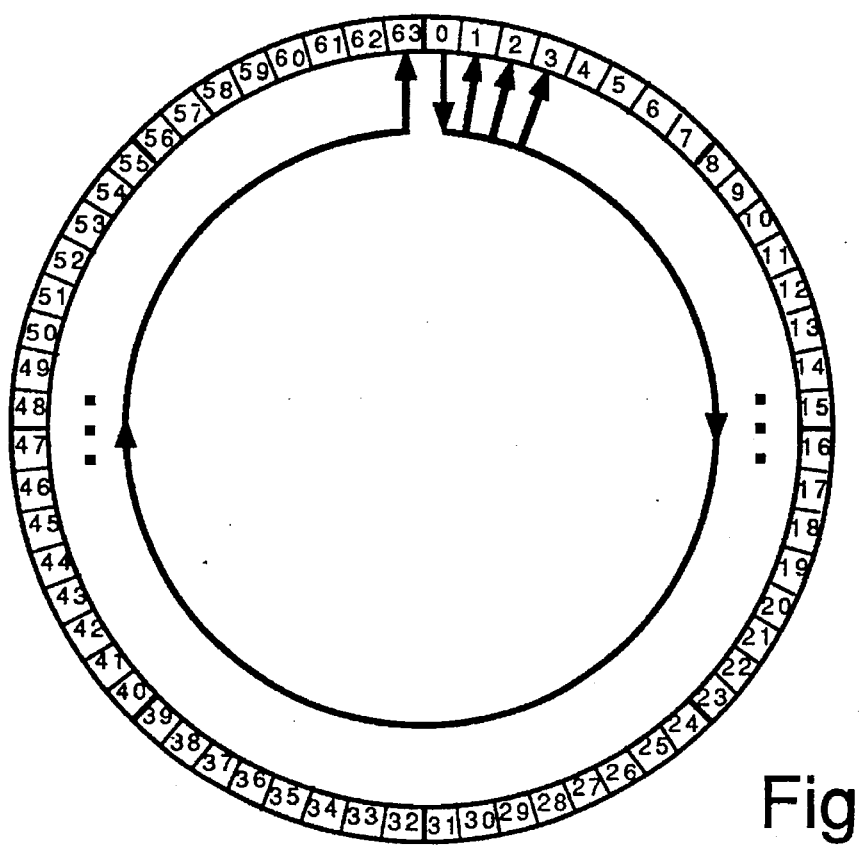
FIG. 21a,b illustrate DYNAM1 (dynamic phase).
Figure 21B:
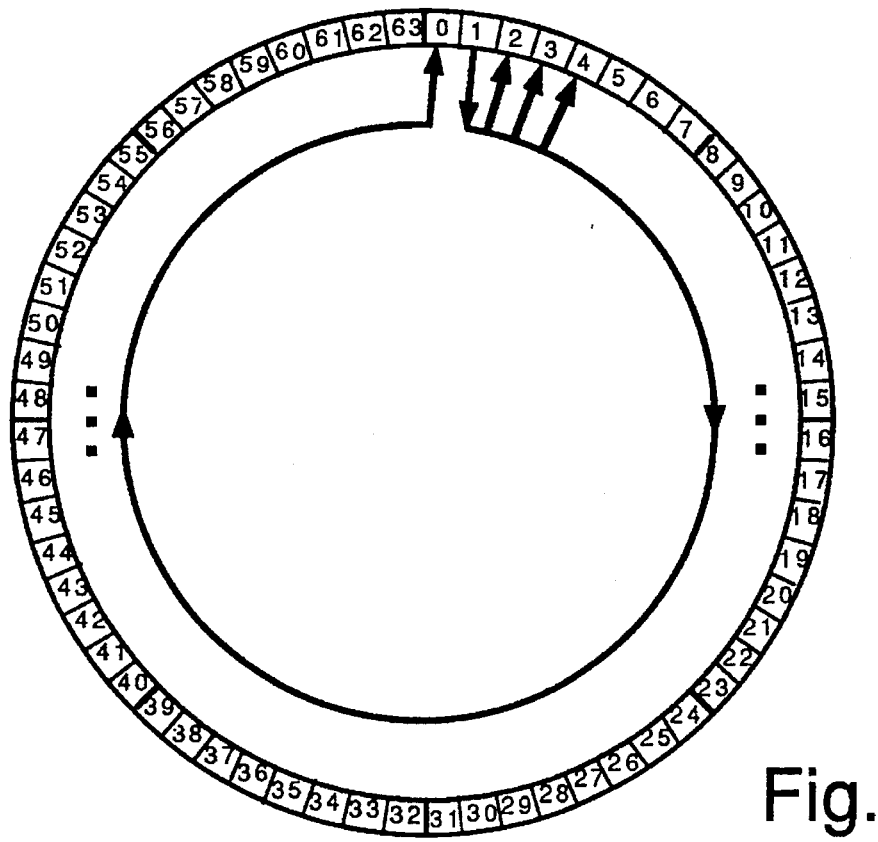
Figure 22A:
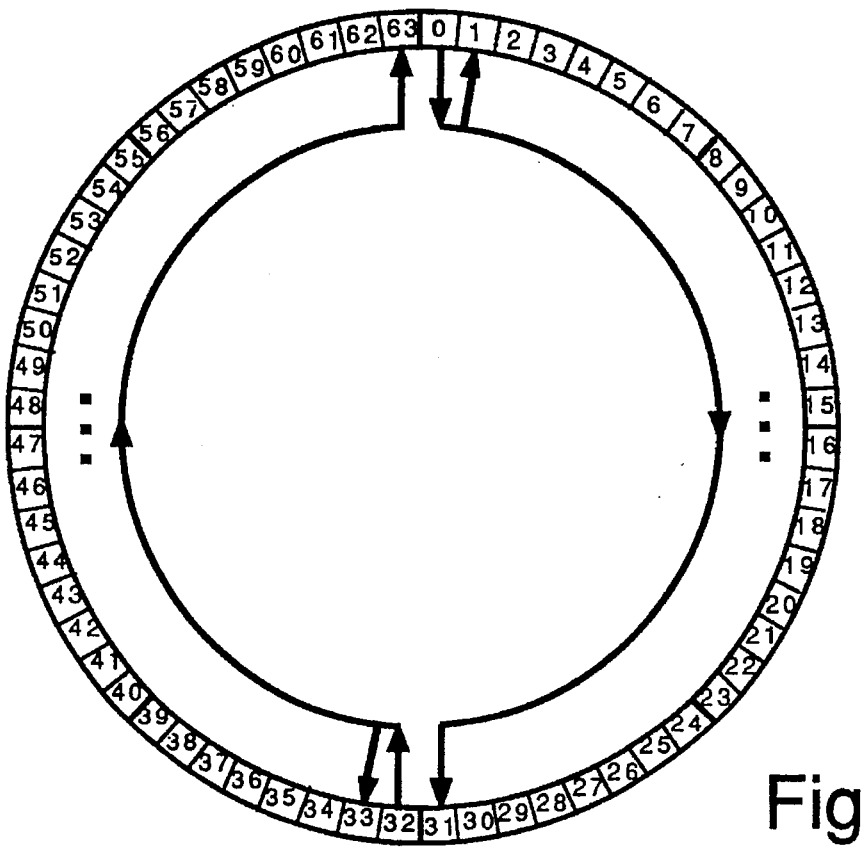
FIG. 22a,b illustrate DYNAM2 (dynamic phase).
Figure 22B:
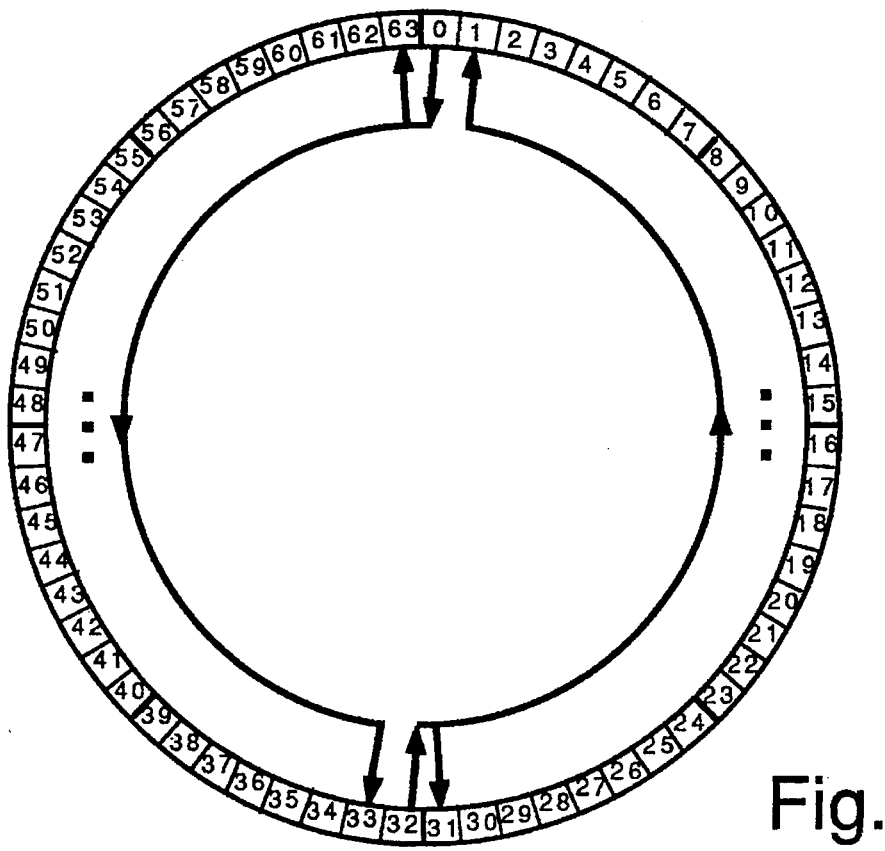

This mode of transfer need not involve a video digitizer node, and is applicable to the problem of distributing any data array, resident in a particular node, among other nodes. The TCTLR simply uses the tag values signalling horizontal and vertical sync to define the boundries of the array being distributed via the node ROIs. Two minor phases of a dynamic phase, of the sort being described, are shown in FIGS. 21a–b. In the first of these figures, node #0 is represented as transmitting data, which then progresses (clockwise) around the ring, giving each of the remaining nodes an opportunity to sample it. In the second figure, node #1 has become the transmitter, with nodes #2 thru #63, together with #0, being potential receivers. Continuing in this fashion, 64 minor phases comprise the dynamic phase.

An application of this feature is in the rotation of 2D data arrays. Rotation by run-time computed angles poses difficulties for statically routed communications. For example, different rotation angles would result in different traffic patterns, and hence different programs in the TCTLR sequencer. With the ROI feature sketched out above, however, each node can simply select the appropriate region of the array as it is clocked by on the ring network. (It should be noted that this rectangular region, or bounding box, may be larger than the size of a nominal patch, as it must enclose a rotated version of the latter—see FIG. 20a). Assuming that each node has been provided with the desired rotation angle, the operation can now proceed by the TCTLR broadcasting an array from its data memory (prefacing it with a reference pulse, signalled by a special tag value). Having received a bounding box containing the actual data mapped into it by the rotation, each node processor can complete the rotation, using techniques, such as bilinear interpolation, well-known in the art. These computational details are secondary, since the issue addressed by this disclosure is the communication aspect of such problems.

In a variation of this technique, the TCTLR can cause the nodes themselves to be the data sources. This can be used to perform an in-place rotation of a (distributed) 2D data array. To accomplish this, the TCTLR sends out a stream of tag values selecting the owner nodes of the array patches sequentially, on a line-by-line basis, in a raster-style scan. (Tags encoding syncs are interspersed appropriately, to define array edges.) It is arranged that each of these data-related tags values is assigned to exactly one node for data reading, and to ALL other nodes for conditional data writing. Thus, in the default configuration 64 such specialized tag values would be defined. On each line (assuming the mapping of FIG. 3) eight nodes will be the recipients of tags calling for reads. Each such tag will be treated by all other nodes as a tag calling for a write, but ONLY if the datum is within the (receiving) node's region-of-interest. A small subtlety here is the case where a node's region-of-interest is partially or even entirely within its own patch. (This is by no means an unusual case, and is, in fact, guaranteed to occur at or near the center of rotation.) But, as defined above, such tags, being reads to the node in question, will not signal writes, even though they are in the node's region-of-interest. A detail worth noting is that, upon receiving either a read tag, or a conditional write tag, a node's communication slave must cause the ROI to update its scan counter, so that it continues to reflect the true scan position. (A simple strategy to meet this requirement, adopted herein, is to cause ALL node data reads to signal scan counter updates.)

Figure 20A:
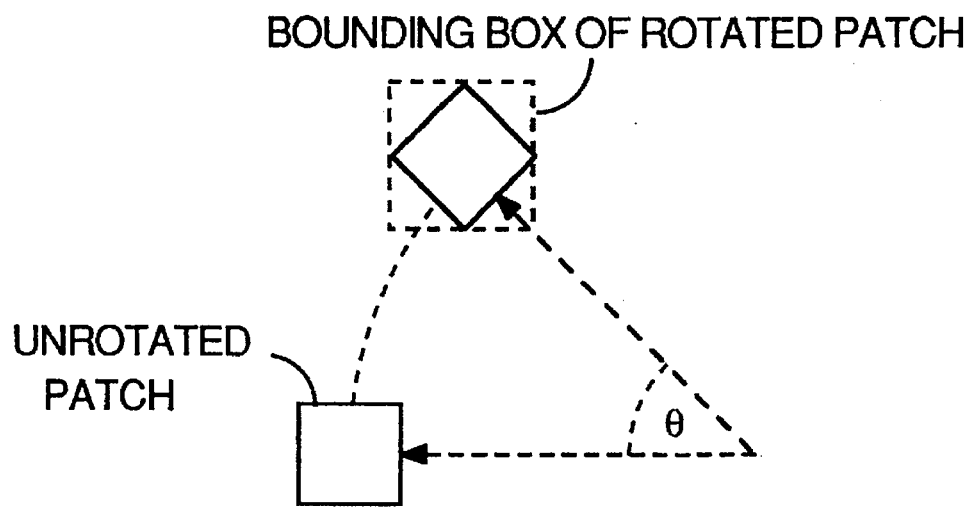
FIG. 20a illustrates bounding box of rotated patch.
Figure 20B:
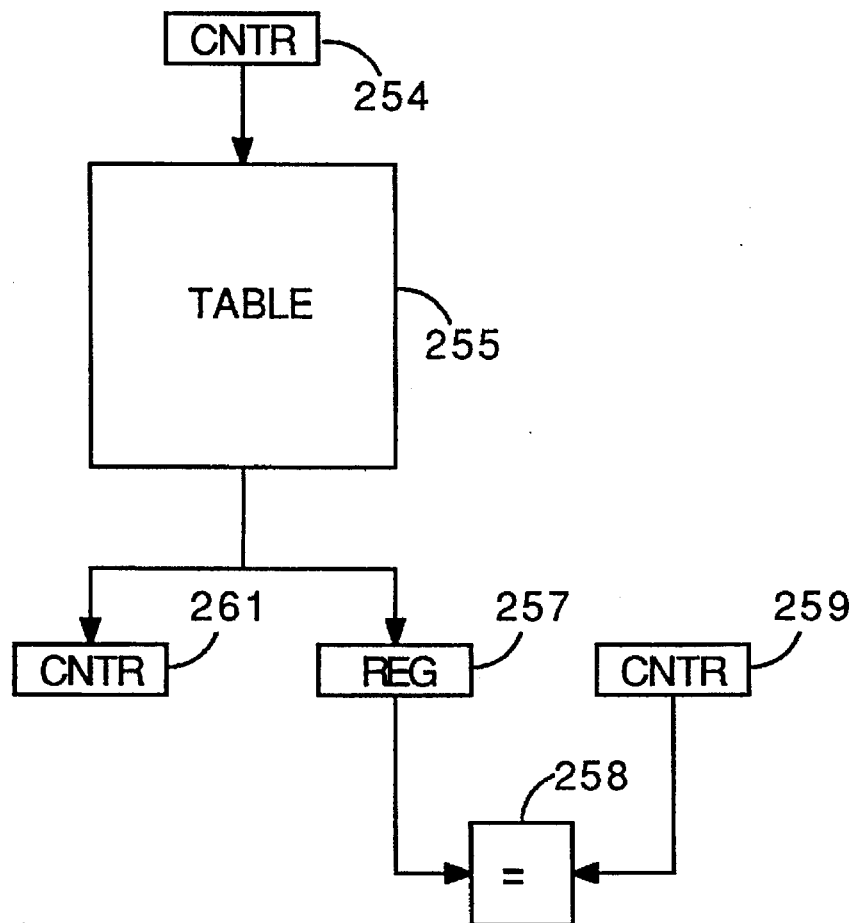
FIG. 20b shows block diagram of extended ROI.

ROI 240 can be generalized to support regions composed of disjoint linear segments (i.e. bursts), all referenced from a common synchronization point. (Note that a rectangular region is a special case of this, namely where the segments are aligned, relative to a data array. This more general facility can also support more efficient sampling, for example, by allowing a rotated, i.e. diamond-shaped, bounding box.) FIG. 20b illustrates a the principal components of the extended ROI, referenced herein as 240X. Table 255 holds pairs of parameters, defining the beginning and length of the linear segments, comprising the distributed region-of-interest. Counter 254 serves as an address register for the table. Parameter pairs, in succession, are loaded into counter 261 and register 257. The latter is continuously compared, by comparator 258, against scan counter 259. The latter, cleared at the beginning of a dynamic (major) phase, is incremented upon the detection of a read tag, or a conditional write tag, thus representing an index into the set of conditional write slots, viewed as a whole. Successful comparison signals that the current linear segment has been entered. A sequence of conditional writes, of length determined by the value previously loaded into counter 261, is now handled as a normal write burst to the node under consideration.

Thus equipped, a node can position a plurality of regions, relative to a reference sync, so as to accept messages originating in other nodes. This scheme must, however, be mediated by an overseeing processor, such as TCTLR local host 110 (in the preferred embodiment). Prior to a message exchange, the TCTLR polls the nodes (by means of brief static phases), allowing the local host to determine the combined communication requirement. The implied transmissions from each node are easily grouped together as blocks. Thus structured, the combined communication consists (in the default configuration) as a sequence of 64 block reads from the different nodes, in succession (ordered, say, by increasing node number). Each block read will cause the totality of messages originating at that node to be broadcast onto the network. Prior to this transmission, recipients must have configured their extended ROI units to accept those portions of each block, destined for them. To this end, the TCTLR, at the behest of mediating local host 110, sends the computed message positions and lengths to the 64 nodes.

To effect the actual communication, a "dynamic" phase is generated by the TCTLR sequencer. It consists of a sequence of 64 minor phases, each one generating series of tags, signalling block reads from one of the 64 nodes (in the default configuration), and conditional writes to the other 63 nodes. These block reads will, effectively, cause the message list of a particular node to be broadcast onto the network, and thus made available to the other 63 nodes. The phase is dynamic in that the lengths of each of the constituent blocks is determined at run-time by parameter table 175 and hardware address counter 173, both writeable by the local host. To achieve the required functionality, values read from this table, at a location specified by address counter 173 are loaded into hardware repeat counter 176, describe above, following which address counter 173 is decremented. This load/decrement sequence is triggered by a TCTLR sequencer command (LD.RPT2). Zero detection logic, associated with counter 176, is testable by the TCTLR. Thus a relatively small amount of TCTLR code is required to implement a dynamic phase. Only 64 generating loops are required, one for each transmitting node, with an entry in table 175 determining the length of each transmission block. The tag values generated by each such loop will be that, mentioned above, which selects the transmitting node for a block read, and all others for conditional write. Since these loops must execute at least once, nodes are required to broadcast a minimal message block, even if there are no recipients.

These period collective message exchanges are scheduled in an application-specific manner, presumably at a point when such communications are required.

The dynamic phase sketched out in the previous paragraph is of sufficient utility to be added to the list of general-purpose phases. A distinguishing feature of this phase, which will be denoted "DYNAM1" is its parameterization relative to the host-writeable table 175, thus allowing the same piece of TCTLR sequencer code to service any number of situations which differ only in the lengths of the block reads, as dictated by the table. DYNAM1 achieves a relatively low network usage of 60 MB, though the requisite code is quite compact (several lines of code per node).

Dynamic phases with improved network usage can also be constructed. It is easy to arrange for diametrically opposite nodes to be broadcasting at the same time. For example (see FIG. 22a), while node #0 is broadcasting to nodes #1 thru #31, node #32 can be broadcasting to nodes #33 thru #63. (Note that the same channel can be used, as the two sender/receiver groups are disjoint.) Following a reversal of the global direction (see FIG. 22b), node #0 can broadcast to #63 thru #33, while node #32 is broadcasting to #31 thru #1. As with DYNAM1, the durations of the broadcasts are determined by table 175. As the transmissions are concurrent, and invoked by the same TCTLR repeat loop, it is necessary that the corresponding table parameter service both nodes, and hence that their transfer blocks be of the same size a new constraint. Diametrically opposite nodes clearly can not communicate with each other in these transfers, but can be accomodated via 32 pairs of separate phases. These phases can be implemented in relatively few instructions, as table 175 is again be used to parameterize the required block lengths. The effective bandwidth of this phase, denoted DYNAM2, is over twice that of DYNAM1.

II—Structure (FIGS. 23–35)

The ring network can be viewed as consisting of a plurality of processing nodes and specialized nodes (at least strap nodes and jumper nodes), a centrally situated traffic controller (TCTLR), an interface to an external host, together with an interconnection means provided by a system of backplane units. The backplanes are basically passive, with the exception of some strategically positioned drivers for clocks and other critical signals. An interface to external host 600 is integrated into the TCTLR. Details of the principal elements, including the external host interface, will now be elaborated.

Processing Node (FIGS. 23–24)

Processing node 200 (detailed in FIGS. 23a,b) is comprised of registered bi-directional buffers, to receive and redrive, in a synchronous, point-to-point manner, information passing around the ring network. Differential signals CLK+ and CLK− distribute the global system clock to all nodes. Several parallel clock rails are employed for loading purposes, but within each rail, distribution is bussed. Signals DIR+ and DIR−, differential versions of TCTLR signal DIR, define the transfer direction (i.e., clockwise or counter-clockwise), and are received, as a pair, to create signal CCW.

Initialization signal, –INIT, is received through an inverting buffer as INIT.

Registered buffers 204R and 204T intersect the selection pipe, between points labeled SL<00–15> and SR<00–15>. Only one of these buffers is enabled at a time, under control of CCW. Similarly, registered buffers 202R and 202T, also under the enable control of CCW, intersect the data pipe, between points labelled DL<00–31> and DR<00–31>. In the case of all four buffers, both input (clocking) and output (tri-state buffer) are enabled and disabled simultaneously. 74ABT16952 is appropriate for a BiCMOS implementation of these these buffers, having both varieties of enables (clock and output) available.

All data pipe traffic into and out of the node, excepting an initialization sequence described below, is dictated by tags arriving on every clock cycle on the pipe segment labeled SR<00–15>. Under control of CCW this will reflect either data driving in from the left, via buffer 204T, or in from the right, via the corresponding 204R buffer of the adjacent node. In either case, arriving tags are clocked into register 232, and thence into tag RAM 231 (a 16K×4 high-speed, 8–10 ns access time static RAM device). In this manner, tag values, presented in register 232, are mapped into tag type (i.e. action) codes, which are delivered into register 233 (processor node tag types are listed in Table 1). The output of register 233 drives directly into communication state machine 234, which can thus interpret the type codes presented, and respond accordingly. The latter can be implemented using a high-speed PLD such as AMD MACH230. Signals developed in the communication state machine control most of the node activities. The detailed flow of this state machine is given in FIGS. 24a–c.

TABLE 1

(Processor Node Tag Type Codes)

| | | |
|---|---|---|
| 0 | CD0: | Null code |
| 1 | CD1: | Assert HOLD, preparatory of RAM data cycle |
| 2 | CD2: | Set R/–W (i.e. enter RAM read mode) |
| 3 | CD3: | Clear R/–W (i.e. enter RAM write mode) |
| 4 | CD4: | Assert HOLD, preparatory of an address logic cycle |
| 5 | CD5: | — |
| 6 | CD6: | — |
| 7 | CD7: | Release HOLD (and local busses) |
| 8 | CD8: | RAM data cycle (per R/–W bit) |
| 9 | CD9: | Conditional RAM write cycle (and clock ROI) |
| 10 | CD10: | Load RP (read pointer) |
| 11 | CD11: | Load WP (write pointer) |
| 12 | CD12: | Load SR (stride register) |
| 13 | CD13: | Pulse HS (for ROI) |
| 14 | CD14: | Pulse VS (for ROI) |
| 15 | CD15: | — |

Of the 16-bits clocked into register 232, only 14 are decoded in the tag RAM. The upper two bits are effectively spares.

The node is viewed as "owner" of the data pipe stage driven by buffer 202T. It is from this stage of the ring that the node acquires or samples data. And it is into this stage that it must drive data, in order to insert it into the the data pipe. In the latter case (driving) the node must simultaneously disable the bidirectional buffer currently driving the stage. In the case of clockwise flow, this will be its own buffer 202T. In the counter-clockwise case, it will be the corresponding buffer 202R of the adjacent node in the clockwise direction on the ring network. To handle the first case, gate 203 has logic to disable 202T when required. For the second case, the output of gate 208 (–ENABLE.R) is driven off-board, to the adjacent node, where it has output enable control over the appropriate bidirectional buffer. Similarly, the adjacent node in the counter-clockwise direction has control, via –ENABLE.L, over buffer 202R. Bidirectional registered buffers 206T and 206R serve as holding registers for data flowing in and out of node local storage elements.

The central computing unit of the node is processor 210. The TMS320C31 (manufactured by Texas Instruments) is a convenient choice for this device, on account of its reasonably high performance, low cost, compact packaging, and HOLD/HOLDA functionality. The latter feature allows an external unit (the communication state machine, in this case) to signal processor 210, via the HOLD line, requesting access to local memory 221. Processor 210 relinquishes the memory within 100–150 ns (depending on speed grade). For example, the address and data lines of the processor are placed in a high-impedance state, making memory 221 accessible by external units. The write enable and strobe pins (–WE and –STRB) of the TMS320C31, are connected to local signals –LWE and –LSTRB, which are used in a manner which will be clear to those practiced in the art.

Two interlock signals are provided for processor synchronization. Bussed signal –ILOCK1 is controlled by the TCTLR, as explained below. This signal is connected to the –INT0 pin of processor 210, and can thus cause processor interrupts. In the other direction, the XF0 pin of processor 210 is connected to signal ILOCK2, which can, in turn, activate open collector driver 209, and thus pull down bussed signal –ILOCK2. The latter signal serves as a collective busy signal, among the processor nodes.

HOLD can be asserted to processor 210 by either of two sources: the communication state machine, or the region-of-interest (ROI) logic. The latter is a semi-automonous sub-unit which screens special network cycles, according to parameters provided by processor 210, to detect those deemed of interest. The respective HOLD requests, COMM.HOLD and ROI.HOLD, respectively, are combined in OR-gate 212 to form the HOLD signal presented to the TMS320C31.

The principal shared resource of the node is local memory 221. Most of the time (assuming reasonably efficient scheduling) this memory serves as the off-chip memory for node processor 210. Occasionally, by means of the HOLD/HOLDA functionality, control is tuned over to communication state machine 234. Once in control of memory 221, the state machine can service network read or write cycles to the memory. Memory read data is transferred directly into buffer 206T, from which it can be driven into the ring. Memory write data is first sampled into buffer 206R, where it is held for several cycles (to equalize read and write pipeline delays, as mentioned above), and then transferred into memory 221. Read addresses are sourced by read pointer 223, a 16-bit (or wider) register, which can be augmented, following the read cycle, by the value stored in stride register 225. For this purpose adder 226 and buffer 227 are provided. Similarly write addresses are sourced by write pointer 224, similarly augmentable by the stride register. All three registers can be loaded directly from the network, under the control of state machine 234. To effect this, buffer 227 is disabled, while buffer 228 is turned on, allowing load data to be driven from holding register 206R to the register in question. The HOLD/HOLDA mechanism must be invoked prior to this (via tag type CD4), as shared data bus DBUS<00–31> must be used. (From the node's viewpoint, these register loads appear very similar to memory writes, mainly involving different tag types).

In a simple variant of this scheme, a single address pointer 223X can service both reads and writes. Indeed, in many situations, this organization is quite sufficient, since reads and writes typically occur in fairly long, prescheduled, bursts, and the overhead of managing a single pointer is relative small. However, in other situations, e.g., certain dynamic phases, this arrangement can be awkward, resulting in the interspersing of read and write data. Since the cost of a second pointer is small, it is generally to be recommended.

Local memory 221 is selected by means of gate 229, with selection made by the logical-AND of LSTRB and ABUS.23=1. Pullup 211 asserts the latter condition, during HOLDA, when the processor signal driving ABUS.23 is in the high-Z state. Inverter 213 presents the complementary signal to gate 229. Consequently, state machine references to the address space controlled by LSTRB will always be directed to local memory 221. It will be noted that local memory 221 is mapped into the upper half of the address space defined by ABUS<00–23>. The lower half of the same space is reserved for on-board "devices", such as the ROI units, described below.

One function, however, can not be mediated by state machine 234, namely the loading of tag RAM 231. Consequently, a very simple mechanism is provided for the latter. Bussed network signal TR.WE, received through an inverting buffer, is driven to the write enable pin (–WE) of tag RAM 231. Assuming the latter is a device with separate data in and data out pins (e.g. Cypress CY7B161), the data in port can be tied directly to DR<00–03>, allowing tag RAM writing to be effected simply by pulsing TR.WE. All tag RAMs on the ring network are written in tandem, in this manner, thus contributing to efficiency. Prior to such a write cycle, the desired data and tag values must be loaded into the pipes, from the TCTLR (which can be force-cycled by the external host, for this purpose).

Figure 24A:
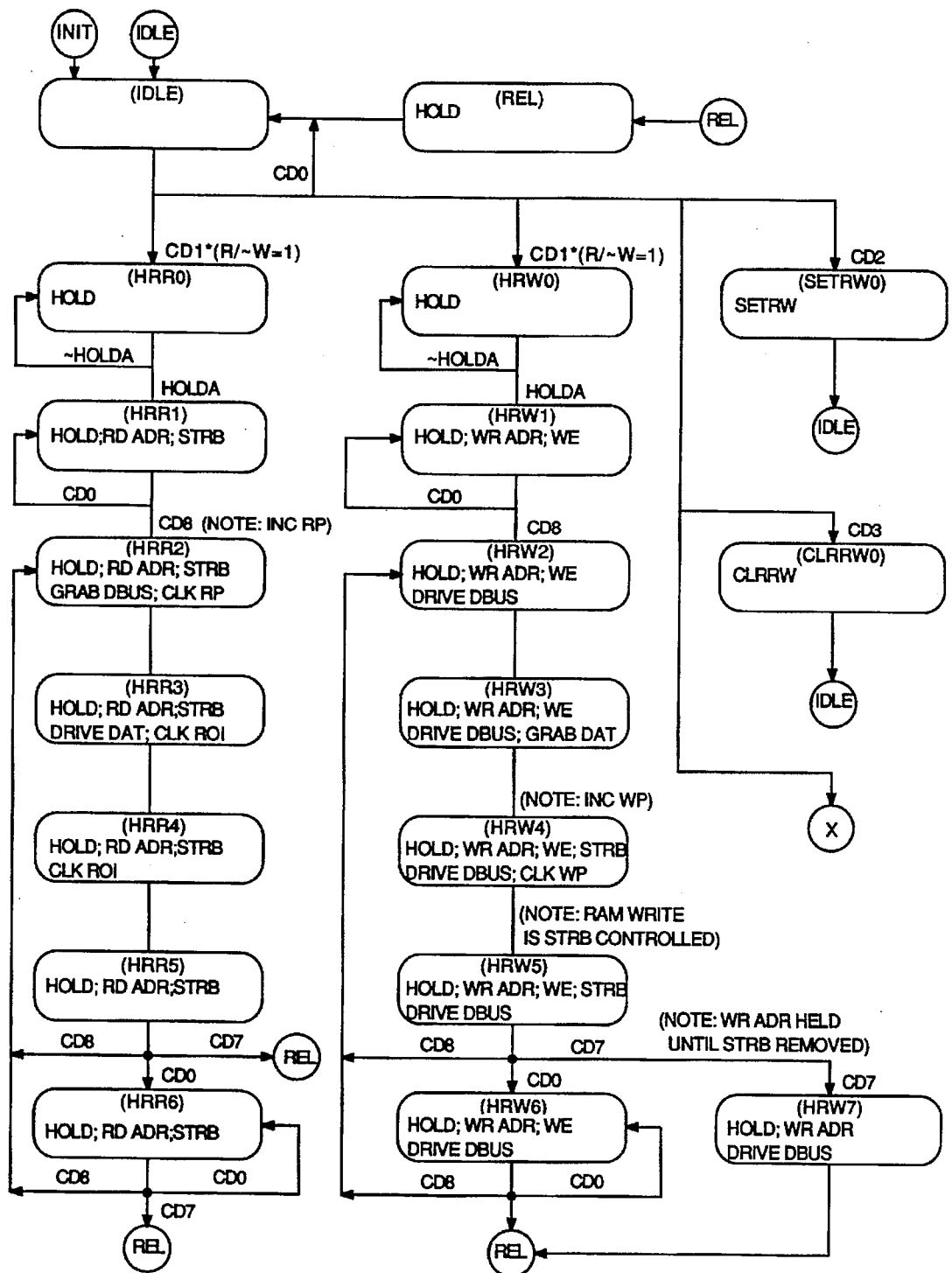
FIG. 24a,b,c show processor node communication state machine flow.
Figure 24B:
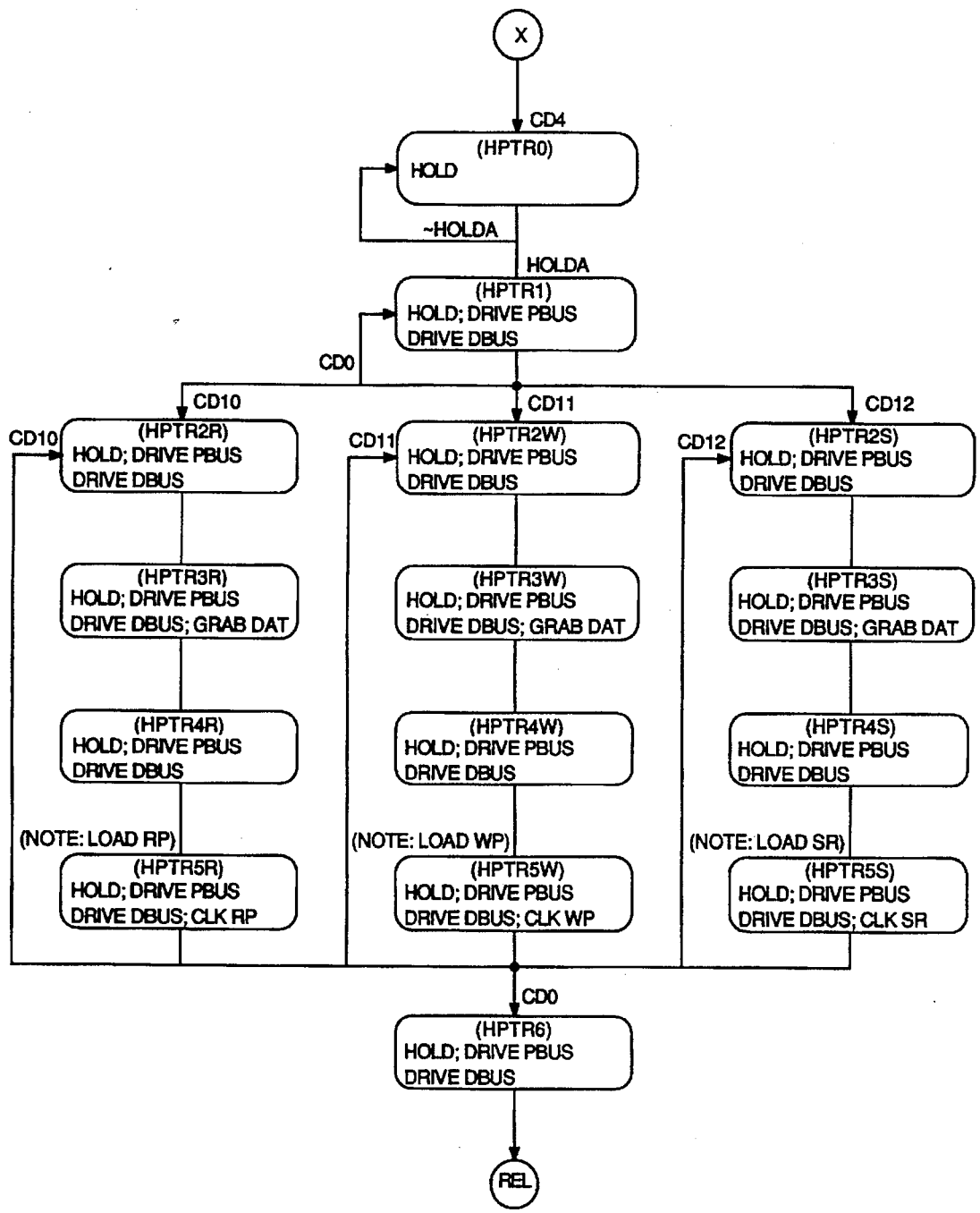
FIG. 24d illustrates phase relationship between tag and data.
Figure 24C:
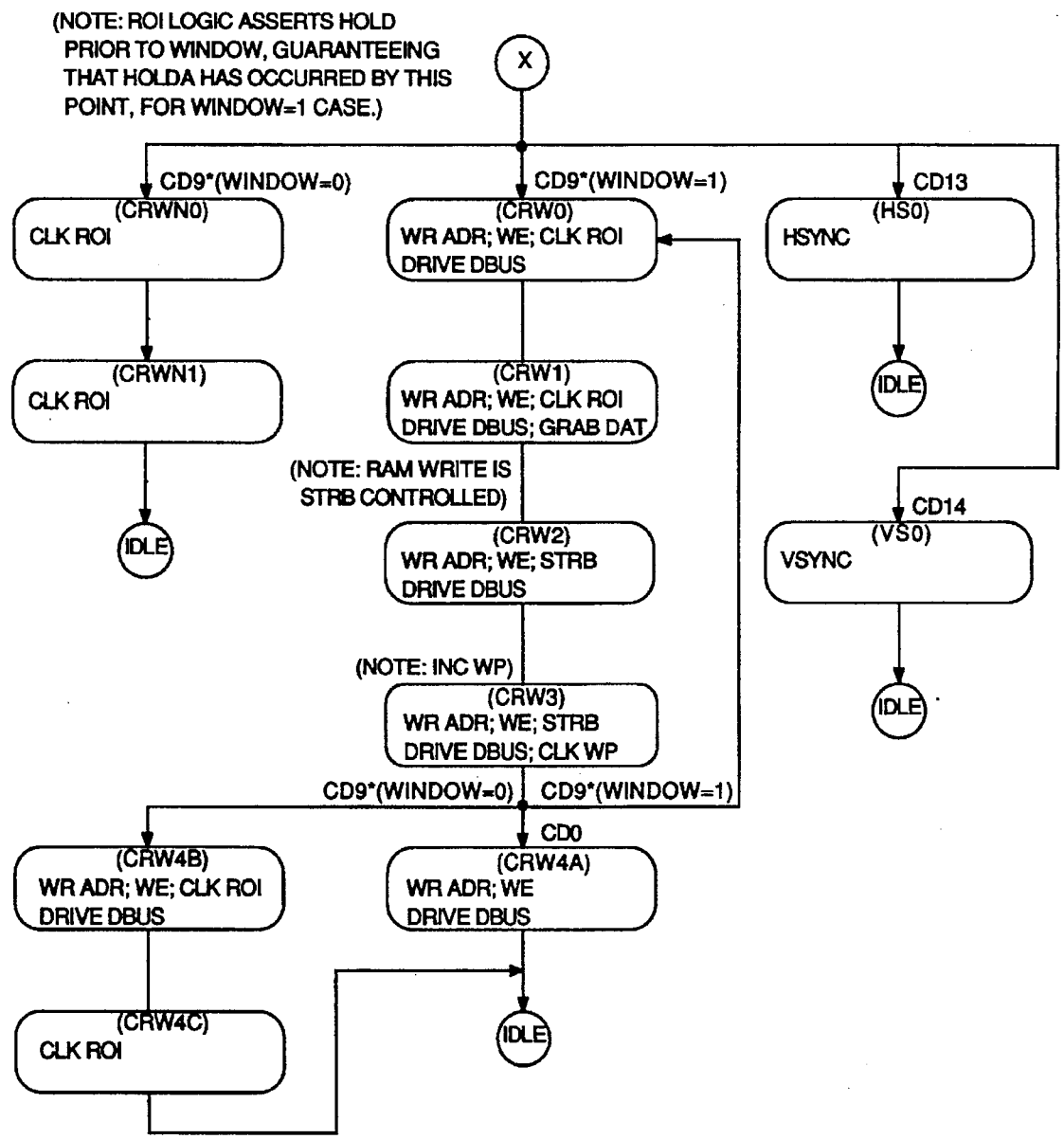

The detailed control flow of slave logic state machine 234 is provided in FIG. 24a–c. The representation used is that of a standard Moore machine, with branch paths labeled by conditions. Within each state box, a symbolic state name is shown in parentheses. Parenthesized items outside of state boxes are comments. Immediately beneath this name, state commands (i.e. signals) are listed. The commands and their actions are listed in Table 2. Signal DSP.CLK, created by dividing BCLK by two, is implied, but not shown.

Table 2 (Communication State Machine Commands)

HOLD—Assert COMM.HOLD
DRIVE.DAT—Drive buffer 206T to DR bus
GRAB.DAT—Sample DR bus into buffer 206R
DRIVE.DBUS—Drive buffer 206R to DBUS
GRAB.DBUS—Sample DBUS into buffer 206T
STRB—Assert LSTRB for local memory and devices
WE—Assert LWE for local memory and devices
READ.ADR—Drive read pointer 223 to ABUS
WRITE.ADR—Drive write pointer 224 to ABUS
DRIVE.PBUS—Enable buffer 228, while disabling buffer 227
CLK.RP—Clock read pointer
CLK.WP—Clock write pointer
CLK.SR—Clock stride register
CLK.ROI—Clock ROI unit 240
HS—HS for ROI unit
VS—VS for ROI unit Note 1. All signals in the table are represented in positive logic. Corresponding signals in figures, in some cases, are shown in negative logic. For example, signal LWE is generally used in the active low form, and asserting LWE results in driving signal –LWE low.

Note 2. CLK.RP and CLK.WP cause the respective pointers to be loaded with data from bus, or augmented by the stride register, depending on signal DRIVE PBUS.

Note 3. The only useful loading (i.e. clocking) of the stride register is via the DBUS (i.e. with DRIVE PBUS asserted)

Note 4. The clocks for the three address registers, RP, WP, and SR, are inverted (e.g. signal –CLK.RP actually drives the clock pin of the read pointer 223. Thus the loading of the register occurs at the end of the machine state in which command CLK RP occurs).

Note 5. LWE and LSTRB control references to both local memory memory and memory-mapped devices, such as the ROI unit. Thus ABUS.23 between local memory 221 (ABUS.23=1) and memory-mapped devices (ABUS.23=0).

FIG. 24a is effectively the starting point of state machine flow, where state IDLE is entered from INIT. From IDLE a 9-way branch tests the 4-bit tag type code presented by the tag RAM, via register 233. (Not all tag types are permissible at this poin0. CD2 and CD3 (see Table 1) are among the simplest. They direct the state machine into SETRW0 and CLRRW0, respectively, followed, in both cases by a return to IDLE, after the operation is performed. (R/–W is an internal state bit of the state machine, and, hence, not one of the outputs shown on FIGS. 23b.) CD1 launches the state machine into the beginning of the memory read/write routine. Depending on the status of the R/–W bit, flow proceeds to HRR0 or HRW0. Both of these states simply assert HOLD, and stall until HOLDA is asserted, at which point they fall through into HRR1 and HRW1, respectively.

In state HRR1, preparation is made for a local memory read, or burst of such reads. Read pointer RP (or common pointer 223X, in a single pointer implementation) is drive onto the local address bus (ABUS), and LSTRB is asserted, effectively accessing the first data word. Flow then stalls in state HRR1, awaiting the arrival of a CD8. (The only other permissible code, at this point, is CD0.) The read data cycle continues with the reception of CD8, at which point flow proceeds to state HRR2. GRAB DBUS samples the data word from the local data bus (DBUS). CLK RP causes an update of read pointer 223 (i.e. augmenting by the stride register). In the next state, HRR3, the sampled data is driven into the network port by DRIVE DAT (which, as explained above, also disables the ring network transceiver which would otherwise be circulating data through the port). HRR4 and HRR5 continue to assert RD ADR and LSTRB. State HRR5 performs a three-way branch as a function of the next tag type: CD8 (meaning another read cycle has occurred, and precisely four bus cycles after the previous one) causes flow to loop back to HRR2, where another read cycle is performed; CD7 (meaning that the burst—possibly of length one—is over) transfers flow to state REL, where the local busses (ABUS and DBUS) are released, followed by a branch to IDLE where HOLD is released, allowing the node processor to, once again, access local memory 221; CD0 causes a branch to state HRR6, where flow stalls, awaiting a CD7 or CD8, upon reception of which the same actions just described for those codes occur. The only other legal code at this point is CD0, the null code.

A local memory write sequence has a similar structure to a read sequence. In state HRW1, preparation is made for a local memory write, or burst of such writes. Write pointer WP (or common pointer 223X, in a single pointer implementation) is drive onto the local address bus (ABUS), and LWE is asserted. Flow then stalls in state HRR1, awaiting the arrival of a CD8. (Again, the only other permissible code, at this point, is CD0.) Here the reception of CD8 causes flow to progress to state HRW2, where buffer 206R begins driving the local data bus (DBUS), with the assertion of DRIVE DBUS (this signal remains on throughout the write burst). In the next state, HRW3, the data word, now in buffer 206T, is sampled (i.e. latched and held) in response to GRAB DAT, allowing the memory write to be effected in states HRW4 and HRW5 by the pulsing of LSTRB. Concurrently, write pointer 224 is updated (CLK WP). In state HRW5 a three way branch, analogous to that in state HRR5 is performed: CD8 (meaning that another write cycle has occurred, and again, precisely four bus cycles after the previous on) causes flow to loop back to HRW2, where another write is performed; CD7 (as above, signalling termination of the burst) transfers flow to REL where busses are released, followed by a branch to IDLE, where HOLD is released; CD0 branches to state HRW6, where flow stalls, waiting a CD7 or CD8. The latter code results in the same action just described for that code. CD7, in this case, proceeds to state REL, via state HRW7. The latter state keeps WR ADR asserted for another cycle, causing the memory address to properly "window" LSTRB, in conformance with memory timing. Again, the ONLY other legal code is CD0.

A fifth branch path out of IDLE (CD4), into HPTR0, is shown in FIG. 24b. CD4 requests activation of the HOLD signal, preparatory of the loading of one of the address logic registers, RP, WP or SR. Upon detection of HOLDA, buffer 206R is driven into the DBUS, awaiting the arrival of write data. Concurrently, the DBUS is driven into the PBUS by signal DRIVE PBUS. State HPTR1 performs a four-way branch, looking for codes of CD0, CD10, CD11, or CD12 (again, receipt of any other codes at this point amounts to system failure). CD0, the null code, causes the branch to repeat. The other three codes cause transfer to one of three very similar sequences. CD10 is handled by states HPTR2R-HPTR5R. In HPTR2R the PBUS continues to be driven, awaiting the arrival of write data. In HPTR3R this data is guaranteed to be available, whereupon it is sampled into buffer 206R. State HPRT4R is provided to allow settling and setup of data at the inputs of read pointer 223. In state HPTR5R the data is clocked into RP by CLK RP. The tag type code, in register 233, is again tested, to allow the loading of additional address registers. The only permissible type codes at this point are CD10, CD11, CD12, or CD0. Code CD0, at this point, signals completion, causing flow to advance to HPTR6. In the latter state, data continue to be presented to the pointer inputs, so as to conform with device hold time requirements. Flow then branches to state REL, and then to IDLE, where local busses and HOLD are released. The loading of write pointer 224 and stride register 225 is achieved in an analogous manner, in states HPTR2W-HPTR5W and states HPTR2S HPTR5S, respectively. The only difference in the commands called out in these sequences is in the address register clock used (CLK WP and CLK SR, respectively). For the case of a single pointer implementation, routines HPTR2R-HPTR5R and HPTR2W-HPTR5W would be replaced by a single (similar) routine to load common pointer 223X.

FIG. 24c shows the flow for supporting the ROI and extended ROI features. As outlined earlier, these features depend upon hardware, provided to node slave logic 230, for defining a region-of-interest, either possessing a rectangular form, or comprised of a set of linear segments, respectively. (The rectangular form is clearly a special case of the latter, more general, facility). Both ROI 240 and extended ROI 240X require a clock (CLK.ROI), together with periodic sync(s). In the case of the basic ROI, syncs HS and VS are required (on account of a particular component used—see below), whereas only VS is necessary for the extended ROI. The important output signal, as concerns communication state machine 234, is, in both cases, WINDOW. The assertion of this signal indicates that conditional write cycles, occurring on the ring network, are to be accepted, by the node slave logic, as writes to local memory 221, followed by clocking of installed ROI hardware (240 or 240X). Lacking this assertion, such conditional writes result only in clocking of the ROI hardware.

Conditional writes are mapped into CD9. Upon receiving such a code in the IDLE loop, flow is transferred to either CRWN0 or CRW0, depending on the state of the WINDOW signal (see figure). In the case where WINDOW=1, the ensuing flow has much in common with write sequence HRW2-HRW5. The HOLD signal is not, however, required here, since the ROI hardware causes HOLD to be asserted in advance of WINDOW. In CRW0, local memory write enable LWE is asserted, and write pointer 224 is driven onto the ABUS. DRIVE DBUS causes buffer 206R to be driven onto the DBUS, preparatory of the arrival of data. CLK ROI is also asserted in CRW0 (and the next state), so as to advance the ROI scan counter. In CRW1 write data, guaranteed to be present, is sampled into buffer 206R. In states CRW2 and CRW3, LSTRB is pulsed, thus peforming a write to local memory 221. In CRW3, write pointer 224 is updated (CLK WP). State CRW3 performs a three-way branch, testing the next tag type, together with the WINDOW signal. If another CD9 (i.e. conditional write) has arrived and WINDOW is still asserted, flow loops back to CRW0, performing another write to local memory. The spacing from the previous CD9 is, in this case, four, the minimum interval between local memory writes. If another CD9 arrives, but WINDOW has been de-asserted, local memory is NOT written. Rather, flow proceeds to CRW4B. There (and in the next state) CLK ROI is asserted, causing the ROI scan counter to be advanced. Flow then branches back to IDLE. The arrival of a CD0 in CRW3 also causes flow to return to IDLE. States CRW4A and CRW4B both continue to assert WR ADR, LWE; and DRIVE DBUS, so as to meet hold times. In the case of a conditional write outside the window (CRWN0), CLK ROI is pulsed, followed by return to IDLE. Codes CD13 and CD14 pulse signals HS and VS, respectively (elaborated below).

As a simplification, it has been assumed that conditional writes (CD9) occur in bursts with a spacing of four. Thus, the detection of a null code in the three-way branch of state CRW3 effectively signals the end of the burst. Moreover, the detection of WINDOW=0, in that same branch, also signals the end of the burst. Both ROI and extended ROI features have very similar behavior, from the viewpoint of node slave logic 230 and state machine 234. Indeed, as mentioned above, ROI 240 supports a rectangular region-of-interest (relative to sync signals HS and VS) whereas ROI 240 can support more general, fragmented, region-of-interest (relative to sync signal VS). In both cases, it is the WINDOW signal which resolves whether a particular conditional write cycle is within the region.

Figure 24D:
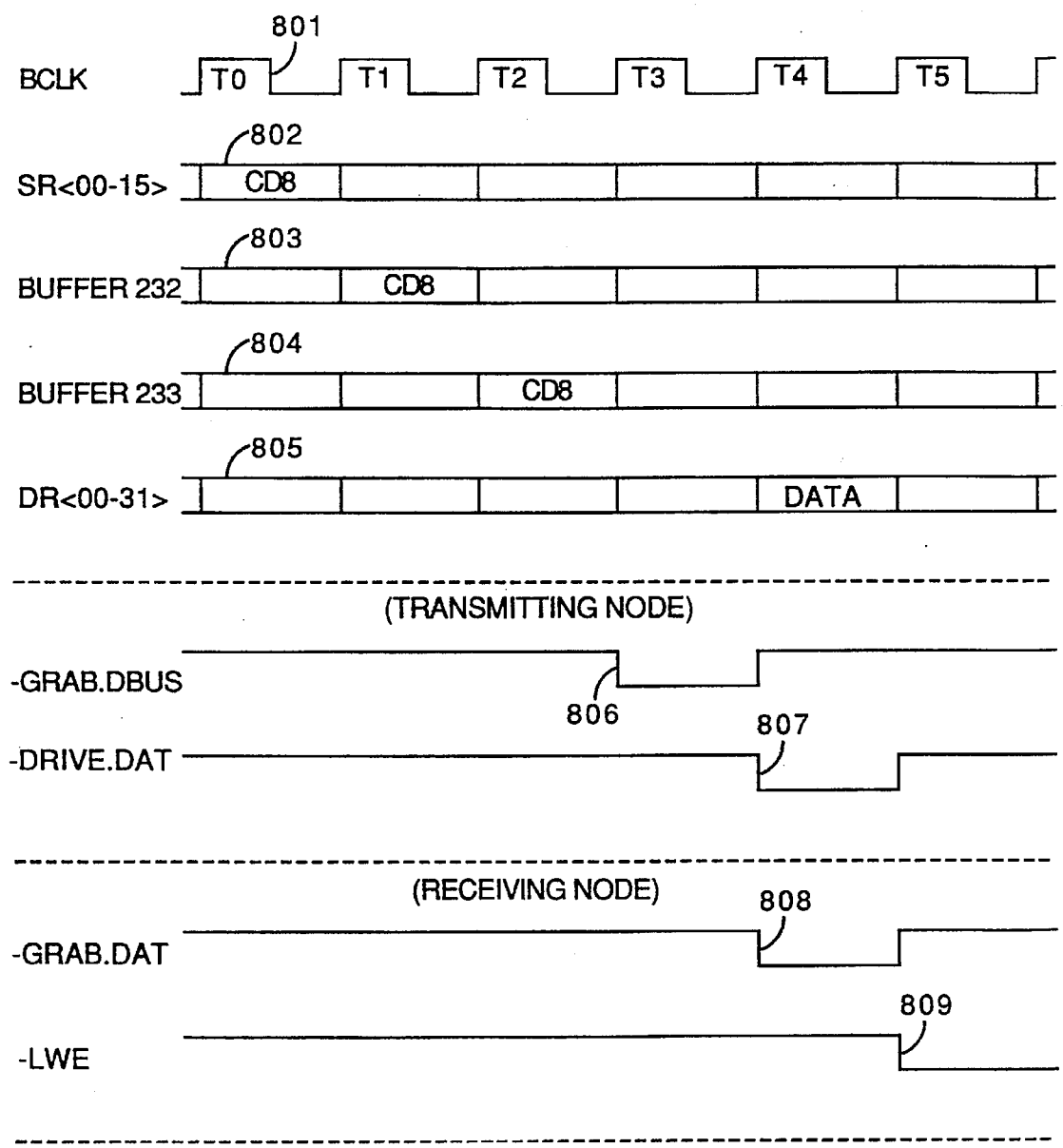

FIG. 24d illustrates the timing relationship between tag and data. The top section of the figure shows five consecutive time periods, T0–T5, for waveform 801 of node local clock (BCLK), followed by four key points in the slave/data logic (waveform 802 of SR, the entry point for the tag; waveform 803 of buffer 232, the sampled tag; waveform 804 of buffer 233, the decoded tag; and waveform 805 of DR, the data bus). Thus a CD8 tag, received at time T0, moves into buffer 232 at time T1, and, after decoding, into buffer 233 at time T2.

The middle section of the figure represents the response of a transmitting node. Following the decoding of the tag, signal GRAB.DBUS (represented in negation by waveform 806) is asserted at time T3, causing sampled data from local memory to be clocked into buffer 206T. At time T4, signal DRIVE.DAT (represented in negation by waveform 807) is asserted, injecting the read data into the DR bus. Thus, a four clock cycle tag-data offset is dictated by a local memory read.

The lower section of the figure represents the response of a (downstream) receiving node. Tag sampling and decoding occur as in a transmitting node. Assuming the same relative timing, signal GRAB.DAT (represented in negation by wavefrom 808) must be asserted at time T4, sampling the DR bus into buffer 206T. Signal LWE (represented in negation by waveform 809) is shown as starting at time T5.

It must be emphasized that tag types (and thus tag values mapped into those types) must conform to those indicated by the state machine flow. This requirement translates into some fairly straightforward rules for TCTLR code, including:

1. Following activation of a read or write burst (by a CD1), only CD0's can be transmitted to the node until the HOLDA is guaranteed to be asserted. The manufacturer data sheet states that (for the situation here) this will require 100–150 ns, depending on speed grade. Thus, assuming a 16.67 ns bus clock, TEN null cycles must precede the first CD8 (data cycle). The HOLDA stall loop is not really a protective interlock, since premature receipt of a CD8 will result in system failure. Rather it is a convenience to avoid having to insert a sequence of replicated versions of states HRR0 and HRW0, prior to taking control of ABUS and DBUS. Such an alternative would, however, be equally acceptable, albeit more costly in machine states.
2. CD8's must be spaced at least four apart (e.g. CD8, CD0, CD0, CD0, CD8, . . . )
3. Only CD0's, CD8's, or a CD7 (terminating code) can occur during the burst sequence.
4. Following a HOLD for address register cycle code (CD4), the first data code (CD10, CD11, or CD12) may occur at any time after HOLDA is guaranteed (ten cycles following assertion of HOLD). Any additional data codes must occur at intervals of FOUR. The arrival of CD0 at this point, signals termination and release.
5. Conditional writes must be spaced at intervals of FOUR.

In addition to the 4-bit code, sourced by register 233 (FIG. 23a), state machine 234 has three other inputs (excluding the clock). INIT forces flow into the IDLE state, as represented in FIG. 24a. HOLDA and WINDOW have been explained above.

Figure 25A:
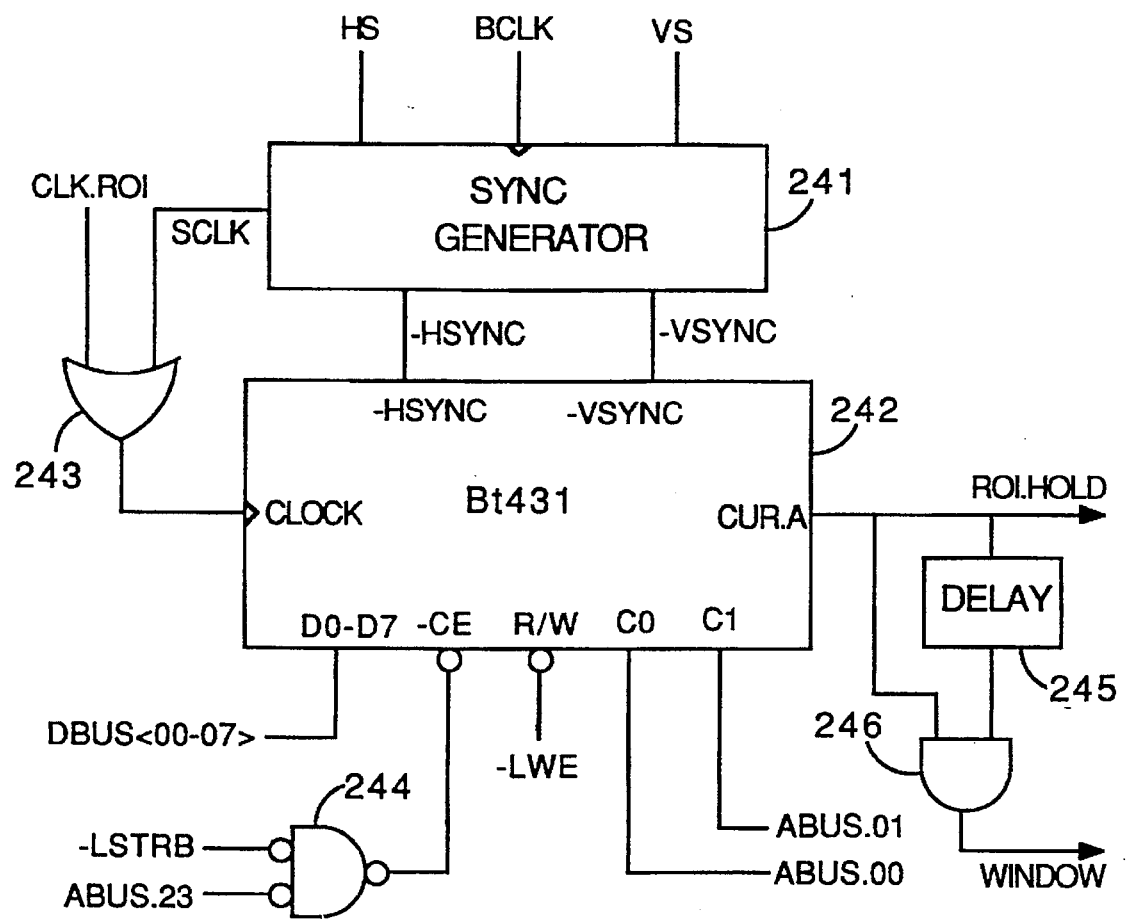
FIG. 25a shows detailed block diagram of ROI (region-of-interest).
Figure 25B:
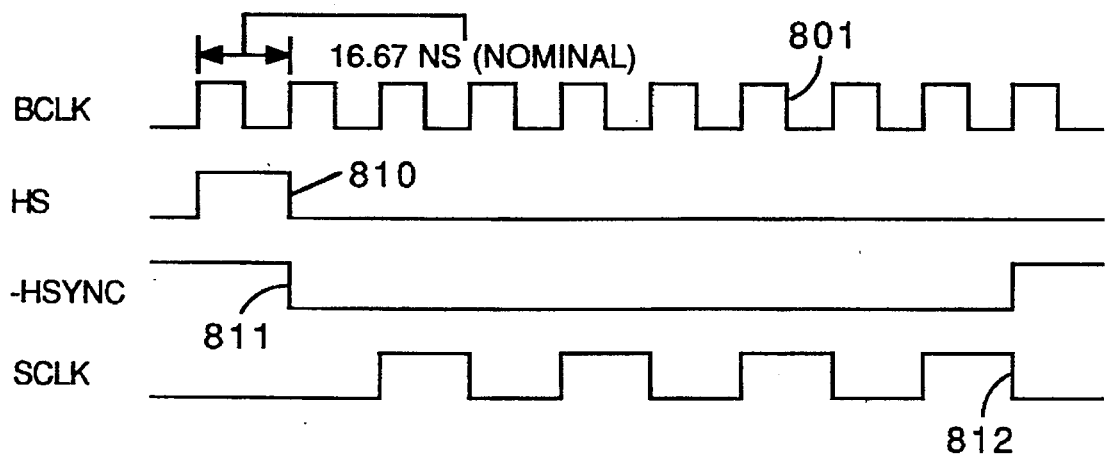
FIG. 25b shows principal timing waveforms, related to previous figure.
Figure 26:
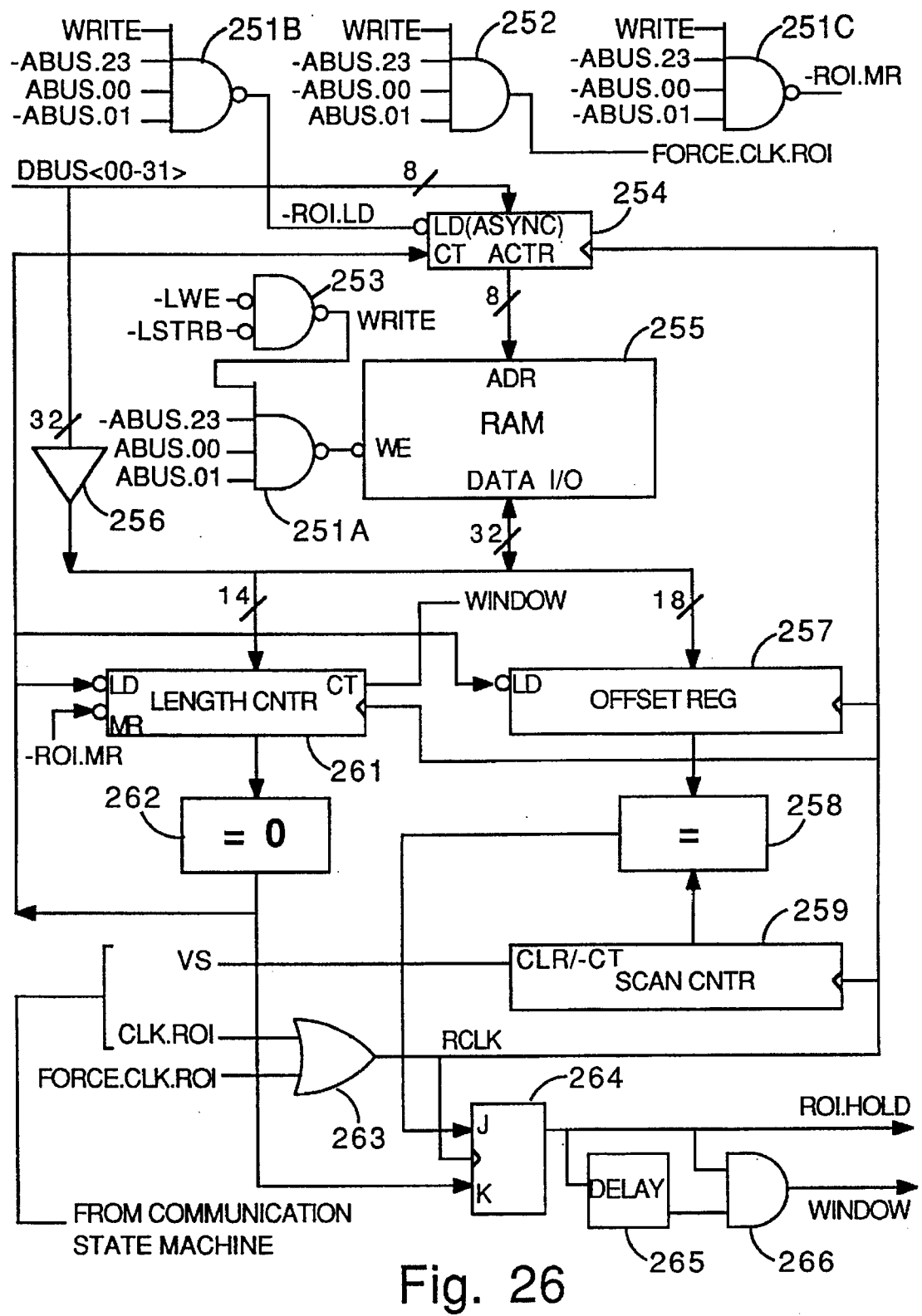
FIG. 26 shows detailed block diagram of extended ROI.

ROI and Extended ROI (FIGS. 25 and 26)

Figure 23A:
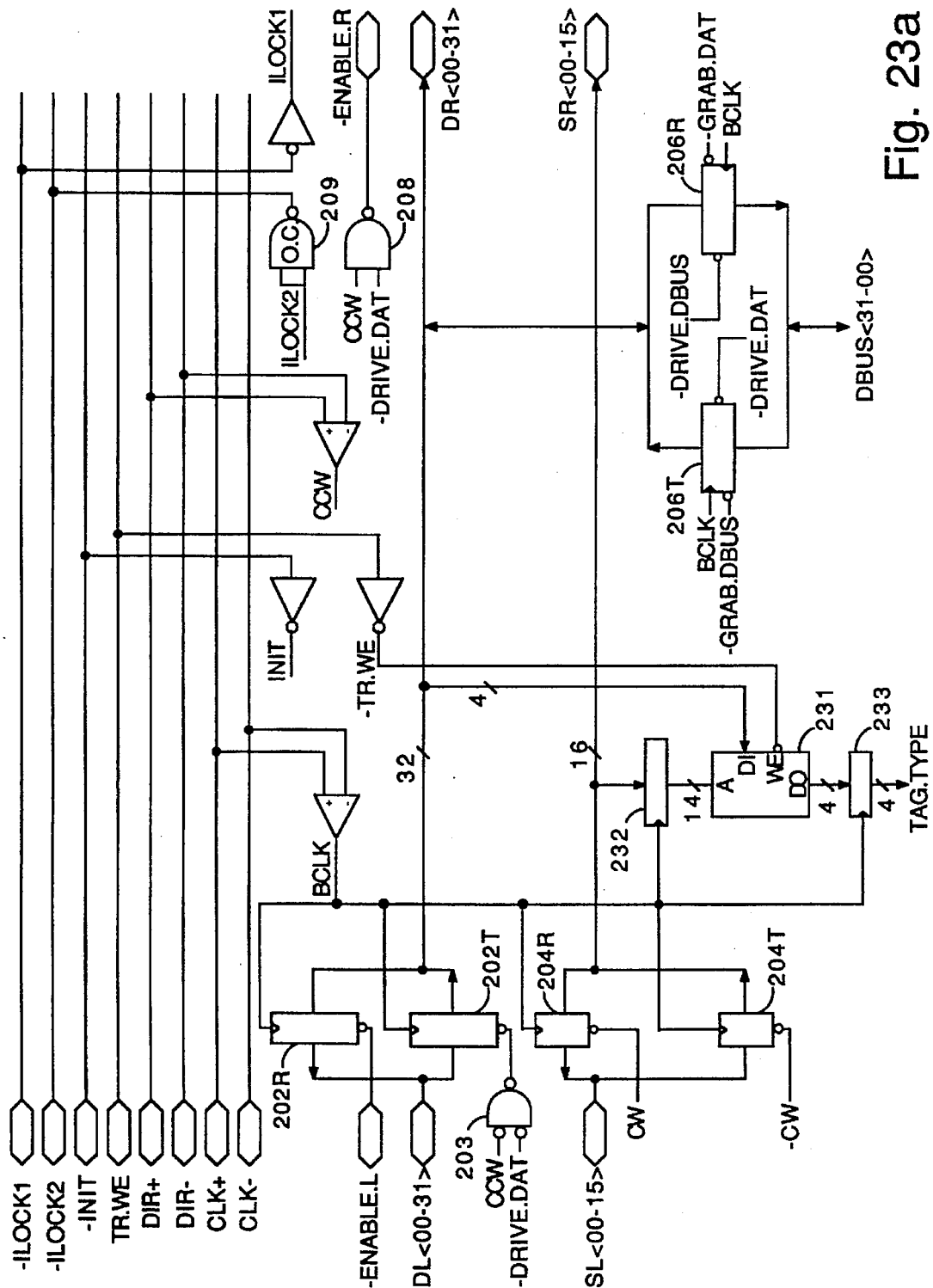
FIG. 23a,b shows detailed block diagram of processor node.
Figure 23B:
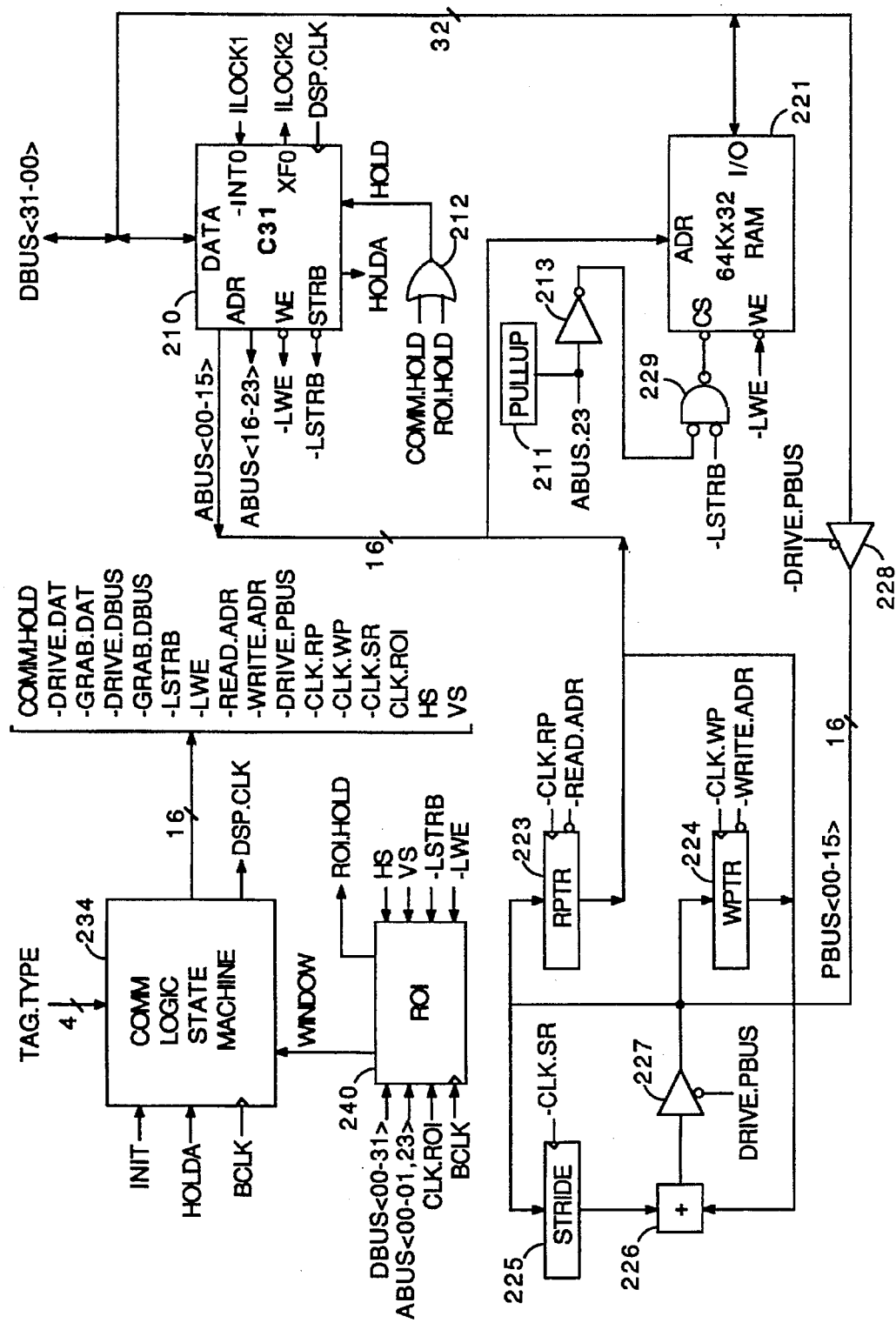

FIG. 25a shows the basic ROI hardware 240 (used, e.g., in FIG. 23b). The principal component of the basic ROI is cursor-generator 242 (available from Brooktree, Inc. as B1431). As its name suggests, it is actually intended for cursor support, on video displays. The functionality, however, is quite appropriate for the purpose at hand: defining a window, relative to sync signals HS and VS, which can be programmed locally, by node processor 210. The parameters of cursor-generator 242, notably the size and relative position of the cursor window, are configurable by node processor 210, via the MPU interface, represented on the lower edge of cursor-generator 242 in the figure. As shown in the figure, that device is selected, by gate 244, with the coincidence of LSTRB and −ABUS.23. Such selection can be for read or write purposes, as determined by signal LWE. The principal input signals for ROI 240 are CLK.ROI, HS, and VS—all sourced by communication state machine 234. To accommodate the timing requirements of the Brooktree B1431, sync generator 241 converts single cycle (16.67 ns) pulses of HS into a longer pulse of signal −HSYNC, as shown in FIG. 25b. In addition, special clock SCLK is pulsed, as shown, again to conform to B1431 specifications. Identical timing describes signal −VSYNC, generated, together with an analogous pulse train for SCLK, from a single cycle pulse of VS. This behavior is easily achieved by simple sequential logic techniques, well-known in the art. Signal CLK.ROI, from state machine 234, is combined with SCLK in OR-gate 243, to create the clock signal for the Brooktree B1431.

B1431 CUR.A (i.e. CURSOR) output is used to create signals ROI.HOLD and WINDOW. As seen in FIG. 25a, ROI.HOLD is driven directly by the CUR.A output of cursor-generator 242. In parallel, the latter is combined, in gate 246, with a delayed version of itself, developed in delay unit 245, to form signal WINDOW. Those practiced in the art will understand that delay 245 can be constructed by means of a series of shifter stages, clocked in turn by BCLK (developed in FIG. 23a). The purpose of the delay is to insure that node processor 210 has asserted HOLDA, prior to asserting WINDOW. (The obvious alternative of gating ROI.HOLD with HOLDA does roughly the same thing, but, unfortunately, makes the delay, a crucial parameter, dependent on speed-grade-dependent parameters of the TMS320C31, which are rather loosely specified). Gate 246 causes WINDOW to be deasserted along with ROI.HOLD.

FIG. 26 illustrates extended ROI 240X. Like basic ROI 240, it is mapped into four addresses in the node processor address space, decoded by gates 251A–C, 252, and 253. The central component of the extended ROI is table 255, implemented as a 256×32 RAM. Providing the address for table 255 is counter (ACTR) 254, loadable by node processor 210, via an asynchronous load signal (74F191 has ideal functionality for this counter). Data (32-bits) from table 255 can be loaded into 14-bit LENGTH COUNTER 261 and 18-bit OFFSET REGISTER 257. Counter 261 is zero-tested by logic 262, while register 257 is compared against SCAN COUNTER 259. The latter can be cleared by signal VS, sourced by communication state machine 234 (FIG. 23b). Also sourced by that state machine is signal CLK.ROI. This signal is combined with signal FORCE.CLK.ROI in OR-gate 263, to create local clock signal RCLK. FORCE.CLK.ROI can be pulsed by node processor 210 through gate 252. J-K flip-flop 264 is set as a result of equality in comparator 258, and cleared as a result of LENGTH COUNTER 261. In both cases the transitions are synchronous with the leading edge of signal RCLK. Delay 265 and gate 266 perform exactly the same function as corresponding elements 245 and 246 in the basic ROI (as described above).

Node processor 210 initializes the extended ROI by loading successive addresses into ACTR 254 and then writing the required data value into table (RAM) 255, through (isolation) buffer 256. Referring back to the earlier section entitled "Dynamic Communication," it will be recalled that table 255 is (typically) loaded with the values corresponding to the message blocks coming from the other 63 nodes, and, by convention, stored in the table by increasing node number. Following loading of table 255, ACTR 254 is cleared, preparatory of the upcoming dynamic phase (also sketched out, in the above cited section).

TCTLR (FIGS. 27-30)

Figure 27:
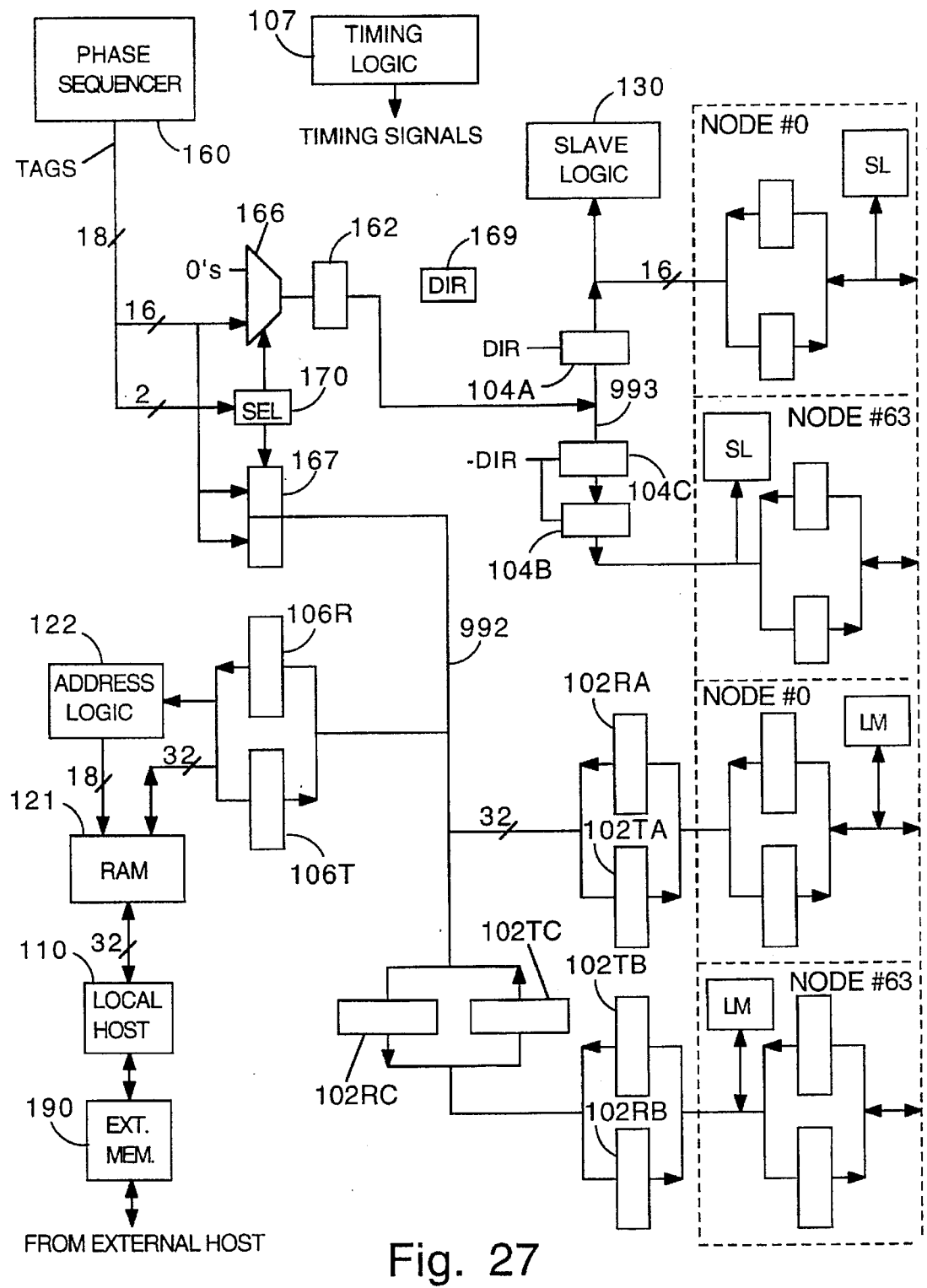
FIG. 27 shows detailed block diagram of traffic controller (TCTLR)..

FIG. 27 provides a detailed block diagram of the TCTLR. The two closest processing nodes (#0 and #63), are represented, within dotted lines, at the right. These separate units are shown to help clarify the position and function of the TCTLR, in relation to the overall system. Important connections to the local host 110 and external host 600 are also indicated.

The principal subunit of the TCTLR is sequencer 160 (detailed in FIG. 28), comprised of phase memory 161, pipeline register 164, next address generation and miscellaneous logic. The latter includes repeat counters 171 (RPT0), 172 (RPT1), and 176 (RPT2), parameter table (RAM) 175, address counter 173, as well as not-zero-detectors (CTNZ<0-2>) for the three repeat counters. Counter 173 serves as the address register for table 175, with both counter and table being writeable by the local host.

Repeat counters RPT0, RPT1, and RPT2 are provided to permit loops for code compression. Automatically decremented (but not beyond zero) when tested, these counters allow for code segments to be repeated up to 4095 times (or more). RPT0 and RPT1 are used in a straight-forward manner, typically being loaded with a loop count constant, as the program address of the top of the loop is pushed onto the stack. Subsequent branches to TOS, conditional on the repeat counter in question being not zero, result in loop iteration.

RPT2 (counter 176), in conjunction with not-zero-detection logic, address counter 173, and table 175, provides an iteration facility somewhat different from that just described. Table 175, writeable by local host 110, can be loaded by the local host with a list of iteration counts, at addresses determined by counter 173 (also writeable by the local host). Following the table load, the local host writes the top address of the list back into counter 173. The counts can subsequently be transferred, one by one, into counter 176, by TCTLR sequencer instructions, and used as loop iteration counts. In this manner a series of sequencer iteration loops can be run-time parameterized, with the count associated with each loop, defined by the local host. This utility is important in certain techniques, elaborated herein.

Sequencer 160 has the form of a traditional micro-sequencer, often implemented with components such as the AMD2910. For this design, however, the relatively large (64K) microstore, as well as other requirements, necessitated a custom sequencer. For example, the branching capabilities needed here are fairly limited. On the other hand, specialized iteration capabilities are essential, in order to fit the required sequencer code in reasonable amounts of RAM.

TCTLR code is stored in phase memory 161, a 64K×96 RAM. A 96-bit micro word is employed, mainly to achieve the necessary bandwidth for tag generation. Successive micro words are loaded into pipeline register 164. Each micro word is divided into five parts, with the upper 24 bits forming the "instruction" field and the lower 72 bits divided into four 18-bit "tag generation" fields (or "tag generators"). The 24-bit sequencer control field handles next address generation (including branch condition testing), stack manipulation, and miscellaneous command generation. Each tag generator contains either a 16-bit tag value, subsequently driven into the selection pipe, or a 16-bit constant, subsequently driven into the data pipe. The "designator code," forming the upper two bits of the tag generator, selects among the three alternatives. In the great majority of instances, however, it is the first alternative which is chosen. Thus, each word fetched from phase memory provides tags (or constants) for four successive slots on the ring network. The tag generators are extracted, in order, going from right to left, in the 72-bit source field (i.e., the right most 18-bit portion is used first), and deposited in secondary register 165. Given the nominal tag spacing (network clocking interval) of 16.67 ns, this translates into a 66.67 ns cycle time for phase memory. The latter time is easily achieved using relatively slow RAM devices, especially since the latter are pipelined on both input and output.

The features of TCTLR sequencer 160 are, for the most part quite conventional. Thus, it is equipped with 64K×96 (RAM) phase memory 161, together with program counter 181, 96-bit pipeline register 164, secondary register 165, stack 187, stack pointer 188, and multiplexer 184, for selecting a next address source. The latter include a branch destination field from pipeline register 164, a base address register (loadable by local host 110, described below), top of stack 187 (TOS), and a relative branch destination sourced by adder 185. All of these multiplexer inputs are 16-bit. Adder 185 has, as inputs, program counter 181 and a 12-bit signed field from pipeline register 164. This pipeline structure results in a "delayed branch," with the instruction following a branch always being executed.

TABLE 3

(TCTLR Sequencer Instruction Types)

| | |
|---|---|
| Increment | Constant field also provided for loop counts |
| Long Jump | 16-bit absolute address |
| Short Branch | Branch conditional to relative address, using signed displacement. |
| Long Branch | Branch conditional to absolute address defined by either top-of-stack (TOS) or base register 183, as specified by special field. |

TABLE 4

(Branch Conditions)

| SEL | Symbol | Condition |
|---|---|---|
| 0 | CTNZ0 | Repeat counter 171 (RPT0) NOT zero |
| 1 | CTNZ1 | Repeat counter 172 (RPT1) NOT zero |
| 2 | CNTZ2 | Repeat counter 176 (RPT2) NOT zero |
| 3 | ILOCK2 | ILOCK2 asserted |
| 4 | ILOCK3 | ILOCK3 asserted |

TABLE 4-continued (Branch Conditions)

| SEL | Symbol | Condition |
|---|---|---|
| 5 | ILOCK5 | ILOCK5 asserted |
| 6 | | — |
| 7 | TRUE | (always branch) |

Note:
testing of CNTZ0, CNTZ1, or CNTZ2 causes the associated repeat counter to be automatically decremented, following the test.

Figures 29A, 29B:
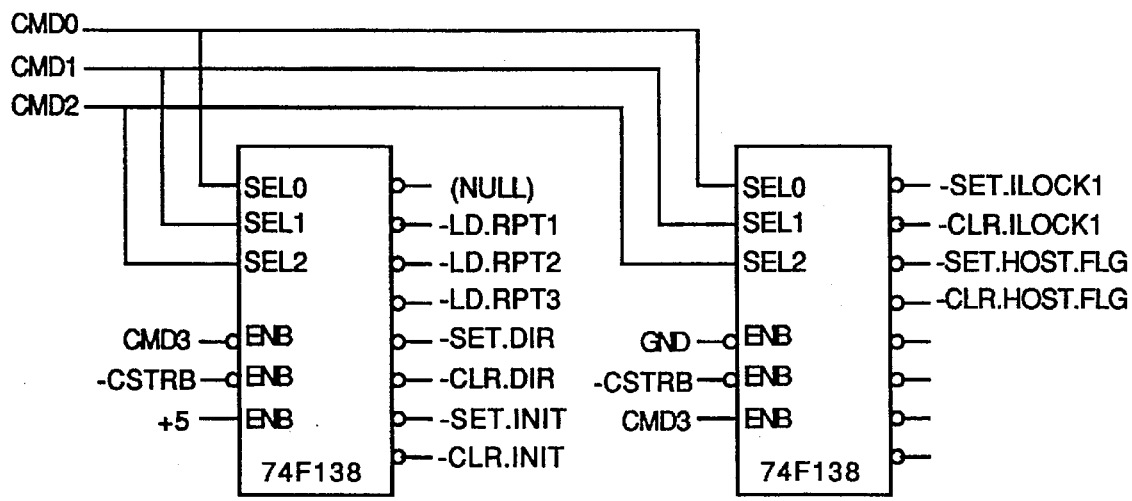
FIG. 29a shows sequencer instruction formats.
FIG. 29b shows miscellaneous command decoder.

FIG. 29a illustrates the formats, or types, of the 24-bit instruction field (see also Table 3). Several fields are common to all instruction types: stack manipulation code, STK, and the command code CMD. The remaining fields are subject to interpretation as a function of the type code. INC, the most common instruction, causes instruction flow to advance to the next sequential location. A 12-bit constant field is also provided, for the loading of repeat counters, in conjunction with one of the command codes. LJMP, the next type shown, effects an unconditional branch to any word in phase memory, as specified by a 16-bit address field. The remaining two formats, SCOND and BCOND, perform conditional branching on the basis of a signal, selected from test condition bus 994, by the SEL field, as listed in Table 4. CTNZ0,1,2 are the outputs of the repeat counter not-zero detectors, and are used to test for repeat count exhaustion. ILOCK2,3,5 are three of the interlock signals. A TRUE condition is provided, to allow unconditional branching. In the case of SCOND a 12-bit signed (2's complement) relative branch is used. In the case of BCOND a full 16-bit absolute address, from either TOS or base register 183, is used. The S field selects between TOS (S=0) and base register (S=1).

Stack pointer 188 can be incremented (push), decremented (pop), cleared, or left alone, as determined by the 2-bit STK field in pipeline register 164 (see Table 5), to support subroutine calls and looping. Program counter 181 can be incremented, without involving multiplexer 184.

TABLE 5

(Stack Manipulation Codes)

| 0 | 0 | Null |
|---|---|---|
| 0 | 1 | Push |
| 1 | 0 | Pop |
| 1 | 1 | Clear |

Figure 30A:
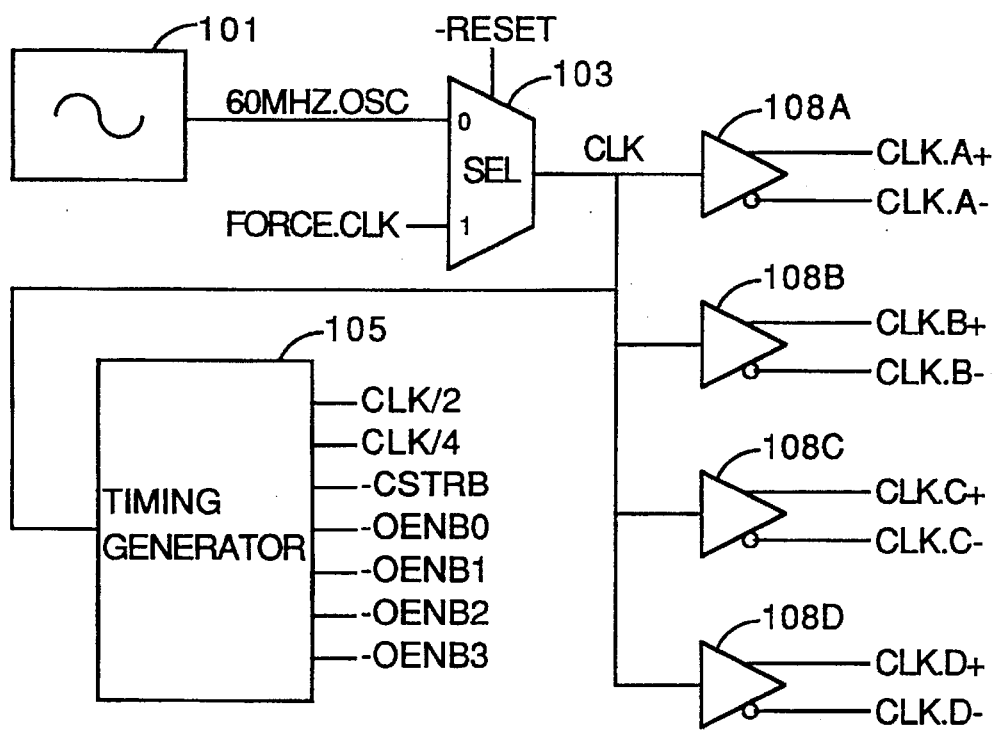
FIG. 30a shows sequencer timing logic.
Figure 30B:
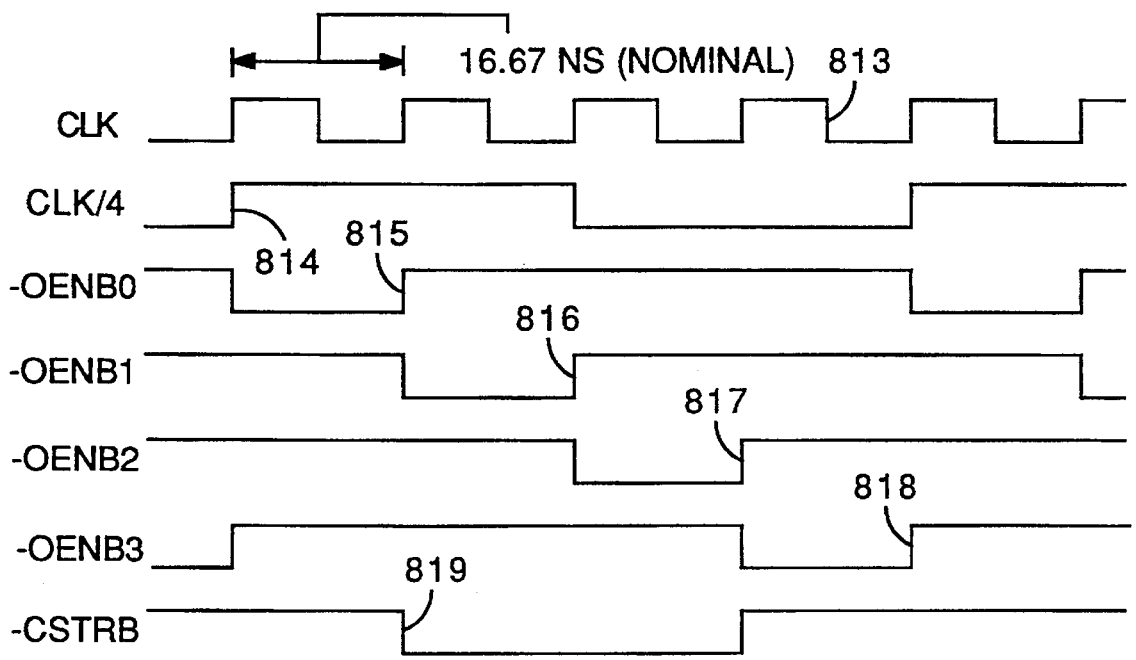
FIG. 30b shows timing waveforms related to previous figure.

Command decoder 168 (FIG. 29b) selects one of several miscellaneous commands for setting and clearing certain control bits (including ILOCK<1,4>), and loading repeat counters (see Table 6). In the latter case, a 12-bit field in pipeline register 184, or a 16-bit value in local-host writeable table 175, provides the load data. The 4-bit CMD field controls two 74F138 decoders, with the CMD3 (the upper bit) serving as chip select. Command strobe −CSTRB has free-running waveform 819, directly related to the clock signals, as shown in FIG. 30b.

TABLE 6

(Miscellaneous Command Codes)

| 0 | Null |
|---|---|
| 1 | (LD.RPT0) load repeat counter 171 with 12-bit constant |
| 2 | (LD.RPT1) load repeat counter 172 with 12-bit constant |
| 3 | (LD.RPT2) load repeat counter 176 from table 175, and decrement address counter 173. |
| 4 | (SET.DIR) set global direction bit 169 |
| 5 | (CLR.DIR) clear global direction bit 169 |
| 6 | (SET.INIT) set INIT (general initialization bit) |
| 7 | (CLR.INIT) clear INIT (general initialization bit) |
| 8 | (SET.ILOCK1) set interlock flag ILOCK1 |
| 9 | (CLR.ILOCK1) clear interlock flag ILOCK1 |
| 10 | (SET.ILOCK4) set interlock flag ILOCK4 |
| 11 | (CLR.ILOCK4) clear interlock flag ILOCK4 |

Instruction decoder 186 determines the next address source (i.e., selection control for multiplexer 184, and increment/load control for program counter 181) on the basis of a two-bit instruction type field from pipeline register 164. In the case of conditional branches, repeat counter not-zero conditions CTNZ<0–2> and interlock signals ILOCK<2,3,5> are also factored in. Instruction decoder 186 can be constructed using combinatorial logic techniques well-known in the art, and is not further detailed.

Base address register 183, writeable by the local host, determines the starting address of the segment currently being executed. In a typical scenario, sequencer code repetitively loops back to this base address at the end of each pass of an iterative routine.

Figure 28:
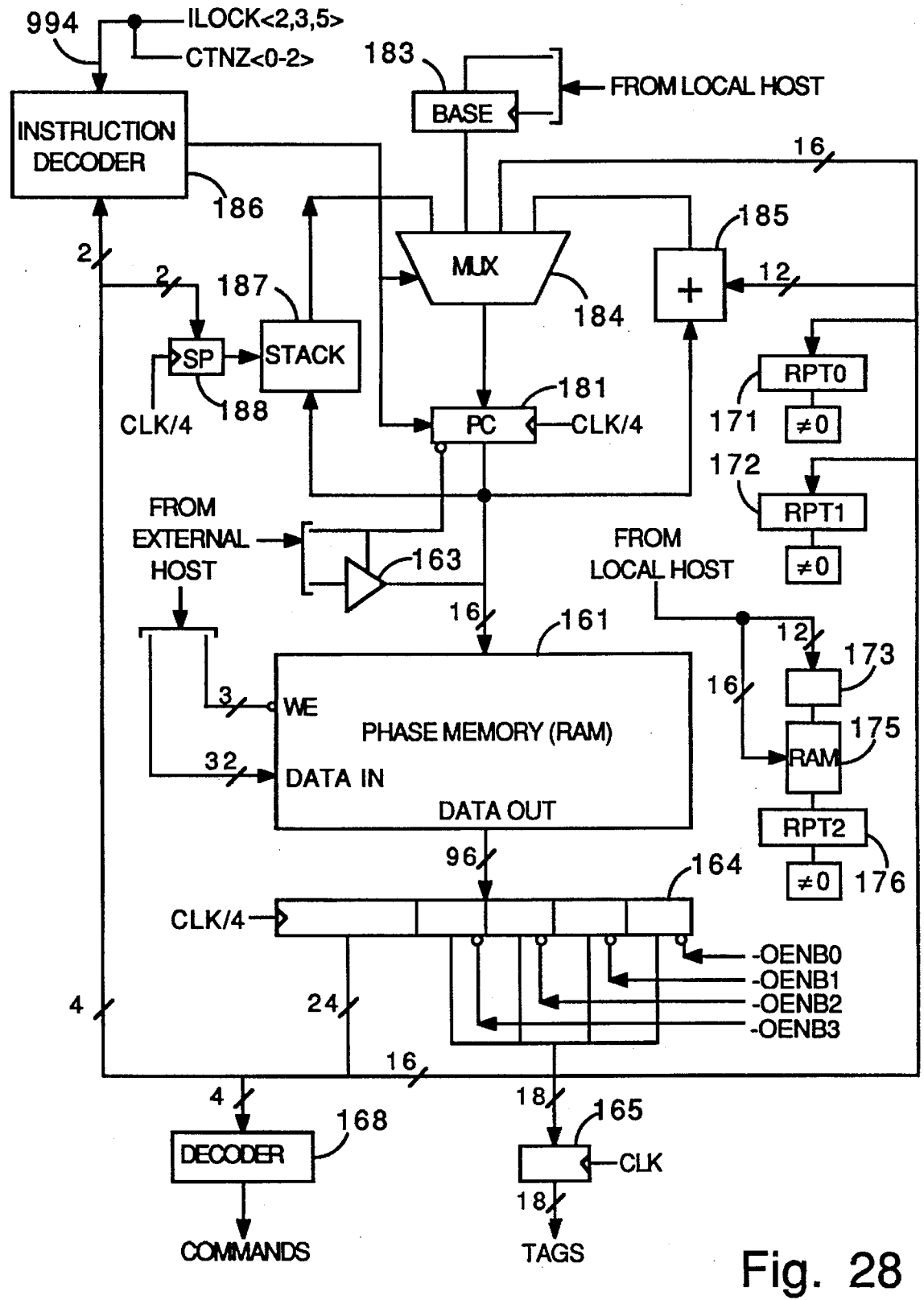
FIG. 28 shows detailed block diagram of TCTLR sequencer.

Phase memory 161 is partitioned into three 32-bit wide sectors, for the purpose of downloading from external host 600 (FIG. 1). The elements involved in this process are shown in FIG. 28. Buffer 163 can be enabled, in conjunction with disabling of program counter 181 outputs, so as to allow the external host to drive in write addresses. The 16-bit host address driving buffer 163, as well as the enable control line are indicated in the figure. Also shown, is a 32-bit data in field, bussed to the three sectors of phase memory. A write enable line, for each sector, completes the downloading mechanism.

Timing logic 107 is the source of system clocking, including those clock rails distributed to the nodes, discussed above. FIG. 30a provides internal details of timing logic 107. The source clock for the system is oscillator 101, with output 60 MHz. OSC. Depending on the state of signal −RESET (sourced, effectively, by the external host), multiplexor 103 selects 60 MHz. OSC or FORCE.CLK, to create signal CLK, which is buffered and distributed (differentially) to the nodes as CLK.<A–D>+ and CLK.<A–D>−. These rails are instances of the rails, CLK+ and CLK−, shown (abstractly) in FIG. 23a. During normal system operation, signal RESET is de-asserted, thus causing oscillator 101 to serve as the source of signal CLK. When RESET is asserted multiplexor 103 causes signal FORCE-.CLK to be selected as the clock source. As FORCE.CLK is under the control of the external host (as explained below), this allows the TCTLR, and system as a whole, to be force cycled, for the purpose of initialization. FIG. 30b illustrates the relationship of several of the more important timing signals in the system.

Edge-sensitive clocking in this embodiment is, by way of illustration and not limitation, performed on the LEADING edge, unless otherwise stated. Waveform 814 of CLK/4, having one fourth the frequency of waveform 813 of signal CLK, must have its rising edge as closely in phase as possible with that of signal CLK. (The minimization of skew between the coincident rising edges of CLK and CLK/4 is a critical detail of this embodiment.) Signals −OENB<0–3>, having periodic waveforms 815–818, are used for enabling, cyclically, the 18-bit sections of pipeline register 164 containing the tag generation fields. Their timing is somewhat less critical than that of CLK/4, provided their switching edges lag the rising edges of CLK by a few nanoseconds. The generation of these signals, as described, can be effected by timing generator 105, using techniques well-known in the art.

Relative to the data pipe, the TCTLR is very similar to other nodes, excepting the presence of two extra pipeline stages. Registered buffers 102RA, 102TA, 102RB, 102TB, 102RC, and 102RT provide three such stages, a convenience from the viewpoint of layout and trace-length. Bus junction 992, driven by buffers 102RA, 102TC, 106T, and 167, is the point where the TCTLR samples network data, and inserts data into the network. To mediate these transfers, the TCTLR is provided with slave logic 130, quite similar to that of the nodes, detailed above. Slave logic 130 is not normally provided with an ROI, though to do so is a simple extension of the embodiment.

The TCTLR is also provided with a processor, local host 110, which serves as an overseer of network activities, including communications and processing. This processor is implemented with a TMS320C30 processor. The latter device is essentially a superset of the TMS320C31, used in the processor nodes. In particular, it has a second ("expansion") port, which is convenient for interfacing the TCTLR (and ring network as a whole) to an external host, such as a SPARC workstation.

Local host 110 is provided with mechanisms for mediating the flow of TCTLR sequencer 160. For example, sequencer base register 183 is mapped, as a device, into the address space of local host 110. (The techniques for this sort of mapping are well-known in the art and are not detailed here). Interlock signal ILOCK5, driven by its (TMS320C30) XF0 pin, allows local host 110 to signal TCTLR sequencer. Conversely, the TCTLR sequencer can signal local host 110, via signal ILOCK4, which is connected to the −INT0 pin of local host 110.

Local memory 121 is shared by local host 110 and slave logic 130 in exactly the same manner detailed above, in connection with processor node 200, and its component elements 210, 221, 222, and 230. Thus, slave logic 130 (FIG. 31a) is equipped with a tag RAM 131, situated between address register 132 and data register 133, whose four-bit tag type codes are interpreted by communication state machine 134, exactly as with processor node state machine 234. The flow illustrated in FIGS. 24a–c is also used in state machine 134. Network references to local memory 121 use addresses sourced by address logic 122 (FIG. 31b). This logic is equipped with read pointer 123, write pointer 124 and stride register 125. Adder 126 allows either pointer to be augmented by the value in the stride register. Through buffers 127 and 128, either this adder result or load data, sourced by the network, can be deposited into one of the pointers, or the stride register. These operations are exactly analogous to those of processor node 200, described above. Read pointer 123 and write pointer 124 are both implemented as 18-bit counters. Consequently, local memory 121 can be up to 256K×32, somewhat larger than the 64K×32 used for node local memory 221. (It will be noted that the 32-bit constant feature supports the loading of the TCTLR address registers.) As in the case of the processor node, a single (common) pointer scheme can be used here.

The sizes of local memories 121 (TCTLR) and 221 (processor nodes) are dicatated by technology and market cost. Larger memories may very well be required for some applications, and constitute an obvious and straightforward extension of this embodiment. The 32-bit constant feature, elaborated above, should be understood capable of supporting the addressing of much larger memories, if needed.

For the great majority of instances, data recirculates thru the stages of the data pipe resident in the TCTLR (the same thing is true of all nodes). The direction of circulation is clockwise, or counter-clockwise, depending on whether the state of global direction bit 169 is zero or one, respectively. In the clockwise case, buffers 102TA, 102TB, and 102TC (normally) have both outputs and clocking enabled, whereas, in the counter-clockwise case, buffers 102RA, 102RB, and 102RC have those functions enabled. Data in inserted into the data pipe (in several cases, detailed below) by disabling the the otherwise active local data buffer and driving the required data into bus junction 992. (The extra pipeline stages obviate the need for ever having to disable a buffer in an off-board node, as must sometimes be done in the case of processor nodes).

Upon the receipt, by slave logic 130, of a tag indicating a data transfer in or out of TCTLR local memory 121, a sequence essentially the same as that detailed above; in connection with the processor node. Since local memory 121 is shared between slave logic 130 and local host 110, the same TCTLR programming considerations elaborated above, in relation to the processing nodes, apply. For example, prior to signalling access to local memory 121, the tag stream must cause HOLD to be asserted to local host 110. The details will not be repeated, but can be referenced above.

Registered buffers 106R and 106T act as holding registers for data flowing in and out of TCTLR local storage, notably local memory 121. The function of these buffers is analogous to that of buffers 206R and 206T, in processor node 200, described above. For example, a read to local memory 121 involves data being loaded into buffer 106T, which is then driven into node 992 and, thus, the data pipe.

The selection pipe is driven either by registered buffer 104A or 104B, depending on whether the state of global direction bit 169 is zero, indicating clockwise operation, or one, indicating counter-clockwise operation. Note that the selection pipe does NOT recirculate through the TCTLR. Rather, tags are continuously sourced anew by the mechanism just described. Thus, repeating patterns of tags must be created as repeating sequences of tags sourced by the TCTLR. This mechanism requires special consideration for situations involving vertical toroidal transfers (i.e., those passing through the TCTLR port). Namely, the incoming tag stream must, after pipeline startup has occurred, be in phase with the recirculating data, associated with the vertical toroidal transfers. This end is facilitated by having the total pipeline delay of the ring network, including jumpers, straps, and extra stages, be an integer multiple of four (the number of tags generated per TCTLR word). In this embodiment, and assuming the default configuration, the ring is comprised of 76 pipeline stages: 68 nodes (including specialized ones), three internal to the TCTLR, three in the backplane interconnect associated with the TCTLR (backplane 119—see below), and one in each of two strap nodes (300A and 300B).

Table 7 (Designator Codes)

0—Tag for selection pipe

1—16-bit constant for data pipe

2—32-bit constant for data pipe

3—unused

Tag generators are piped into register 165 on each 16.67 clock edge. The leftmost two-bits of each designator is interpreted as represented in Table 7. For this purpose, selector 166 and split register 167 are provided. A code of 00 (by far the most common case) means that the remaining 16 bits are to be inserted into the selection pipe as the next tag. In this instance selector 166 simply routes the 16-bit tag field into tag output register 162, which in turn drives bus junction 993. A code of 01 means that the remaining 16 bits are to be inserted into the data pipe, as a 16-bit constant. Typically, these constants are used for loading registers in address logic 222 (or equivalent) of a particular node. Here, the rightmost 16-bits of the tag generator are routed into the lower 16-bits of split register 167. The latter 32-bit register has separate clock enables for its upper and lower halves. Concurrent with the loading of the constant into register 167, selector 166 routes a zero-valued field into the tag stream. (Zero-valued tags are, by convention, interpreted as null tags by all nodes on the ring network.) This is necessary to prevent the constant from signalling an unwanted and meaningless selection event on the network. A code of 10 means that the remaining 16 bits, together with the rightmost 16 bits of the next tag generator, are to be assembled as a 32-bit constant, and inserted into the data pipe. This process begins with the 16-bit constant field of the first tag generator being loaded into the lower half of register 167, exactly as with a code of 01. The load enable of that half of register 167 is disabled, however, on the next clock event. This causes the stored value to be held for a single clock cycle. The second tag generator, which must have a designator code of 00, is now routed into the upper (leftmost) half of split register 167. (Logic causes a second null tag value to be inserted into the tag stream, via selector 166.) The latter register now contains the assembled 32-bit constant, which can be inserted into the data pipe, via bus junction 992.

Control of selector 166, as well as load enables for split register 167, is performed by selection logic 170, detailed in FIG. 32. Signals DCODE<0,1> constitute the two-bit tag designator code, sourced by register 165 (FIG. 27). A 16-bit or 32-bit constant is signalled by a code of 01 or 10, respectively, for a single clock cycle. In either case gate 177 will assert LOADK.LO, causing the lower half of split register 167 to be loaded on the next clock cycle. At the same time, gate 178 asserts NULLTAG, causing a null tag to be driven into the tag stream. For code 01 nothing else is done, resulting in a 16-bit constant. But, for code 10 flip-flop 179 will assert LOADK.HI, on the following clock cycle, causing the upper half of split register 167 to be loaded. As the output of flip-flop 179 is also an input into gate 178, a second null tag is driven into the tag stream. Data loaded into split register 167 is that currently in the lower 16 bits of register 165.

Table 8 (Interlock Signals)

ILOCK1—TCTLR to processor nodes

ILOCK2—processor nodes to TCTLR (open collector)

ILOCK3—specialized nodes to TCTLR (open collector)

ILOCK4—TCTLR (sequencer) to local host

ILOCK5—local host to TCTLR (sequencer)

Synchronization between the distributed nodes and TCTLR sequencer 160 is communicated via ILOCK<1–3> (see Table 8). The presence of a new block of data to process, for example, can be signalled to the nodes (as a group) by the pulsing of ILOCK1. Synchronization events occurring in the nodes, for example, the completion of processing, can be signalled via ILOCK2. The latter, distributed as an open-collector signal (–ILOCK2), can be asserted (low) by any of the nodes, and can thus serve as a collective busy signal. Testable by sequencer 160, ILOCK2 can be used to determine when the nodes, as a group, have arrived at a particular synchronization barrier (e.g. the completion of a processing phase).

Sequencer 160 can keep local host 110 informed of these events via ILOCK<4,5> (see Table 8). Consequently, local host 110 can follow the sequencing of phase memory code, at least to the resolution afforded by these signals. Read phases, gathering information from the nodes, are easily incorporated into the TCTLR code, thus permitting the host to monitor status conditions in the node computations. This functionality is especially important in "dynamic" communications (described below) where the local host must perform assigned tasks upon detecting certain synchronization events. The actions which the host may take, apropos of the determined status, include changing the base address register 183, typically resulting in a switch to different set of TCTLR routines. Thus, the local host serves as overseer of the TCTLR, and, ultimately, of the ring network traffic.

Techniques well-known in the art allow for the initialization of the TCTLR and ring network as a whole. These include the forcing of the system clock (CLK) and the injection of data values into bus 992, together with address values into bus 993 (see FIG. 26). In conjunction with the pulsing of signal TR.WE (discussed above), these actions permit the downloading of the tag RAMs of the distributed nodes, and of the TCTLR itself.

The sharing of external memory 190 is easily done, again using techniques well-known in the art. The expansion port of the TMS320C30 (used for local host 110) lends itself to a simple, software-mediated, handshake protocol, between the local host and external host 600, to arbitrate access to external memory 190. Bootstrapping can be effected by hardwiring the RESET vector of the TMS320C30 to physical address 800000(hex), mapped, by convention, into expansion port memory.

The physical link to external host 600 consists of two 64-bit cables, attached to connectors 116SA-B. These cables support both initialization of the TCTLR and ring network, as well as sharing of external memory 190, during normal operation. Cable headers 116PA-B (see FIG. 33) serve as connection points for these cables. One of these cables is dedicated to a 32-bit data path, to the external host; with the other conveying address and control signals.

Figure 33:
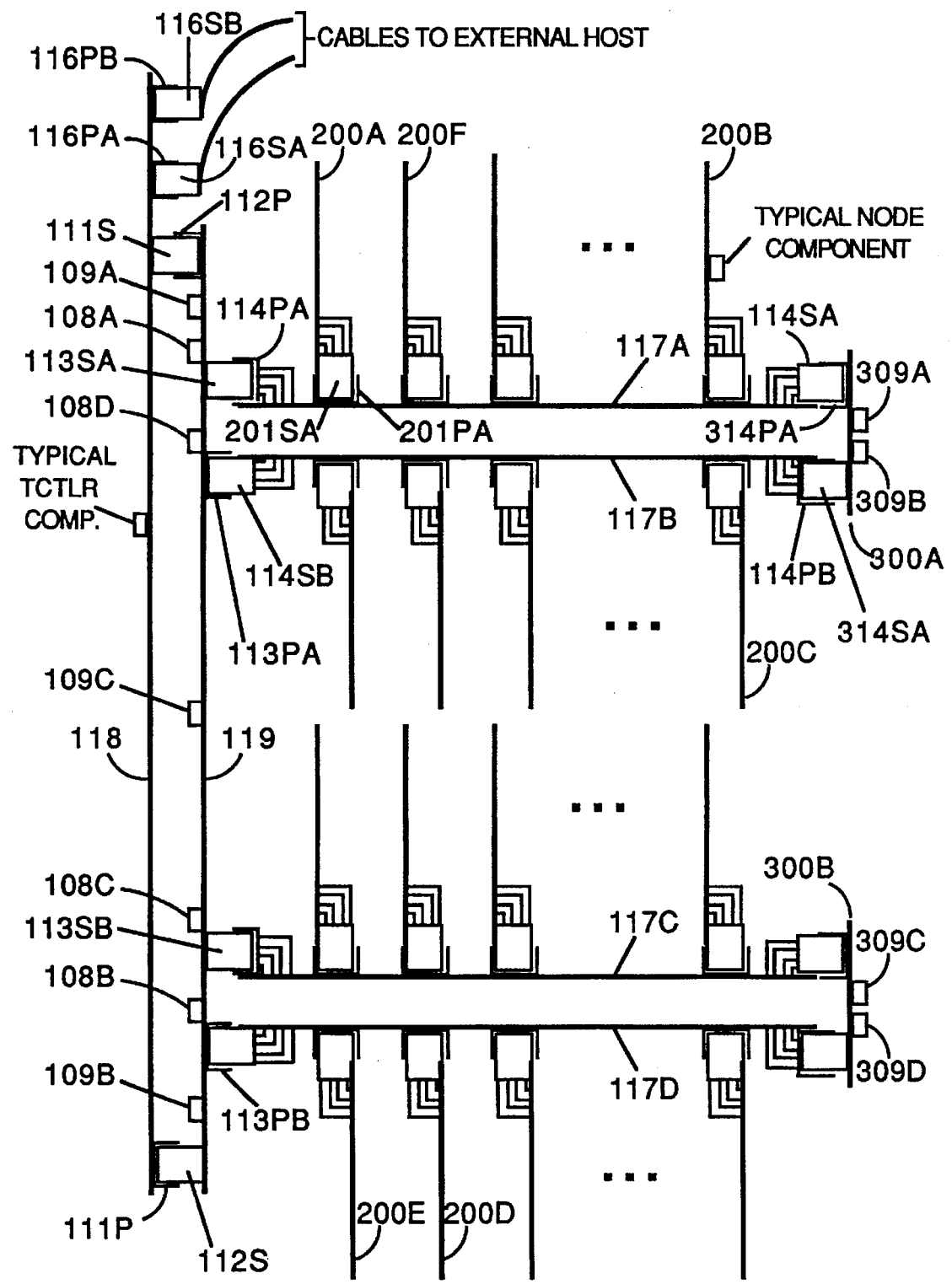
FIG. 33 illustrates physical packaging.
Figure 34:
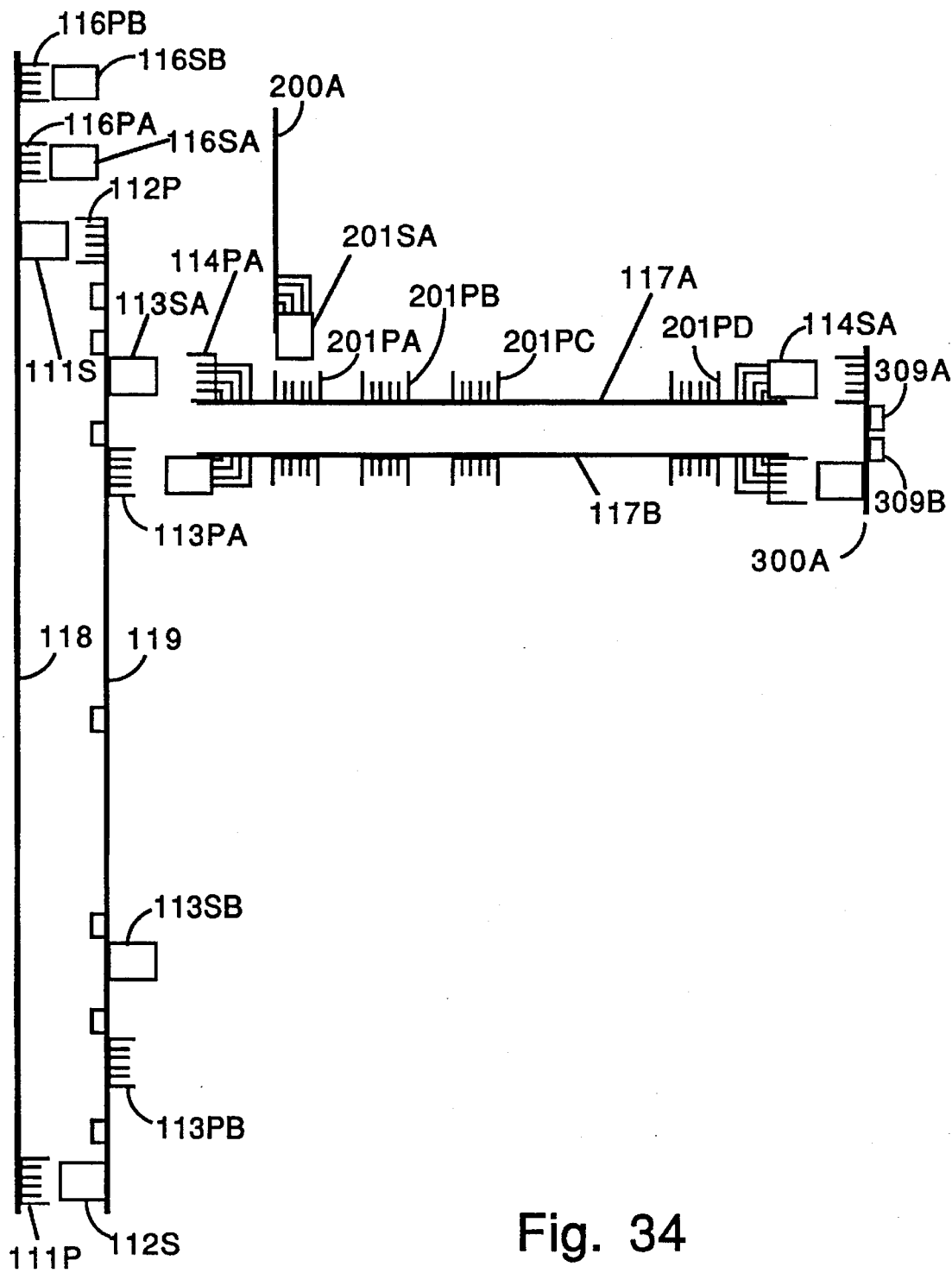
FIG. 34 shows exploded view of connectors, related to previous figure.

Packaging (FIGS. 33–35)

An important aspect of this embodiment is the packaging arrangement. In order to optimize data throughput, a geometrically compact configuration has been chosen. The scheme used is illustrated in FIGS. 33–35. FIG. 33 gives an edge view (looking down, in the air-flow direction) of the TCTLR, nodes, and straps. At the left of the figure, is the TCTLR, housed on printed circuit board 118, with component-side, as indicated (several connectors are, by necessity, mounted on the solder-side). Backplane 119, effectively an extension of the TCTLR, distributes the network signals out and back through four assemblies of nodes, situated on backplanes 117A–117D. The latter are passive backplanes, interconnecting a plurality of nodes, in a point-to-point fashion. Nodes 200A–200E (as well as others, not labeled but implied) are attached to the backplanes by means of a single 128-pin DIN-style connector. In the case of node 200A, socket connector 201SA and pin connector 201PA are shown. By way of illustration and not limitation, it is noted that AMP 532903-3, and its mating part (made by AMP, Inc.), are appropriate for this use. The latter connectors employ a 0.100" contact pitch. The packaging scheme disclosed herein easily lends itself to implementations using much smaller connectors.

Each of identical backplanes 117A–117D provide mating connectors for seventeen nodes, supporting a total of up to 68 nodes. Thus a default configuration of 64 nodes, plus up to four specialized nodes, is supported. Each unused station must be filled with a jumper node, in order to maintain continuity of information flow. The latter (not illustrated) can be viewed as processor nodes (FIGS. 23a,b) stripped of everything but buffers 202R, 202T, 204R, and 204T, together with differential receivers for CLK+/– and DIR+/–. Note that gates 203 and 208 are unnecessary, as the jumper node never "inserts" data into the data pipe. Thus the output enable of buffer 202T (driven by gate 203, in the processor node) can be controlled directly by the received direction signal, CCW.

Strap nodes 300A and 300B connect the two pairs of backplanes. These nodes are essentially jumper nodes with a second 128-pin DIN-style connector. Pin connector 315A mates with connector 114 of backplane 117A. Connectors 314PA and 314SA provide interconnection with backplane 117B. It will be noted that the latter is rotated 180 degrees, relative to the position of backplane 117A. This fact is also reflected in the orientations of the attached nodes (e.g. 200C rs. 200A).

The bulk of the TCTLR is placed on board 118, between connectors 111S and 111P. Connectors 111S and 112P allow communication with node 200A, attached to backplane 117A. Similarly, connectors 111P and 112S support communication with node 200E, attached to backplane 117D (referencing FIG. 1 may be helpful). Backplane 119, is primarily passive. An exception is the placement of clock buffers 108A–108D, on this backplane, so as to minimize length of clock rails, distributed out though the four backplanes 117A–117D. Each of these differential ECL rails is terminated on the strap nodes, in terminators 309A–309D. The portions of the clock rails within the backplanes are distributed as bussed signals. Another exception is the placement of repeater buffers 109A–109C, on backplane 119, for the signals of the selection and data pipes, so as to decrease maximum trace lengths in critical paths. These buffers serve very much the same function as jumper nodes. It will be noted that the total number of pipeline stages introduced by the interconnect alone, is five (three on backplane 119, plus two on the strap nodes 300A and 300B). Thus, including the three stages of TCTLR (on board 118), there are eight pipeline stages. Adding in the 68 pipeline stages of the distributed nodes (or jumpers), we have a system total of 76 pipeline stages.

FIG. 34 shows an exploded view of the components of FIG. 33 (omitting the lower two backplanes 117C and 117D, as well as the nodes other than that labeled 200A), making, perhaps, the connector styles and relationships more clear. All connectors are 128-pin DIN-style, unless otherwise stated. On printed circuit board 118 (TCTLR), connector 111S is socket-style and 111P is pin-style. The mating parts on backplane 119 are connectors 112P (pin) and 112S (socket). Similarly, on backplane 119, 113SA and 113SB are socket-style, whereas 113PA and 113PB are pin-style. The mating part for connector 135A is shown as being right-angle pin connector 114PA on backplane 117A. Each node board (processor or specialized) is provided with a right-angle socket connector, e.g. 201SA on node 200A. These node connectors have, as mating parts, the pin connectors 201PA–201PD (other are implied, but not shown). Right-angle socket connector 114SA, on backplane 117A, mates with a pin connector on strap node 300A. A plug-style connector, on that strap node, provides interconnection with the lower backplane 117B. The latter, it will be noted, is rotated 180 degrees, relative to backplane 117A. Thus a right-angle plug connector at its left end serves to mate with pin connector 113PA on active backplane 119. Headers 116PA and 116PB, on printed circuit board 118, are of the more common 96-pin variety. This is because they accommodate 64-conductor flat cable connectors 116SA and 116SB. (The middle rows of these cable headers, as well as of the mating connectors, are unused). The associated cables support the external host interface, discussed above.

Figure 35A:
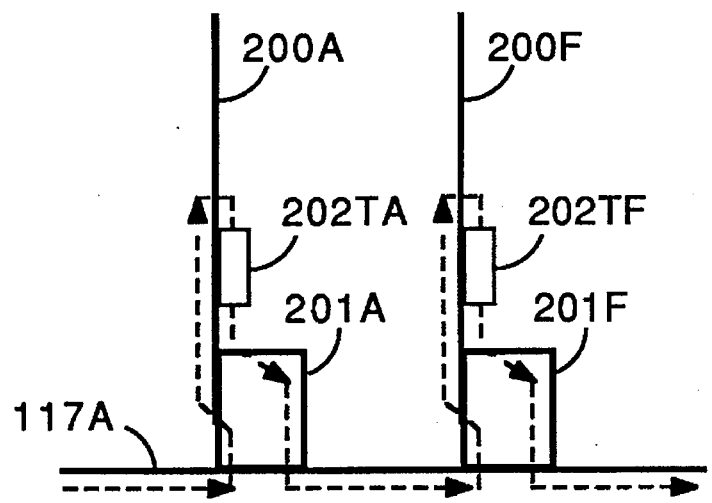
FIG. 35a,b illustrate information flow through backplane units.

FIG. 35a illustrates the flow of information in and out of adjacent nodes 200A and 200F, attached to backplane 117A. The dotted line represents a clockwise data flow, up through connector 201A and being received by buffer 202TA (i.e. the instance of component 202T on node 200A). That buffer, in turn, drives back out through connector 201A, along the backplane, and up through adjacent connector 201F, where the signal is received by buffer 202TF (i.e. the instance of component 202T on node 200F). The critical path is thus seen to be quite short, especially since it is easy to situate buffer 202T close to connector 201 on node 200 (the last three reference numeral refer to the uninstantiated node). The same sort of efficient geometry is equally applicable to specialized nodes. Thus, the internode path passes through two connectors and a short length (around 50 mm) of conductor trace. Similar efficiency can be achieved at the strap-end of the backplanes 117A and 117B. The presence of data and selection pipe buffers on the strap node results in roughly the same critical path properties: two connector transits and a short length of trace.

Figure 35B:
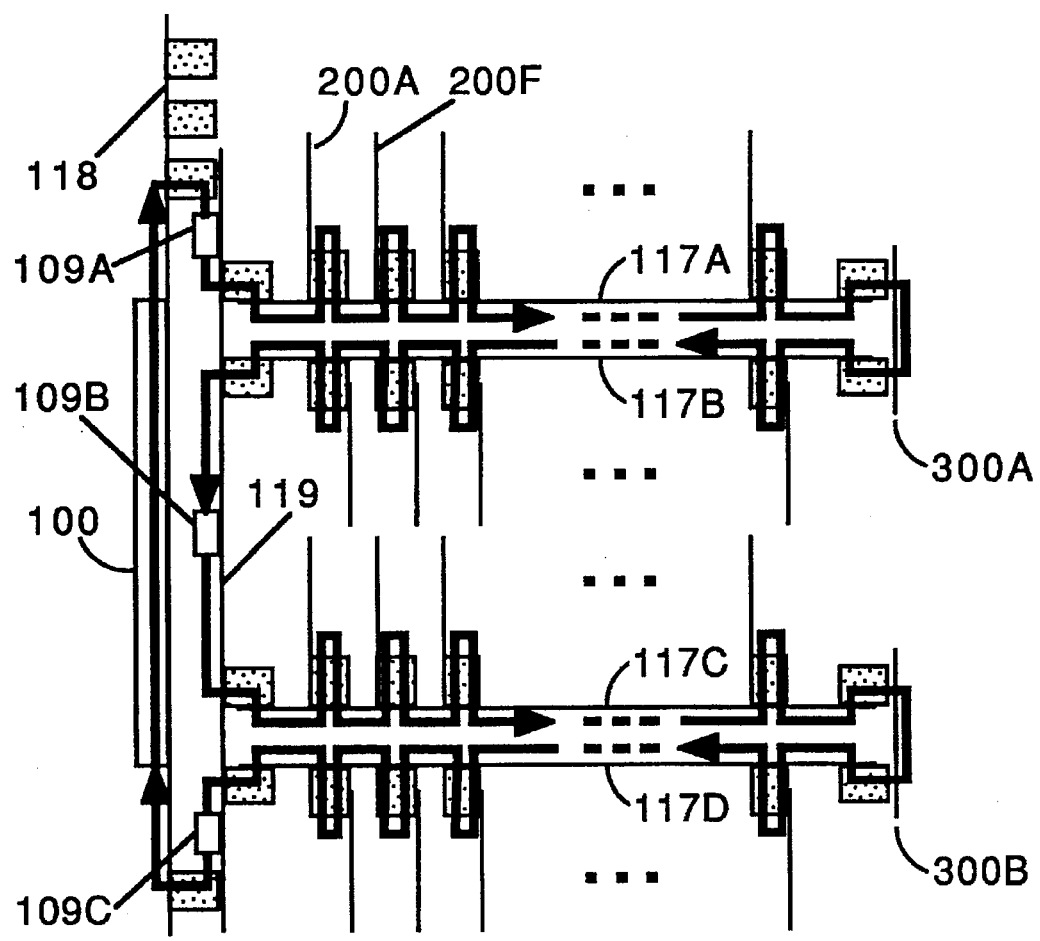

FIG. 35b illustrates clockwise data flow through a 64-node configuration. TCTLR 100 occupies the PC board space indicated in the figure. Data and tag buffers at both top and bottom of the TCTLR, as shown, again keep the critical paths short. Thus, information flows (clockwise) out of the top of the TCTLR, through buffer 109A, and into backplane 117A, transversing its attached nodes in a serpentine fashion. After passing through strap node 300A, flow proceeds thorough the backplane 117B, and back to backplane 119. Flow then continues down, through buffer 109B, provided to reduce the critical path. The flow pattern is repeated, in backplanes 117C and 117D, and finally, down to buffer 109C, after which it circulates back up through the bottom of the TCTLR. The tight geometrical layout made possible by the serpentine flow can be noted. Though the AMP connectors, mentioned by way of illustration, have 0.100" contact pitches, a much denser packaging is clearly possible, using higher density connectors.

In the above structural description, many implementation details, not explicitly given, will be readily apparent to those practiced in the art. For example, in FIG. 23b, the creation of signal DRIVE.PBUS, from active low signal −DRIVE.PBUS, by means of an inverter, is implied. Similarly, in the packaging description, the sourcing and distribution of electrical power, not discussed, can be accomplished by techniques well-known in the art.

III—OPERATION (FIGS. 36–40)

TCTLR Sequencer Code

Several illustrative examples of TCTLR sequencer coding will now be given. The following conventions will be used:

1. The instruction types are as shown in FIG. 30a, i.e. INC, LJMP, SCOND, and BCOND.
2. Values of the (BCOND) S field are represented by the suffices TOS and BASE, meaning S=0 and S=1, respectively. For example, "BCOND-TOS . . . " calls for a BCOND instruction type, with S=0, whereas "BCOND-BASE . . . " calls for BCOND with S=1.
3. Stack code symbols are derived from Table 5. Possibilities are PUSH, POP, and CLEAR. Absence of code implies NULL.
4. CMD field symbols are derived from Table 6. These symbols are distinguished by "." in name, e.g. "SET.DIR".
5. Branch condition symbols are derived from Table 4. Every branch instruction will contain exactly one of these symbols.
6. Branch addresses are represented by target symbols, with the required arithmetic, in the case of SCOND, being implicit.
7. Numeric constants are shown in decimal.
8. The four tag values for each instruction are listed (or implied) at the end of the line of code. Tags not involved in constant generation are shown as plain numbers, with an implied designator code of zero. Values listed are inserted into selection pipe in order, starting from RIGHT.
9. Constants are prefaced with "K:". Thus, "K:BF1" calls for 16-bit constant, with symbolic value BF1 (address constant).
10. The following tag assignments are in effect (some additional—non-conflicting—assignments, for DYNAM1, are listed below):

| Value | Nodes | Purpose |
|---|---|---|
| 5000 | all even nodes | set R/~W bit (enter read mode) |
| 5001 | " | clear R/~W bit (enter write mode) |
| 5002 | all odd nodes | set R/~W bit (enter read mode) |
| 5003 | " | clear R/~W bit (enter write mode) |
| 5004 | all nodes | enter HOLD mode for pointer load |
| 5006 | " | enter HOLD mode for data R/W |
| 5007 | all nodes | release from HOLD mode |
| 5008 | all even nodes | load read pointer |
| 5009 | all odd nodes | load read pointer |
| 5010 | all even nodes | load write pointer |
| 5011 | all odd nodes | load write pointer |
| 1001 | 0, 1, 8, 9, 16, 17, 24, 25, 32, 33, 40, 41, 48, 49, 56, 67 | data cycle (channel 0) |
| 1002 | 2, 3, 10, 11, 18, 19, 26, 27, 34, 35, 42, 43 50, 51, 58, 59 | data cycle (channel 1) |
| 1003 | 4, 5, 12, 13, 20, 21, 28, 29, 36, 37, 44, 45, 52, 53, 60, 61 | data cycle (channel 2) |
| 1004 | 6, 7, 14, 15, 22, 23, 30, 31, 38, 39, (69 47, 54, 55, 62, 63 | data cycle (channel 3) |

(The assignments of tag values 1001–1004 are consistent with those used in the description of HXE1, in the SUMMARY OF THE INVENTION, and in FIG. 9)

Sample instruction (annoted):

| TYPE | STK | CMD | CONSTANT | four tag generators | | | |
|---|---|---|---|---|---|---|---|
| ↓ | ↓ | ↓ | ↓ | ↓ | ↓ | ↓ | ↓ |
| INC | PUSH | LD.RPT0 | 599 | 1001 | 1002 | 1003 | 1004 |

Example #1: HXE1 Routine

BF0 and BF2 are the base addresses of even node read and write buffers, respectively. BF1 and BF3 are similar addresses for the odd nodes. At the start, the network is assumed to be in the clockwise state (DIR=0) with the pipeline empty (containing zeroes). The HXE1 phase routine proceeds in two stages, corresponding to two minor phases. In the first stage (MP1) a block of data from buffer BF0 in each even node is transferred to buffer BF1 of the adjacent odd node in the clockwise direction. The DIR bit is then set, and a stream of null tags transmitted, to clear the pipes. In the second stage (MP2), a block of data from buffer BF3 of each odd node is transferred to buffer BF2 of the adjacent even node in the counter-clockwise direction.

```
              ; Put even nodes into read mode, and odd modes
              ; into write mode.
MP1:   INC                        0000   0000   5000   5003
              ; All nodes into HOLD mode for pointer loads (note that
              ; R/~W bits do not affect pointer loads - see FIG. 24b).
       INC                        0000   0000   0000   5004
              ; extra NOPs, to insure HOLD mode entered.
       INC                        0000   0000   0000   0000
       INC                        0000   0000   0000   0000
              ; read pointer load, followed by constant (even nodes).
       INC                        0000   0000   0000   5008
       INC                        0000   0000   0000   K:BF0
              ; write pointer load, followed by constant (odd nodes).
       INC                        0000   0000   0000   5011
       INC                        0000   0000   0000   K:BF3
              ; NOPs, to allow pointer writes to complete.
       INC                        0000   0000   0000   0000
       INC                        0000   0000   0000   0000
              ; All modes into HOLD mode for data R/W.
       INC                        0000   0000   0000   5006
       INC                        0000   0000   0000   0000
              ; Push LP1 --> stack, load repeat count (599) --> RPT0,
              ; and then start systolic tag sequence. Note that repeat
              ; loop executes two instructions (LP1 & LP1+1) on each
              ; iteration. Hence COUNT = 599 results in 600 executions
              ; of loop body, i.e. 1200 instructions, and 4800 tags.
       INC PUSH LD.RPT0 599       0000   0000   0000   0000
LP1:   BCOND-TOS CTNZ0            1001   1002   1003   1004
       INC                        1001   1002   1003   1004
              ; Release nodes, and insert zero trailer. Push address of
              ; BCOND and load RPT0 with 9. Generates 79 null tags.
       INC PUSH LD.RPT0 9         0000   0000   0000   5007
       BCOND-TOS CTNZ0            0000   0000   0000   0000
       INC                        0000   0000   0000   0000
       INC                        0000   0000   0000   0000
              ; Reverse network direction.
       INC SET.DIR                0000   0000   0000   0000
              ; Put even nodes into write mode, and odd nodes into
              ; read mode.
MP2:   INC                        0000   0000   5001   5002
              ; All nodes into HOLD mode for pointer loads (note that
              ; R/~W bits do not affect pointer loads - see FIG. 24b)
       INC                        0000   0000   0000   5004
              ; extra NOPs, to insure HOLD mode entered.
       INC                        0000   0000   0000   0000
       INC                        0000   0000   0000   0000
              ; write pointer load, followed by constant (even nodes).
       INC                        0000   0000   0000   5010
       INC                        0000   0000   0000   K:BF2
              ; read pointer load, followed by constant (odd nodes).
       INC                        0000   0000   0000   5009
       INC                        0000   0000   0000   K:BF1
              ; Insert NOPs, to allow pointer writes to complete.
       INC                        0000   0000   0000   0000
       INC                        0000   0000   0000   0000
              ; Put all nodes into HOLD mode for data R/W
       INC                        0000   0000   0000   5006
       INC                        0000   0000   0000   0000
              ; Push LP1 --> stack, load repeat count (599) --> RPT0,
              ; and then start systolic tag sequence.
       INC PUSH LD.RPT0 599       0000   0000   0000   0000
LP2:   BCOND-TOS CTNZ0            1001   1002   1003   1004
       INC                        1001   1002   1003   1004
              ; Release nodes, and insert zero trailer. Push address of
              ; BCOND and load RPT0 with 9. Generates 79 null tags.
       INC PUSH LD.RPT0 9         0000   0000   0000   5007
       BCOND-TOS CTNZ0            0000   0000   0000   0000
       INC                        0000   0000   0000   0000
       INC                        0000   0000   0000   0000
```

```
                  ; Restore network to clockwise direction.
         INC CLR.DIR              0000  0000  0000  0000
NEXT:             ; ready for next phase . . .
```

Those practiced in the art will understand that the above code is easily modified to effect many of the other systolic phases, elaborated above. Indeed, the principal change required, in many cases, will be in the tag assignments.

A second detail, alluded to earlier, but deserving reinforcement here, concerns phases involving vertical toroidal transfers, such as VXE1. It is essential that the incoming tag pattern be in phase with the recirculating data associated with those transfers. A simple strategy, here, is to insure that the overall tag pattern have a period of 76 cycles (i.e. tags). Thus, VXE1, using, as it does, five channels, might be constructed by iterating loop bodies consisting of 19 sequencer instructions, containing, say 15 copies of the five tag values 1010–1014, followed by a single null tag.

Example #2: WAIT Routine

In many situations TCTLR sequencer 160 must execute a phase which perform data communication amongst the nodes, and then wait until the nodes complete computations, using (in general) part or all of the communicated data. Interlock signal –ILOCK2 provides a convenient means for sequencer 160 to sense when all nodes have reached a synchronization barrier. –ILOCK2, implemented as a bussed open-collector signal, can be asserted (low) by any node on the network, and can hence serve as a global "busy" indicator. Upon commencing the computations mentioned above, all nodes involved pull –ILOCK2 low, by turning an open-collector driver on. When each node has completed the computation, it turns its associated driver off. When all nodes have done the same, –ILOCK2 will be pulled high.

| Value | Nodes | Purpose |
|---|---|---|
|  |  | HOLDS: |
| 6000 | Node 0 | Enter HOLD mode for data cycle |
| 6001 | Node 1 | Enter HOLD mode for data cycle |
| 6002 | Node 2 | Enter HOLD mode for data cycle |
| . |  |  |
| 6063 | Node 63 | Enter HOLD mode for data cycle |
|  |  | RELEASES: |
| 6100 | Node 0 | Release from HOLD mode |
| 6101 | Node 1 | Release from HOLD mode |
| 6102 | Node 2 | Release from HOLD mode |
| . |  |  |
| 6163 | Node 63 | Release from HOLD mode |
|  |  | DATA CYCLES: |
| 6200 | Node 0 | data cycle (+ CLK.ROI) |
|  | All others | conditional write (including CLK.ROI) |
| 6201 | Node 1 | data cycle (+ CLK.ROI) |
|  | All others | conditional write (including CLK.ROI) |
| 6202 | Node 2 | data cycle (+ CLK.ROI) |
|  | All others | conditional write (including CLK.ROI) |
| . |  |  |
| 6263 | Node 63 | data cycle (+ CLK.ROI) |
|  | All others | conditional write |
|  |  | MISC: |
| 7001 | All nodes | Set R/~W bit (enter read mode) |
| 7002 | All nodes | enter HOLD mode for pointer load |

```
              ; Data communication phase
COMM:   . . .
              ; Stall until -ILOCK2 asserted (i.e. ILOCK2 goes high).
START:  INC                      0000  0000  0000  0000
        SCOND ILOCK2 START       0000  0000  0000  0000
        INC                      0000  0000  0000  0000
              ; At least one node now busy; now wait untill all
              ; nodes have finished.
WAIT:   SCOND ILOCK2 WAIT        0000  0000  0000  0000
        INC                      0000  0000  0000  0000
              ; Distributed computation now complete, and
              ; sequencer is ready to execute next phase.
NEXT:   . . .
```

Example #3: DYNAM1 Routine

Data blocks are broadcasted from the nodes, in succession, starting with node #0. The source buffer in each node is located at (symbolic) address OBF. Each block contains (in general) information for each of the other 63 nodes, which accept data, only if it is within the predefined generalized region-of-interest (assumed to have been setup, prior to execution of DYNAM1). Accepted data is written, by each node, in a destination buffer, located at address IBF. In general, procedures must be repeated once for each node (i.e. 64 times). The constants determining the length of each broadcast block are obtained from table 175.

The following tag assignments are used, in the code given below, for dynamic phase DYNAM1:

-continued

| Value | Nodes | Purpose |
|---|---|---|
| 7003 | All nodes | Read pointer load |
| 7004 | All nodes | Write pointer load |

It should be noted that the R/~W bit only controls data cycles, and does not affect conditional writes. That is, nodes will treat the latter cycles as actual writes, whether or not their R/~W bit is off, provided the cycles are within their regions-of-interest (see FIG. 24).

```
                ; Put all nodes into read mode (set R/~W bits).
MP2:    INC                     0000   0000   0000   7001
                ; All nodes into HOLD mode for pointer loads (note that
                ; R/~W bits do not affect pointer loads - see FIG. 24b)
        INC                     0000   0000   0000   7002
                ; extra NOPs, to insure HOLD mode entered.
        INC                     0000   0000   0000   0000
        INC                     0000   0000   0000   0000
                ; read pointer load, followed by constant.
        INC                     0000   0000   0000   7003
        INC                     0000   0000   0000   K:OBF
                ; write pointer load, followed by constant.
        INC                     0000   0000   0000   7004
        INC                     0000   0000   0000   K:IBF
                ; Insert NOPs, to allow pointer writes to complete.
                ; HOLD mode will be exited on receipt of next CD0.
        INC                     0000   0000   0000   0000
                ;SEQUENCE OF 64 BLOCK READS FROM SUCCESSIVE NODES:
                ; Put node #0 into HOLD mode for data read.
        INC                     0000   0000   0000   6000
                ; Push loop address and load RP13 from table 175.
                ; (counter 173 automatically decremented)
        INC PUSH LD.RPT3        0000   0000   0000   0000
LP0:    BCOND-TOS CTNZ3         6200   0000   0000   0000
        INC                     6200   0000   0000   0000
                ; Loop exhausted - release transmitting node.
        INC                     6100   0000   0000   0000
                ; Put node #1 into HOLD mode for data read.
        INC                     0000   0000   0000   6001
                ; Push loop address and load RPT3 from table 175.
                ; (counter 173 automatically decremented)
        INC PUSH LD.RPT3        0000   0000   0000   0000
LP1:    BCOND-TOS CNTZ3         6201   0000   0000   0000
        INC                     6201   0000   0000   0000
                ; Loop exhausted - release transmitting node.
        INC                     6101   0000   0000   0000
        . . .
                ; Put node #63 into HOLD mode for data read.
        INC                     0000   0000   0000   6063
                ; Push loop address and load RPT3 from table 175.
                ; (counter 173 automatically decremented)
        INC PUSH LD.RPT3        0000   0000   0000   0000
LP63:   BCOND-TOS CTNZ3         6263   0000   0000   0000
        INC                     6263   0000   0000   0000
                ; Loop exhausted - release transmitting node.
        INC                     6163   0000   0000   0000
                ; Dynamic phase complete. Ready for next phase . . .
NEXT:   . . .
```

Application-Specific Code (FIGS. 36-40)

By way of illustration and not limitation, the operation of this invention will be further elaborated, through several application-specific examples. In these examples, the default configuration of 64 nodes will be assumed. In each case it is not the application-specific particulars of the computations being performed within the node processors that is at issue, but rather the communication demands induced, and the manner in which they are handled within the ring network, that have been illustrated. Such computations will only be sketched out in brief, since, in each case they are well-known in the art. The format, for the most part, will as sequences of TCTLR routines, similar to (or the same as) those detailed above.

Application #1: 2D Fast Fourier Transform

Figure 36:
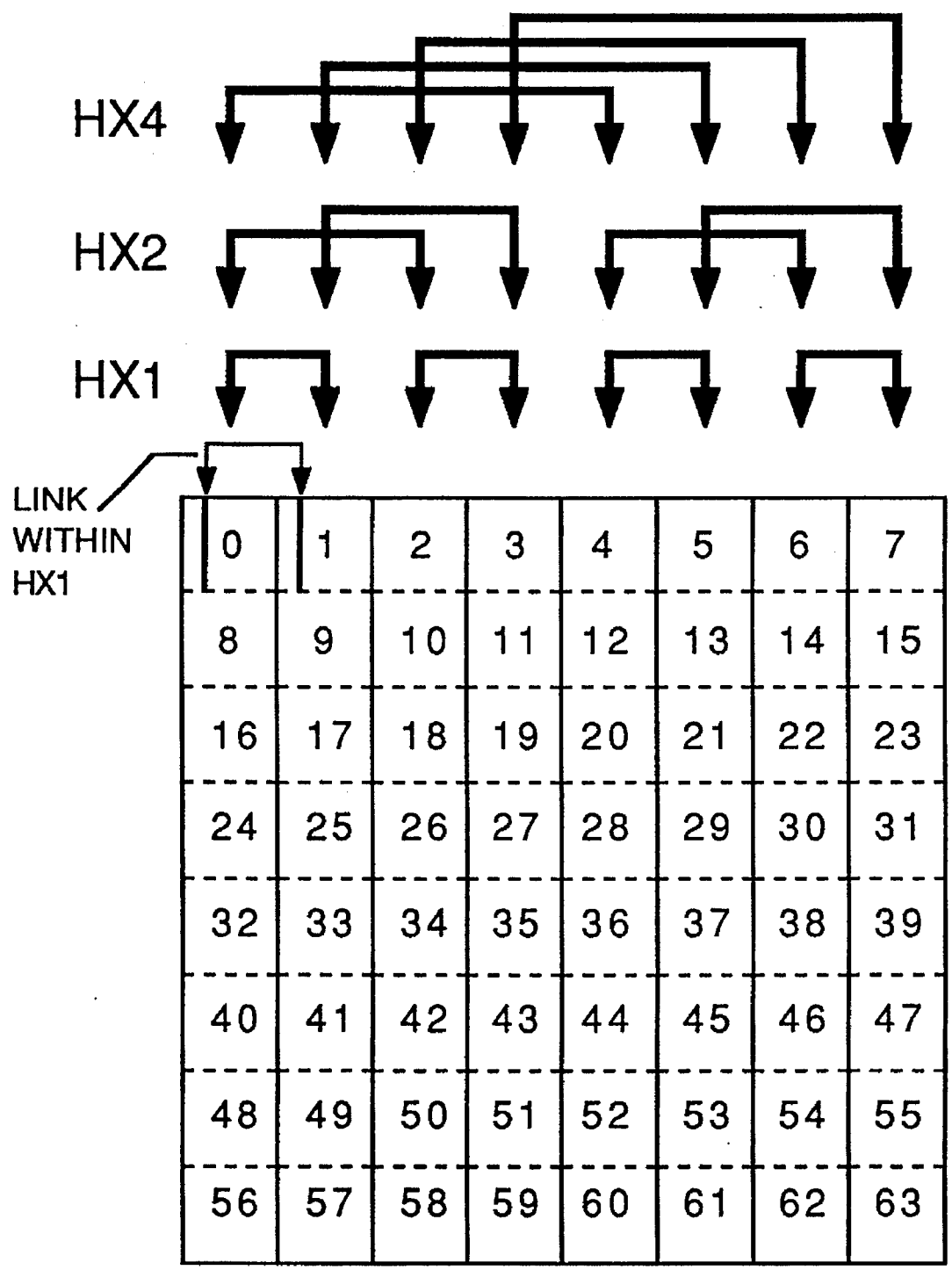
FIG. 36 illustrates horizontal exchanges in 2D-FFT.

A 2D-FFT can be effected by performing row-wise 1D-FFTs in the horizontal direction, followed by column-wise 1D-FFTs in the vertical direction, on the resulting (intermediate) array [Oppenheim and Shafer, Digital Signal Processing, p.320]. By virtue of the transpose (XPSE), both of these 1D transforms can be performed along the horizontal axis, i.e. the favored direction relative to the ring network. Using the radix-2 DIT algorithm [Oppenheim and Shafer, p. 290-9; in particular, their FIG. 6.10], each 1D-FFT decomposes, at the communication level, into a bit-reversal (BREV), followed by a exchanges of one, two and four (HXE1, HXE2, HXE4), as illustrated in FIG. 36. As represented there, the transfer links between individual nodes, induce vertical reference patterns in the nodes. It should be understood that the example in Oppenheim and Shafer deals with the simple case of an eight POINT FFT, whereas we are concerned here with a (presumably) much longer 1D-FFT, distributed, in each instance, among eight NODES. The "butterflies" will, however, result in exchanges among nodes of the sort indicated above. Namely, the smaller butterflies will be handled locally within each node, with only the three largest involving inter-node exchanges, and again in the form of butterflies. The manner in which bit-reversal induces inter-node exchanges has been explained above. There, it has also been explained how the stride registers can be used, so as to cause the indicated phases to result in exchanges between columns of data in the respective node patches, or even between columns in one patch and rows in another (mixed strides). The actual computation within each node, involving some complex arithmetic, is well known, and will be described only roughly. (The required code is typically available from DSP vendors, as an "application note.")

Figure 37A:
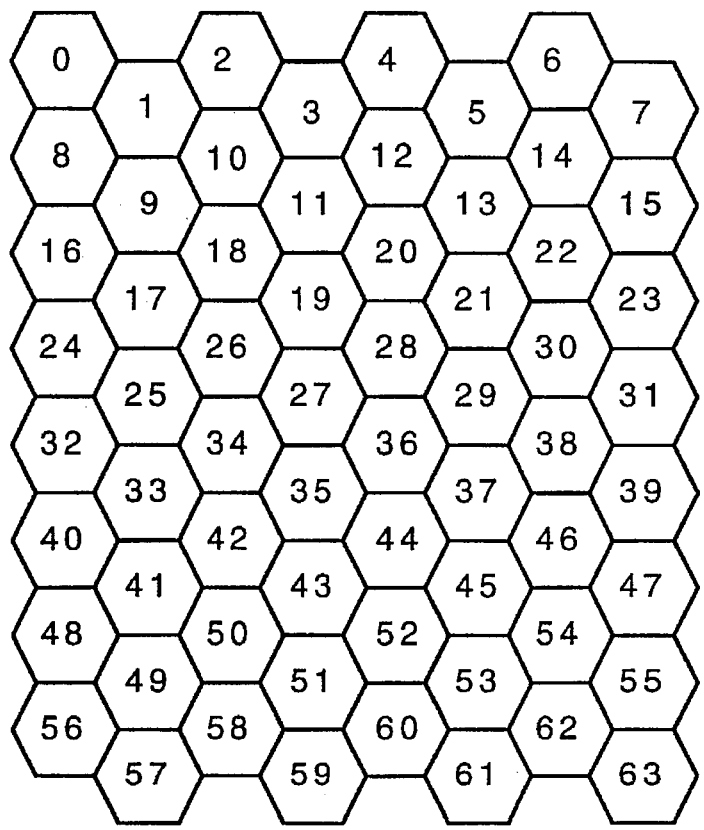
FIG. 37a,b illustrate hexagonal partitioning.
Figure 37B:
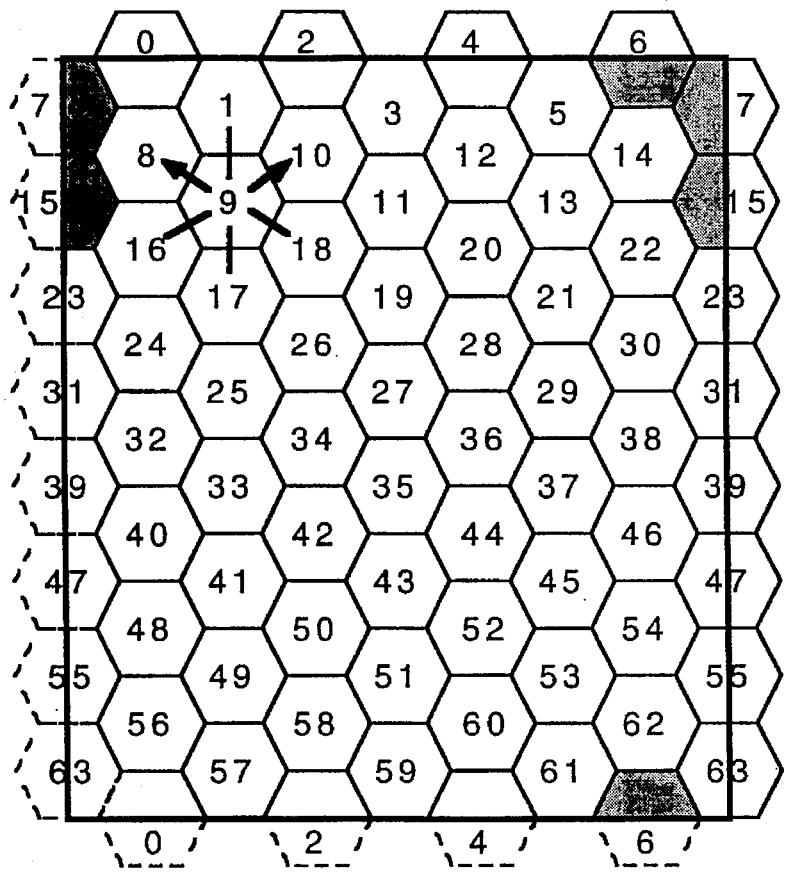

We will assume that a 512×512 image has been partitioned among the 8×8 (embedded) processor grid in the natural manner illustrated in FIG. 3b. Moreover, the original image will not be overwritten, but rather a secondary array used for the computation. Each node starts, with a 64×64 patch of the raw image. The TCTLR code below can be used to manage the 2D-FFT. The items named WAIT1-4 are instances of the TCTLR WAIT routine, detailed above, and cause the TCTLR sequencer to stall while ILOCK2 is on. The de-assertion of this signal indicates that all nodes have completed the current processing step. Other phase mnemonics shown have been defined above. Specific code for HXE1, used twice, has also been sketched out, in detail, above. There it has been noted that other systolic phases (such as HXE2 and HXE4) are simple variations of HXE1.

by giving processors on the perimeter split partition assignments, a rectangular array can be mapped into the processor grid, in a load-balanced manner, as is illustrated in FIG. 37b. It will be noted that node #6, e.g., has been assigned half of a partition at the top of the array, an another half at the bottom. Similarly, nodes #7 and #15 have been assigned partition halves from either side of the array. A consequence of the partition splitting is that nodes such as #6 require vertical toroidal links with nodes such as #61, #62, and #63, as can be seen in FIG. 37b. The directional links are illustrated at node #9, in the figure. There we see that the node must communicate horizontally with nodes #8 and #10 (indicated by lines with arrowheads), and vertically or diagonally with nodes #1, #16, #17, and #18 (indicated by plain lines).

```
; Data to be transformed is assumed pre-resident in nodes.
    ;Horizontal FFT
        BREV        ; (column-wise) address bit reversal
        WAIT1       ; nodes perform first 6 butterflies & computations
        HXE1        ; perform 7th butterfly,
        WAIT2       ; then nodes do related arithmetic
        HXE2        ; perform 8th butterfly,
        WAIT3       ; then nodes do related arithmetic
        HXE4        ; perform 9th butterfly,
        WAIT4       ; then nodes do related arithmetic
    Vertical FFT (transpose and repeat above)
        XPSE
        BREV        ; (column-wise) address bit reversal
        WAIT1       ; nodes perform first 6 butterflies & computations
        HXE1        ; perform 7th butterfly,
        WAIT2       ; then nodes do related arithmetic
        HXE2        ; perform 8th butterfly,
        WAIT3       ; then nodes do related arithmetic
        HXE4        ; perform 9th butterfly,
        WAIT4       ; then nodes do related arithmetic
        XPSE        ; transpose result back to original orientation
```

Application #2: Iterative Solutions of PDEs:

The class of local (static) communication phases, sketched out above, are applicable to many problems in parallel processing. For example, the method of successive over-relaxation (SOR), used in the numerical solution of partial differential equations, relies heavily on local communication in a grid of processors [Hockhey and Jesshope, Parallel Computers 2, p. 530]. SOR, as an iterative algorithm, can be implemented in several ways, including the Jacobi and the Gauss-Seidel methods. The latter is much preferred, on account of greatly improved convergence behavior, and can be adapted to parallel architectures, using a grid coloring scheme, such as "red-black" coloring. In this technique, points in the problem array are assigned colors, as on a checker board. The iteration then proceeds by alternating between colors. Communication efficiency can be enhanced in this algorithm by the use of hexagonal partitioning [D. A. Reed, et al, cited above]. The latter partitioning scheme has the optimal ratio of area to perimeter length, but, when mapped into a processor array (such as the embedded array of FIG. 3), requires diagonal, as well as horizontal and vertical communications. As all of these are supported by the ring network, the algorithm fits well into the associated architecture.

Figure 38:
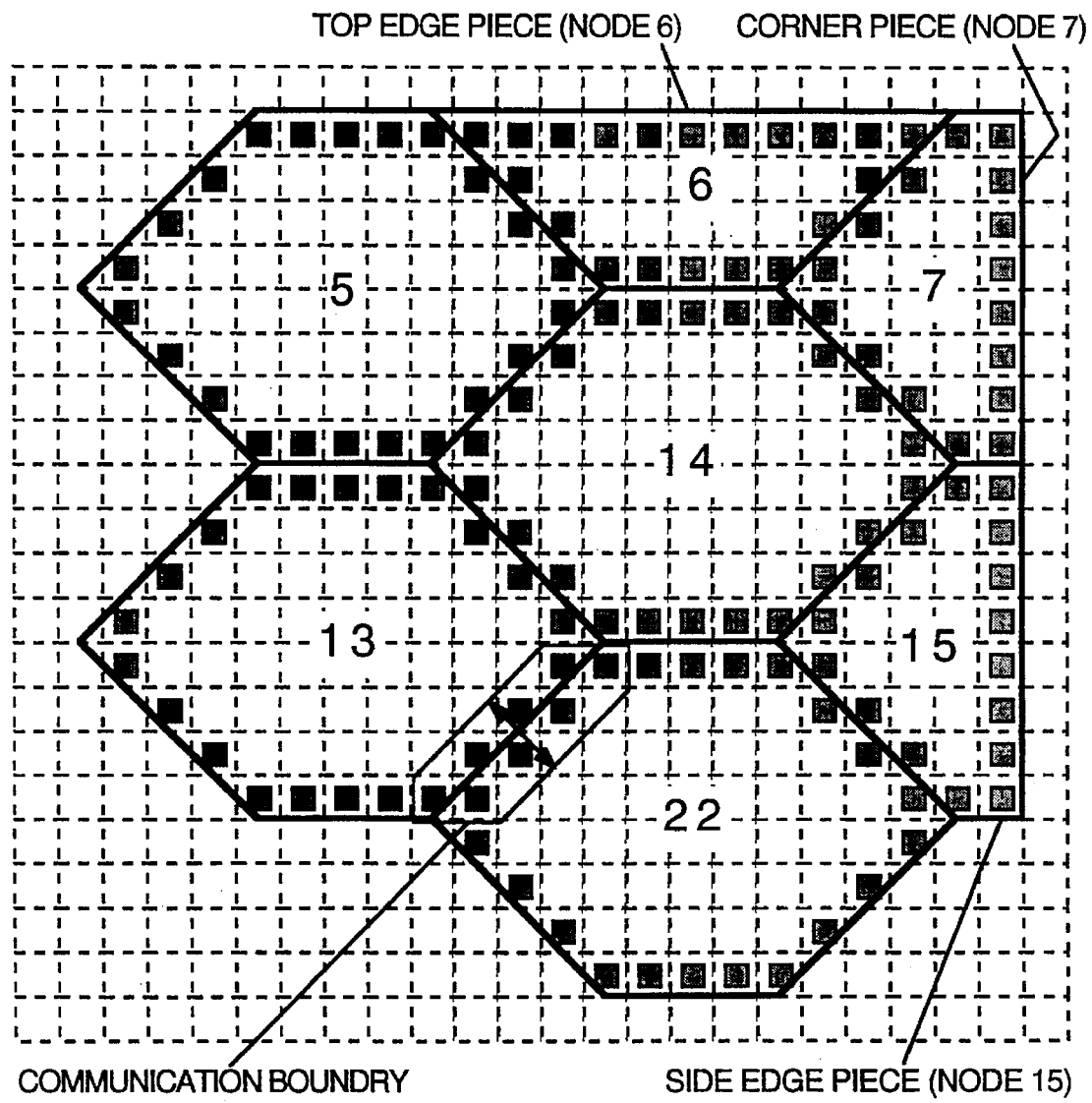
FIG. 38 shows detail of hexagonal partitioning.
Figure 39:
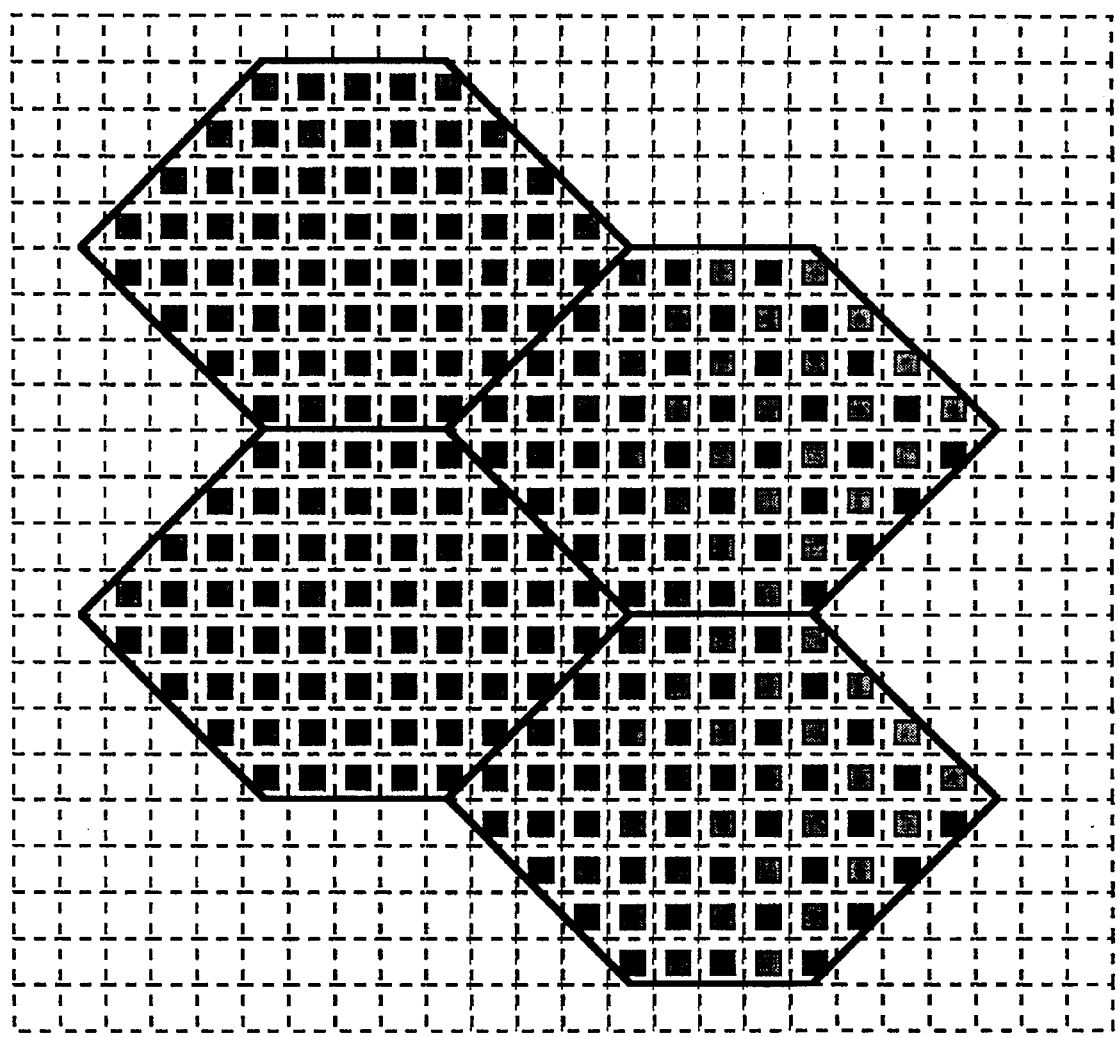
FIG. 39 illustrates red-black coloring (hexagonal partitioning).

FIG. 37 illustrates a hexagonally-organized processor grid, embedded into the ring network. The region is not naturally rectilinear, as can be seen in FIG. 37a. However, FIG. 38 shows a detail of upper right-hand corner of FIG. 37b. (Partitions are represented as having only 64 points, for illustrative purposes. In a real application, much larger partitions would normally be used.) FIG. 39 illustrates red-black coloring, applied to the hexagonal partitions. It will be noted that all communications, here, benefit from the stride functionality, described above. For example, red-colored points are uniformly spaced along diagonal lines, parallel with the diagonal boundries.

The TCTLR code shown below manages distributed versions of the iterative SOR algorithm. Starting with an estimated solution, or guess, the algorithm applies the appropriate difference equation to the points of one or the other color, in successive passes. Following each pass, boundry points must be exchanged between partitions (i.e. processor nodes). The principal task of the TCTLR is to effect the internode transfers required at the end of each iteration. The WAIT1-2 routines, as well as HXE1, are as in the previous example. Again, the other systolic phases are simple variants of HXE1. At the end of each iteration, the SIGNAL routine, informs the local host by pulsing the ILOCK4 (interlock) signal. The host terminates the overall computation after a fixed number of iterations.

The algorithmic details of the associated node processing, are well-known in the art, and will not be further elaborated here.

```
; Problem (data array) to be solved is assumed pre-resident in nodes.
; Process red-colored points
START:  HXE1            ; The six (minor) phases broken out for
        HXO1            ; illustration (HXE1 + HXO1 = HX1)
        VXE1
        VXO1
        DXSEE           ; Only even (minor) phase used here
        DXSWO           ; Only odd (minor) phase used here
        WAIT1           ; Nodes perform SOR algorithm on red points
; Process black-colored points
        HXE1            ; The six (minor) phases broken out for
        HXO1            ; illustration (HXE1 + HXO1 = HX1)
        VXE1
        VXO1
        DXSEE           ; Only even (minor) phase used here
        DXSWO           ; Only odd (minor) phase used here
        WAIT2           ; Nodes perform SOR algorithm on black points
        SIGNAL          ; pulse ILOCK4, signalling local host 110
        BCOND-BASE      ; Branch to either START or NEXT
NEXT:   ...
```

The BCOND is easily mediated by the local host, which has write-access to base address register 183, as mentioned earlier. Additional communication efficiency can be achieved here by merging the clockwise and counterclockwise components of the two sequences of six phases, shown here.

Application #3: Hough Transform

The application examples used thus far have employed only statically routed transfers. In order to illustrate the dynamic routing capabilities of this invention, a computation with inherently non-local, and run-time determined, communication requirements will be presented.

The Hough transform [C. Kimme, et al, Comm. ACM, Feb. 1975, p. 120–22] is a computation, with applications in computer vision. There are a number of embodiments and generalizations of this pattern detection tool, of which the following is a simplified example. Assume that we have a binarized image I(x,y) which has already been processed into a bit-map by any of several edge-detecting computations, well-known in the art. Thus, at any point in the image non-zero values signify points lying on edges, i.e. "edge-pixels". A simple (local) calculation, again well-known in the art, permits the calculation of the gradient of the edge. The Hough transform represents the degree to which a curve, parameterized, e.g., by an implicit equation, $$f(x, y, v) = 0 \text{ (where } v \text{ is a parameter vector),}$$

is present in the image. For a specific example, consider the case of a circle:

$$f(x, y, v) = (x-a)^2 + (y-b)^2 - r^2 = 0 \text{ (where } v=(a, b, r)).$$

For a given edge-pixel (x0,y0) in I(x,y), a straightforward (though perhaps expensive) algorithm can compute the gradient, in addition to the set of all parameter vectors (an, bn, rn) of circles which pass thru (x0,y0), with gradient equal (within some tolerance) to that measured at (x0,y0). (The use of gradients is actually an optimization, which prunes out circles which pass thru (x0,y0), but at the wrong angle.) The output of the Hough transform is an "accumulator array," with an entry for each possible parameterized curve. In this example, a 3-dimensional array, ACC(a, b, r), indexed by the position and radius of a particular circle, would be appropriate. In the case of a serial computer, execution of the transform would begin by zeroing the accumulator array, and continue by scanning thru the input array, and performing the following:

1. Examine each edge-pixel (i.e. non-zero entry)
2. Compute the local gradient at that point.
3. Compute the set of possible 3-tuples (a, b, r) representing candidate circles passing thru the edge-pixel, consistent (at least) with the local gradient.
4. Increment the entry of transform array ACC corresponding to each such 3-tuple.

At the conclusion, array ACC(a, b, r) will reflect the total tally of candidate circles. Those corresponding to actual circular outlines in the original edge-enhanced image will have significantly larger counts than those which merely reflect aliasing and noise. (Clearly, some local consolidation of array entries will be helpful in identifying true circle features. Simple grouping of adjacent, thresholded, entries may suffice.)

For a parallel architecture the principal challenge of the Hough transform lies in the communication requirements. The volume of data transfers that will be necessary is obviously dependent on the particulars of the image being processed. This inherently dynamic communication requirement is further complicated by the goal of distributing the computation. Ideally, both the input image array, and output (transform) accumulator array will be partitioned among the available processors. Thus, each processor acts in a dual capacity: first as the gatherer of the tallied information (steps 1–3, above), and second, as the keeper of a portion of the accumulator array (step 4). Between steps 3 and 4 communication is necessary. Efficiency suggests that such communications be buffered up, and performed in bursts. Additional computational burden may arise in both capacities, as a result of more sophisticated pruning techniques (e.g., using local curvature information as well as gradient), in the first case, and more sophisticated grouping algorithms, in the second. This, of course, underscores the parallelism inherent in the computation.

An implementation of the above Hough transform in the context of the disclosed ring network will now be outlined. It is assumed that the edge-enhanced image array has already been computed (e.g., in the nodes themselves) and partitioned among the node memories. It is also assumed that the transform space is similarly partitioned, in some regular fashion, among the same nodes (e.g. each node might be assigned all circles centered in a rectangular patch of (a,b)-space). Thus, each node has responsibility for computing the transform of a patch of the array, and then of communicating the combined results to the owners of the respective patches in transform space (including itself). Each node begins by performing steps 1–3, above, on the local patch, using algorithms and techniques well-known in the art. The important point, for this discussion, is that a list of candidate circles will be constructed, with each candidate corresponding to a point in transform space. Prior to the second portion of the computation (i.e. analysis and grouping of the accumulator array), this list must be sorted per destination processor, (in ascending order, say) and transferred thereto.

The mechanism, described above in the section entitled "Dynamic Communication," is now employed to accomplish the necessary transfers. It is assumed that all processing nodes are equipped with the (optional) extended ROI feature.

First each node must construct a fixed-length list, in a pre-determined location of its local memory, describing the amount of data (number of candidate circles) which it needs to transmit to each of the 63 other nodes, again sorted in ascending order by node number. Next, the TCTLR (on behalf of the host) invokes a static phase to transfer these lists (i.e. all 64 of them) into the local memory 121 of the local host, which then consolidates them into a single list defining the total data to be received by each of the 64 node processors—a simple indexing procedure. The 64 associated length specifiers are next loaded, by the host, into table 175, followed by the clearing of address counter 173. In addition, the host constructs, by a simple cross-indexing, 64 separate lists, containing 63 entry pairs each, defining the size of the data block which a given node is to receive from each of its 63 associates, as well as the absolute index (relative to the start of the combined message window) of each such block. Invoking another short static phase, the TCTLR transmits these 64 separate lists to the node memories, from which the 63 entry pairs of each list is loaded, by the node processor, into its slave logic table 255, followed by the clearing of counter 254. Finally, the TCTLR invokes the actual dynamic phase, comprising block reads from each of the 64 nodes, with lengths determined by successive values read from table 175. As explained earlier, each of these block reads consists of a burst of tag values which map into reads in the particular source node, and CONDITIONAL writes in all the other nodes. These writes will induce actual writes only if they occur in one of the extend ROIs of a given node. Thus, the slave logic of each node, primed with the necessary indices and lengths, can proceed to extract the candidate circle data, sent from each communicating node, at precisely the right time.

The implied sequencing of events in the above is enforced by means of the global-interlock signals (ILOCK<2,3>), described earlier. It is important to understand that the TCTLR phases are pre-resident in that unit (having been downloaded by the external host), and will, at implicit synchronization points, be waiting to execute, pending the clearing of the relevant interlock condition. Whether this amounts to waiting upon the nodes, as a group, or upon the host processor, varies with the particular point in the flow (see code below).

Figure 40:
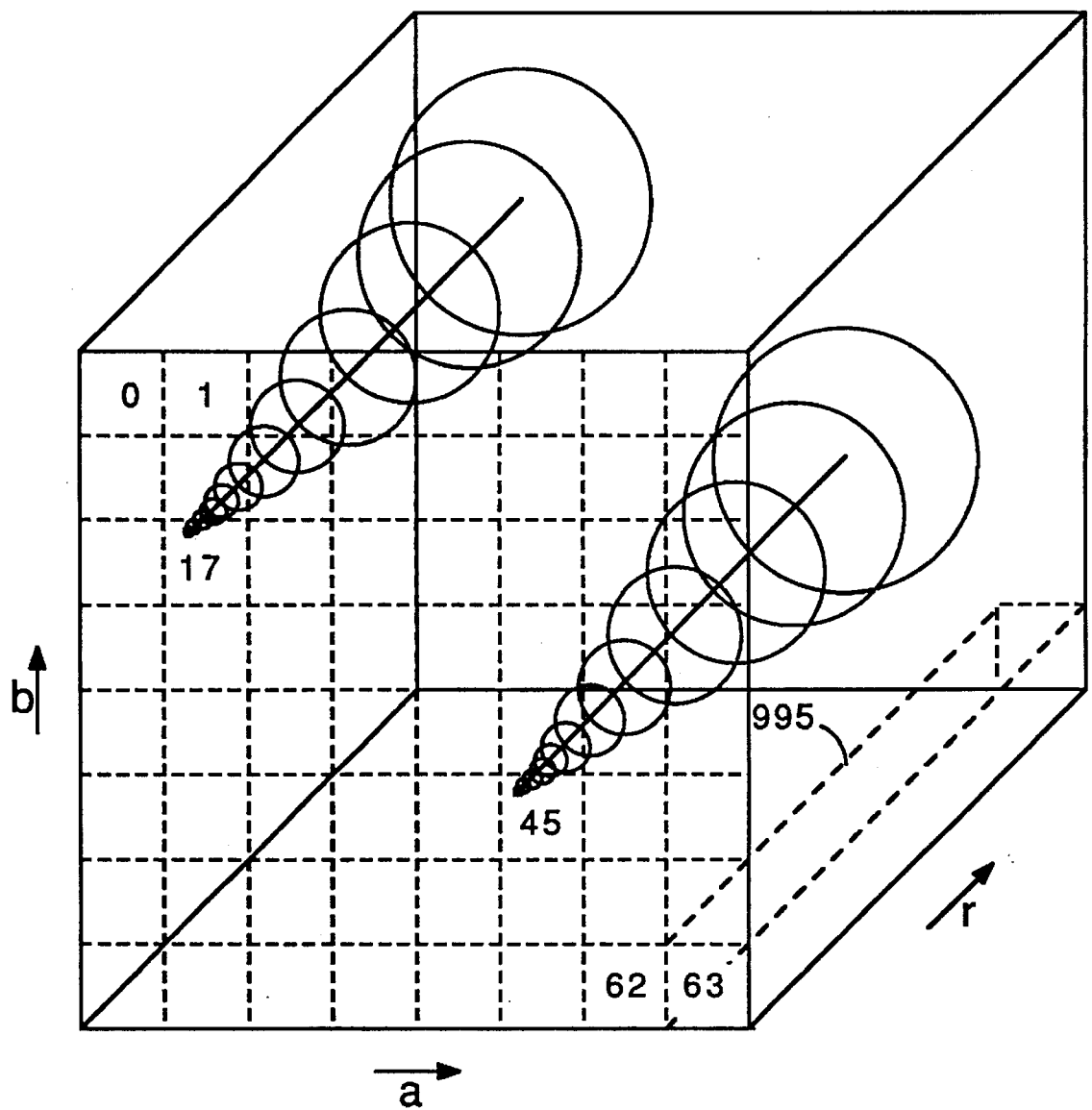
FIG. 40 represents (Hough) transform space partitioning.

Following this dynamic phase, the node processors can now tally the collected votes from all nodes (including themselves) in their portions of the accumulator array. The subsequent analysis and grouping processes, while integral to the Hough transform, serve mainly to reinforce issues covered above. For example, a grouping process, by its nature, may require some node communication to handle cases near the boundries of partitions of transform space. In one partitioning of that (3-dimensional) space, nodes might be assigned regions comprising volumes. FIG. 40 illustrates such a partitioning, with the processor array of FIG. 6 represented on the front face, spanned by the a and b-axes, of the total volume comprising the transform space. Imagining the original image as applied to that same face, potential circles of increasing radius, centered about each point in the image, project back from the face, along the r-axis. Processor #63 is shown as being assigned the circles associated with volume 995. Groupings will necessarily occur within a volume, extended perhaps by pieces of each adjacent volume (precluding very diffuse groupings which span an entire volume, and, let us say, are rejected as being insufficiently localized.) In the partitioning shown in the figure, resultant communications will involve only nodes that are neighbors in the underlying 2-dimensional grid (labeled by node number). Such communications can, as has been shown above, be efficiently implemented as static phases. Whether these same transfers might, if sufficiently sparse, be more effectively implemented by dynamic phases, is only an efficiency issue.

The TCTLR code shown below manages distributed versions of the Hough transform algorithm (for circles) described above. TCTLR tasks in this application include: polling the nodes to determine their upcoming communication requirements; transmitting the information (consolidated by the host) back to the nodes, to allow the necessary setup of slave logic; and finally invoking the actual dynamic phase, thus effecting the internode transfers. Once again, processes in the TCTLR, local host, and node processors must be interlocked. For the TCTLR these translate into wait-loops testing the global interlock signal. STAT1 and STAT2 are short static phases, wherein fixed length blocks of data are transferred between host local memory and the different node local memories. The WAIT routines and static phases are the same, or similar, to those used in the previous examples. The DYNAM1 routine has been described, in some detail, above.

```
                                ; Edge-enhanced image array is assumed pre-resident in nodes.
        START:   WAIT1      Nodes compute gradients and candidate
                            ; circles, then construct transfer-length-lists.
                            ; TCTLR waiting on ILOCK2
                 STAT1      ; Transfer-length-lists from all nodes collected
                            ; in host local memory.
                 WAIT2      ; Host consolidates length lists and constructs
                            ; 64 receive-lists, defining indices and lengths
                            ; of data blocks to be received by each node.
                            ; TCTLR waiting on ILOCK2
                 STAT2      ; Receive-lists transferred to nodes.
                 WAIT3      ; Nodes load indices and lengths in their
```

-continued

| | |
|---|---|
| | ; receive-lists into the extended ROI hardware |
| | ; of their respective slaves. |
| | ; TCTLR waiting on ELOCK2 |
| DYNAM1 | ; Dynamic phase effects actual data transfers. |
| WAIT4 | ; Nodes perform local analysis and grouping |
| | ; of data in transform space. |
| | ; TCTLR waiting on ILOCK2 |
| HX1 | ; Grouping data at boundries exchanged |
| VX1 | ; in all eight directions. |
| DXSW1 | |
| DXSE1 | |
| WAIT5 | ; Nodes perform final grouping analysis, now |
| | ; reflecting boundry data. |
| | ; TCTLR waiting on ILOCK2 |

What is claimed is:

1. A parallel processor interconnection and communication apparatus comprising a plurality of nodes, at least one of which is provided with a processing element, and a local memory element, for program and data storage, together with:

A. a first means providing a ring-structured interconnect, supporting synchronous, bidirectional, point-to-point transfers, between adjacent said nodes, comprising: a bidirectional, pipelined data bus; a bidirectional, pipelined selection bus; a direction-indicating signal; and a clock signal defining clock events for synchronous elements;

C. a second means, provided to each of said nodes, for determining, at each such said clock event, on the basis of the selection value presented in said selection bus, whether one of several node selection varieties is signalled, wherein such said value does not uniquely select a particular node but rather signals selection of two or more nodes, and wherein different varieties of selection are permitted among such selected nodes;

D. a third means, provided to at least one of said nodes, for responding to a first such said selection variety as a transmitter, by injecting a datum into said data bus, in the direction specified by said bussed direction-indicating signal, by inhibiting, and effectively overwriting, a datum forwarded via said data bus, wherein said injected datum is obtained by reading said local memory element;

E. a fourth means, provided to at least one of said nodes, for responding to a second such said node selection variety as a receiver, by sampling a datum from said data bus and writing it into said local memory element;

F. a fifth means, provided to a specialized controller node, for injecting a repeating sequence of values into said selection bus, at successive said clock events, proceeding in the direction determined by said direction-indicating signal;

wherein, with each particular value within said repeating sequence of selection values there is associated:

i. a transmitting subset of said plurality of nodes, such that each member node responds to said particular value as an instance of said first such said selection variety of said second means;

ii. a receiving subset of said plurality of nodes, positioned in an interleaved manner among the nodes of said transmitting subset, so that each node in said receiving subset is paired with a node in said transmitting subset and situated so as to be able to receive its transmissions, wherein each member node of said receiving subset responds to said particular value as an instance of said second such said selection variety of said second means;

thus inducing data transfers of a concurrent pipelined nature, that is to say systolic data transfers, within said data bus, and in the direction determined by said direction-indicating signal, between said paired nodes.

2. The apparatus of claim 1 wherein the local memory element accessed by said third means is determined by an address pointer element, and wherein said memory access is accompanied by the augmenting of said pointer element by the addition of an integer stride value.

3. The apparatus of claim 1 wherein the local memory element accessed by said fourth means is determined by an address pointer element, and wherein this memory access is accompanied by the augmenting of said pointer element by the addition of an integer stride value.

4. The apparatus of claim 2 augmented with:

A. a means for storing the value of said integer stride;

B. a means of loading said stride storage element, under the control of said specialized controller node, whereby said integer stride becomes a programmable quantity determining the access pattern, that is to say the pitch, within said local memory element, induced by successive selections of said node so augmented.

5. The apparatus of claim 3 augmented with:

A. a means, provided to at least one of said nodes, for storing the value of said integer stride;

B. a means of loading said stride storage element, under the control of said specialized controller node, whereby said integer stride becomes a programmable quantity determining the access pattern, that is to say the pitch, within said local memory element, induced by successive selections of said node so augmented.

6. The apparatus of claim 1 wherein said second means includes, as part of its basis of determination, the status of a local state bit, indicating whether said node is enabled as a transmitter or as a receiver, and wherein a means is included for modifying the status of said state bit, under the control of said specialized controller node.

7. The apparatus of claim 1 wherein said second means includes, as part of its basis of determination, a lookup-table memory indexed by values sampled from said selection bus.

8. The apparatus of claim 7 augmented with a means of modifying table entries in said lookup-up table memory, thus affording programmable assignment of said selection varieties with respect to particular values presented on said selection bus to each of said nodes so augmented.

9. The apparatus of claim 1 wherein said fifth means includes a programmable sequencer for generating said values injected into said selection bus.

10. The apparatus of claim 1 wherein said plurality of nodes have a logical organization as an embedded node grid, and whereby said systolic data transfers constitute concurrent transfers between paired nodes within said embedded node grid.

11. The apparatus of claim 10 wherein each of said pairs of nodes lies along a line parallel to an axis selected from the group consisting of the horizontal, vertical, and diagonal axes of said embedded node grid, whereby said systolic data transfers constitute concurrent transfers along said axis.

12. The apparatus of claim 1 wherein said injected values are members of an ordered set of values injected into said selection bus by said specialized controller so as to contain a repeating sequence of injections of said ordered set of values, and wherein the transmitting and receiving subsets of nodes associated with any given particular value in said ordered set are disjoint from the corresponding subsets associated with all other values in said ordered set, thus inducing concurrent systolic data transfers among said transmitting and receiving subsets associated with said injected values.

13. The apparatus of claim 9 wherein said programmable sequencer is provided with a loop count memory for storing a set of integer values, values, used to determine the number of iterations of program loops generating repeating sequences of said values injected into said selection bus, and wherein said loop count memory can be modified by an external processing element separate from said programmable sequencer, whereby programs interpreted by said sequencer can be parameterized in such a manner that the number of repetitions of a given said repeating sequence, and hence the number of said values injected, is determined at run-time by a particular said integer value in said loop count memory.

14. The apparatus of claim 1 wherein the set of said values injected into said selection bus by said specialized controller contains a repeating sequence of values signalling a third such said node selection variety and proceeding in the direction specified by said direction-indicating signal, and wherein each of a non-empty set of said nodes is augmented with:

A. a means for detecting occurances of said third such said node selection variety;

B. a counter means for counting occurances of said third such said node selection variety relative to a given initial occurance thereof;

C. a means for defining a node region-of-interest, comprising a set of values of said counter means, interpreted as a collection of successive occurances of said third such said node selection variety, and wherein said set of values can be specified by said processing element of each node of said non-empty set;

D. a means for detecting the inclusion of a selection value signalling an occurance of said third such node selection variety within said node region-of-interest, and in the event of such inclusion sampling a datum from said data bus and writing it into said local memory element;

which, in conjunction with a particular one of said nodes, not a member of said non-empty set, responding to all occurances of said third such node selection variety precisely as an instance of said first such said selection variety, i.e., as a transmitter, allows data so transmitted to be sampled by each of said non-empty set of nodes according to the node region-of-interest specified by said processing element.

15. The apparatus of claim 14 wherein said fifth means provided to said specialized controller includes a programmable sequencer means for generating said repeating sequence of values injected into said selection bus, and wherein said programmable sequencer is provided with a loop count memory means for storing a set of integer values, one of which is used to determine the number of iterations of a program loop generating said repeating sequence, and wherein said loop count memory can be modified by an external processing element separate from said programmable sequencer, whereby programs interpreted by said programmable sequencer can be parameterized in such a manner that the number of repetitions of said repeating sequence, and hence the number of said values injected, is determined at run-time by a particular value in said loop count memory.

16. The apparatus of claim 1 wherein at least one node, other than said controller node, is a specialized node, and thus equipped with a subset of said elements cited in claim 1, and augmented with specialized elements, such as analog-to-digital converters, digital-to-analog converters, or specialized memory elements for storing information, in a manner appropriate for a specialized task, such as video buffering.

17. The apparatus of claim 1 augmented with a physical packaging means comprising:

A. a node interconnect means consisting of a backplane unit equipped with connectors for interfacing with a subset of said plurality of nodes through mating node connectors, thus providing pipeline continuity of said ring-structured interconnect, among the nodes in said subset;

B. a first spatial organization means allowing node electrical driver and receiver buffers, associated with said busses of said ring-structured interconnect, to be positioned physically close to said node connector, on the package housing each such said node subset member;

C. a second spatial organization means allowing pairs of said subassemblies to be positioned with one member of said pair rotated 180 degrees relative to the other, so as to form opposed pairs;

D. a strap interconnect means comprising a specialized strap assembly, equipped with connectors for interfacing with both members of one of said opposed pairs, thus providing continuity of said ring-structured interconnect, at one end of said opposed pair, so as to form a strapped opposed pair;

E. a subassembly interconnect means comprising a backplane unit, equipped with connectors for interfacing with said specialized controller node, as well as with several said strapped opposed pairs, thus providing continuity of said ring-structured interconnect, between said strapped opposed pairs, and said specialized controller node;

whereby allowing the overall physical interconnect paths of said ring-structured interconnect to flow through said subassemblies in a serpentine fashion, and through the entire structure in an efficient and geometrically tight fashion.

* * * * *